United States Patent
Raynel et al.

(10) Patent No.: US 10,597,313 B2
(45) Date of Patent: Mar. 24, 2020

(54) CHLORINATION-ASSISTED COAGULATION PROCESSES FOR WATER PURIFICATION

(71) Applicant: Saudi Arabian Oil Company, Dhahran (SA)

(72) Inventors: Guillaume Robert Jean-François Raynel, Dhahran (SA); Regis Didier Alain Vilagines, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 234 days.

(21) Appl. No.: 15/791,731

(22) Filed: Oct. 24, 2017

(65) Prior Publication Data

US 2018/0230026 A1  Aug. 16, 2018

Related U.S. Application Data

(60) Provisional application No. 62/459,733, filed on Feb. 16, 2017.

(51) Int. Cl.
  *C02F 1/463* (2006.01)
  *C02F 1/467* (2006.01)
  (Continued)

(52) U.S. Cl.
  CPC ............ *C02F 1/463* (2013.01); *C02F 1/4674* (2013.01); *C02F 2001/46133* (2013.01);
  (Continued)

(58) Field of Classification Search
  None
  See application file for complete search history.

(56) References Cited

U.S. PATENT DOCUMENTS

| 3,390,065 A | 6/1968 | Cooper |
| 3,732,153 A | 5/1973 | Harke et al. |

(Continued)

FOREIGN PATENT DOCUMENTS

| CA | 2849290 A1 | 3/2013 |
| FR | 2994174 A1 | 2/2014 |

(Continued)

OTHER PUBLICATIONS

Choi et al., "Design and Operating Parameters Affecting an Electrochlorination System", Journal of Industrial and Engineering Chemistry, 201, 19, 215-219.

(Continued)

*Primary Examiner* — Clare M Perrin
(74) *Attorney, Agent, or Firm* — Dinsmore & Shohl, LLP

(57) ABSTRACT

Chlorination-assisted coagulation processes and systems are disclosed for removing organic and inorganic contaminants from aqueous compositions and streams such as produced water generated by petroleum production operations. The chlorination-assisted coagulation process includes converting at least a portion of chloride ions in the aqueous composition to hypochlorite ions or hypochlorous acid by passing an electric current through at least a portion of the aqueous composition under anaerobic conditions, the aqueous composition including the chloride ions, iron (II) compounds, and one or more organic compounds. The chlorination-assisted coagulation process further includes reacting at least a portion of the iron (II) compounds of the aqueous composition with the hypochlorite or hypochlorous acid to produce iron (III) ions, and coagulating the one or more organic compounds with the iron (III) ions to produce a plurality of insoluble solid particles in a treated aqueous composition.

33 Claims, 10 Drawing Sheets

(51) Int. Cl.
- *C02F 101/32* (2006.01)
- *C02F 1/461* (2006.01)
- *C02F 103/36* (2006.01)
- *C02F 103/10* (2006.01)

(52) U.S. Cl.
CPC ...... *C02F 2101/32* (2013.01); *C02F 2103/10* (2013.01); *C02F 2103/365* (2013.01); *C02F 2201/4613* (2013.01); *C02F 2201/4614* (2013.01); *C02F 2201/46135* (2013.01); *C02F 2209/02* (2013.01); *C02F 2209/03* (2013.01); *C02F 2209/04* (2013.01); *C02F 2209/06* (2013.01)

(56) References Cited

U.S. PATENT DOCUMENTS

| | | | |
|---|---|---|---|
| 4,422,917 | A | 12/1983 | Hayfield |
| 5,605,635 | A | 2/1997 | David |
| 6,054,048 | A | 4/2000 | Kaeriyama et al. |
| 7,662,295 | B2 | 2/2010 | Arato et al. |
| 7,713,399 | B2 | 5/2010 | Martinie et al. |
| 7,731,843 | B2 | 6/2010 | Pinchin |
| 8,056,228 | B2 | 11/2011 | Di Franco |
| 8,496,815 | B2 | 7/2013 | Brix et al. |
| 2002/0139689 | A1 | 10/2002 | Zolotarsky et al. |
| 2007/0256932 | A1 | 11/2007 | Martin et al. |
| 2007/0261968 | A1 | 11/2007 | Carlson et al. |
| 2011/0024361 | A1 | 2/2011 | Schwartzel et al. |
| 2012/0055871 | A1* | 3/2012 | Fresnel ............... C02F 1/4674 210/630 |
| 2012/0145546 | A1* | 6/2012 | Volkel ................ B01D 61/445 204/518 |
| 2013/0087450 | A1 | 4/2013 | Antozzi et al. |
| 2014/0054225 | A1 | 2/2014 | De la Monja Carter et al. |
| 2014/0158550 | A1 | 6/2014 | Seth et al. |
| 2014/0217035 | A1 | 8/2014 | Poyet |
| 2014/0290484 | A1 | 10/2014 | Weston et al. |
| 2015/0076073 | A1 | 3/2015 | Henley |
| 2015/0247248 | A1 | 9/2015 | Thomassen |
| 2016/0009583 | A1 | 1/2016 | Poirier et al. |

FOREIGN PATENT DOCUMENTS

| | | |
|---|---|---|
| GB | 2176497 A | 12/1986 |
| WO | 2008147165 A1 | 12/2008 |
| WO | 2013044168 A1 | 3/2013 |
| WO | 2014089228 A2 | 6/2014 |
| WO | 2015057664 A1 | 4/2015 |
| WO | 2015137878 | 9/2015 |
| WO | 2016066544 A1 | 5/2016 |

OTHER PUBLICATIONS

Llanos et al., "Novel Electrodialysis-Electrochlorination Integrated Process for the Reclamation of Treated Wastewaters", Separation and Purification Technology, Accepted Manuscript, 1-34.

Yoon et al., "Alternative Electrode Materials and Ceramic Filter Minimize Disinfection Byproducts in Point-of-Use Electrochemical Water Treatment", Environmental Engineering Science, 2013, 30, 12, 742-749.

International Search Report and Written Opinion dated Apr. 12, 2018 for International Application No. PCT/US2018/017035, filed Feb. 6, 2018, 16 pages.

Llanos, et al., Effect of bipolar electrode material on the reclamation of urban wastewater by an integrated electrodisinfection/electrocoagulation process, Water Research, vol. 53, 2014, Chemical Engineering Department, University of Castilla-La Mancha, pp. 329-338, Spain.

Yang, Electrochemical coagulation for oily water demulsification, Separation and Purification Technology, vol. 54, 2007, Environmental Chemistry Laboratory, University of Massachusetts-Dartmouth, pp. 388-395, USA.

GCC Patent Application No. 2018/34779 Examination Report dated Aug. 22, 2019.

\* cited by examiner

CHLORINATION-ASSISTED COAGULATION PROCESSES FOR WATER PURIFICATION

CROSS-REFERENCE TO RELATED APPLICATIONS

This application claims priority to U.S. Provisional Application Ser. No. 62/459,733, filed Feb. 16, 2017, the entire contents of which are incorporated by reference in this disclosure.

TECHNICAL FIELD

The present specification generally relates to treatment processes for purifying aqueous streams, in particular, for chlorination-assisted coagulation processes for treating aqueous stream from petroleum production or refining operations.

BACKGROUND

Petroleum drilling, production, and/or refining can produce various aqueous streams, such as produced water for example, that contain organic compounds, such as oils, phenolic compounds and other organic and inorganic contaminants. Many of these organic and inorganic contaminants must be removed from the aqueous streams before the water from these aqueous streams can be reused in drilling operations and refining processes or directed to downstream treatment processes. Various water treatment systems are available for removing these organic and inorganic contaminants from aqueous streams produced from petroleum drilling, production, or refining operations. However, conventional treatment systems may not be suitable for use in petroleum drilling and processing environments.

SUMMARY

During petroleum production processes such as drilling operations and extraction of crude oil from subterranean formations, water may also be extracted from the subterranean formations. This water extracted from the subterranean formation is known as "produced water" (PW) in the petroleum industry. This produced water may be contaminated by organic and inorganic compounds, and these organic and inorganic contaminants generally must be removed from the water to meet the industry standards for water reuse. For example, the organic and inorganic contaminants must be removed from the produced water before it can be reinjected back into the subterranean formation or otherwise reused.

Conventional treatment processes for removing contaminants from water include coagulation processes. In a typical coagulation process, a coagulant, as iron (III) sulfate or aluminum (III) sulfate, is added to the water to coagulate the organic and inorganic contaminants into insoluble solids that can be filtered or separated from the water. However, when conventional coagulants are used, the sulfate ions are generally left behind in the treated water. When injected back into the formation, these sulfate ions form insoluble salts with barium, calcium, strontium ions, or other metal ions, and these insoluble salts may build up and plug the pores in the rock in the formation. Therefore, treatment of produced water using conventional metal sulfate coagulants may cause flow restrictions in the subterranean formation when the treated water is reinjected back into the formation, thereby reducing the petroleum production rate from the formation.

Electrocoagulation processes may also be used to treat produced water. Typical electrocoagulation processes are operated under aerobic condition to prevent the formation of hydrogen, which is a flammable gas, at the cathode. Additionally, in conventional electro-coagulation processes, a sacrificial iron or aluminum electrode is oxidized into iron (III) or aluminum (III) species, which then induce coagulation of the organic and inorganic contaminants. In the presence of oxygen under aerobic conditions, the oxidation reaction of the iron or aluminum electrode into iron (III) or aluminum (III) is a spontaneous reaction that occurs rapidly without the introduction of supplemental energy, such as heat or electrical potential, into the system. In typical electrocoagulation processes, an oxygen source, such as oxygen gas, ozone, hydrogen peroxide, or combinations of these for example, or other oxidant is introduced to the contaminated water stream to facilitate oxidation of the consumable iron or aluminum electrode.

However, adding oxygen or oxygen producing compound to treat produced water in the petroleum production or processing facility is cost prohibitive and dangerous. A typical petroleum production plant may generate up to 150,000 barrels per day (MPD) of produced water. Treating 150 MPD of produced water with a conventional electrocoagulation process would require a substantial amount of oxygen to be consumed, resulting in substantial material costs. The sacrificial electrodes must also be frequently replaced, which can greatly increase the operating costs of the electrocoagulation process. Additionally, oil and gas production and processing facilities are classified as explosive environments, and production of or storage of oxidants, in particular oxygen gas, ozone, or peroxides, in these explosive environments may create unwanted fire or explosion hazard and drastically increases the risk of fire related damage to property and personnel. Furthermore, residual dissolved oxygen in the treated produced water may cause problems to some water re-cycling and re-use applications, such as increased corrosion for example, or unacceptable water specifications for re-injection into the reservoir formation. Residual dissolved oxygen in the treated water requires that chemicals that act as oxygen scavengers also be added to the treated produced water to make it suitable for re-injection back into the downhole formation.

Therefore, a need exists for treatment processes that are safer to operate in hydrocarbon processing facilities and require addition of far lesser quantities of treatment chemicals, such as oxidants and coagulants. The chlorination-assisted coagulation processes and systems of the present disclosure capitalize on the existing chemistry of the produced water, in particular the presence of substantial concentrations of dissolved iron (II) ions and high salinity (i.e., high concentration of chloride ions), to coagulate and remove organic and inorganic compounds from the produced water. The chlorination-assisted coagulation processes and systems utilize a coagulation process conducted under anaerobic conditions. Additionally, the coagulation process includes a chlorination step in which chloride ions (i.e., from the natural salinity of the produced water) are converted to hypochlorite ($ClO^-$) or hypochlorous acid (HClO) through passing an electric current through the produced water. The iron (II) ions in the produced water are then oxidized by the hypochlorite or hypochlorous acid into iron (III) ions, which then form complexes with organic and inorganic contaminants to coagulate the contaminants into an insoluble solid. The chlorination-assisted coagulation processes and systems disclosed herein are safer to operate in hydrocarbon processing facilities and do not require the addition of large quantities of chemicals to the produced water during treatment.

According to one embodiment, a process for treating an aqueous composition, the process including converting at least a portion of chloride ions in the aqueous composition to hypochlorite ions or hypochlorous acid by passing an electric current through at least a portion of the aqueous composition under anaerobic conditions, the aqueous composition including the chloride ions, iron (II) compounds, and one or more organic compounds. The process may further include reacting at least a portion of the iron (II) compounds of the aqueous composition with the hypochlorite or hypochlorous acid to produce iron (III) ions, and coagulating the one or more organic compounds with the iron (III) ions to produce a plurality of insoluble solid particles in a treated aqueous composition According to another embodiment, a process for removing organic compounds from an aqueous composition may include introducing at least a portion of the aqueous composition to an electro-chlorination zone, the aqueous composition comprising at least chloride ions, iron (II) compounds, and one or more organic compounds. The process may further include converting at least a portion of the chloride ions in the aqueous composition into hypochlorite or hypochlorous acid by passing an electric current through the aqueous composition under anaerobic conditions in the electro-chlorination zone. The process may include oxidizing at least a portion of the iron (II) compounds in the aqueous composition with the hypochlorite or hypochlorous acid in the electro-chlorination zone or in a coagulation zone to produce iron (III) ions, and coagulating the one or more organic compounds with the iron (III) ions in the coagulation zone to produce a plurality of insoluble solid particles in the aqueous composition. The process may further include separating at least a portion of the insoluble solid particles from the aqueous composition, thereby removing at least a portion of the organic compounds from the aqueous composition.

According to yet other embodiments, a system for treating an aqueous composition may include an electro-chlorination system that includes a vessel and a plurality of electrodes disposed within the vessel. The electro-chlorination system may be operable to convert at least a portion of the chloride ions in the aqueous composition into hypochlorite or hypochlorous acid by passing an electric current through the aqueous composition disposed in the vessel with the plurality of electrodes. The electrodes may each comprise non-sacrificial electrodes having an outer surface that includes one or more of zirconium, molybdenum, gold, silver, tantalum, tungsten, chromium, carbon, sulfur, silicon, or oxides of these materials and the plurality of electrodes are operable to pass the electric current with a current potential greater than 1.5 V through the aqueous composition disposed within the vessel. The system may also include a coagulation vessel downstream of the electro-chlorination system.

In some embodiments, the system may further include a property sensor positioned in the electro-chlorination vessel or downstream of the electro-chlorination vessel. In some embodiments, the system may include a bypass line operable to pass at least a portion of the aqueous composition around the electro-chlorination system and directly to the coagulation vessel. The system may include a control valve disposed in the bypass line, wherein the control valve is operable to control a flow rate of a portion of an aqueous composition into the electro-chlorination vessel in response to feedback from a property sensor disposed in the electro-chlorination vessel or downstream of the electro-chlorination vessel.

Additional features and advantages of the described embodiments will be set forth in the detailed description which follows, and in part will be readily apparent to those skilled in the art from that description or recognized by practicing the described embodiments, including the detailed description which follows, the claims, as well as the appended drawings.

BRIEF DESCRIPTION OF THE DRAWINGS

The following detailed description of specific embodiments of the present disclosure can be best understood when read in conjunction with the following drawings, where like structure is indicated with like reference numerals and in which.

Figure 1:
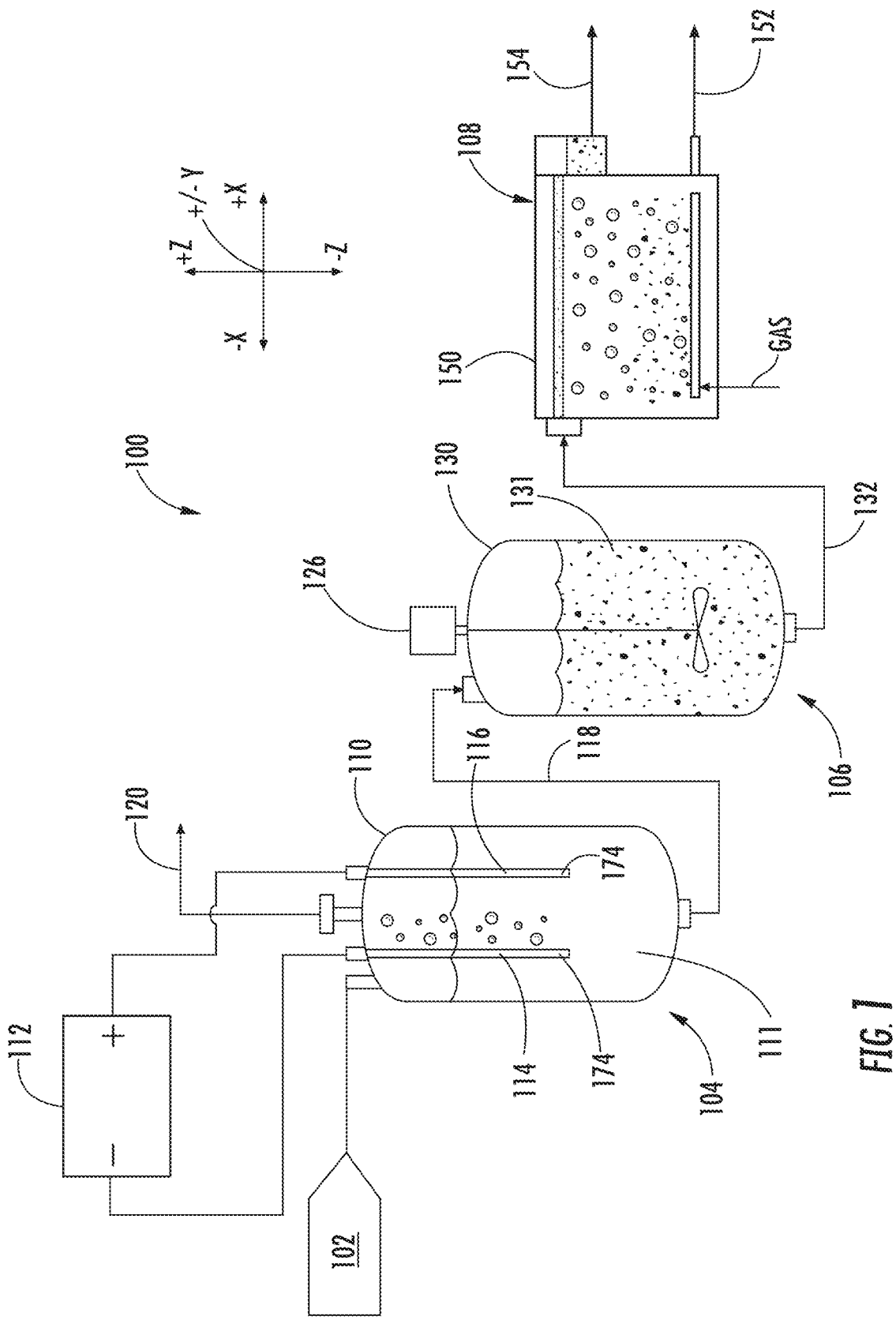
FIG. 1 schematically depicts a chlorination-assisted coagulation system, according to one or more embodiments of the present disclosure.

For the purpose of describing the simplified schematic illustrations and descriptions of FIGS. 1 and 4-6, the numerous valves, temperature sensors, electronic controllers, and the like that may be employed and well known to those of ordinary skill in the art of certain chemical processing operations are not included. Further, accompanying components that are often included in typical chemical processing operations, gas supply systems, electrical system, pumps, compressors, agitation systems, mixers, or other subsystems may not be depicted. It should be understood that these components are within the spirit and scope of the present embodiments disclosed. However, operational components, such as those described in the present disclosure, may be added to the embodiments described in this disclosure.

Arrows in the drawings refer to process streams. However, the arrows may equivalently refer to transfer lines which may serve to transfer process streams between two or more system components. Additionally, arrows that connect to system components may define inlets or outlets in each given system component. The arrow direction corresponds generally with the major direction of movement of the materials of the stream contained within the physical transfer line signified by the arrow. Furthermore, arrows which do not connect two or more system components may signify a product stream which exits the depicted system or a system inlet stream which enters the depicted system. Product streams may be further processed in accompanying chemical processing systems or may be commercialized as end products.

Additionally, arrows in the drawings may schematically depict process steps of transporting a stream from one system component to another system component. For example, an arrow from one system component pointing to another system component may represent "passing" a system component effluent to another system component, which may include the contents of a process stream "exiting" or being "removed" from one system component and "introducing" the contents of that product stream to another system component.

It should be understood that two or more process streams are "mixed" or "combined" when two or more lines intersect in the schematic flow diagrams of FIGS. 1, 4, 5, and 6. Mixing or combining may also include mixing by directly introducing both streams into a like system component, such as a vessel, reactor, separator, or other system component. For example, it should be understood that when two streams are depicted as being combined directly prior to entering a system component, the streams could equivalently be introduced into the system component and be mixed in the system component.

Reference will now be made in greater detail to various embodiments, some embodiments of which are illustrated in the accompanying drawings. Whenever possible, the same reference numerals will be used throughout the drawings to refer to the same or similar parts.

DESCRIPTION

Processes and systems are disclosed for removing organic and inorganic contaminants from produced water and other aqueous compositions or streams produced from petroleum production or petroleum refining processes. Referring to FIG. 1, one embodiment of a chlorination-assisted coagulation system 100 for conducting a chlorination-assisted coagulation process is depicted. The chlorination-assisted coagulation system 100 may include an electro-chlorination system 104, a coagulation system 106, and a separation system 108. The chlorination-assisted coagulation process may be conducted using the chlorination-assisted coagulation system 100 to remove organic and inorganic contaminants from produced water or other aqueous streams. The chlorination-assisted coagulation process may include converting at least a portion of chloride ions in the aqueous composition to hypochlorite ions or hypochlorous acid by passing an electric current through at least a portion of the aqueous composition under anaerobic conditions. The aqueous composition may include the chloride ions, iron (II) compounds, and one or more organic compounds. The aqueous composition may be produced water. The chlorination-assisted coagulation process may also include reacting at least a portion of the iron (II) compounds of the aqueous composition with the hypochlorite or hypochlorous acid to produce iron (III) ions, and coagulating the one or more organic compounds with the iron (III) ions to produce a plurality of insoluble solid particles in a treated aqueous composition.

The chlorination-assisted coagulation process may remove organic compounds, such as oil droplets, natural gas, dissolved organic compounds, or combinations of these, from the aqueous composition. The strong oxidants formed by the electro-chlorination process may react with environmentally hazardous organic compounds, such as phenol, to break down these hazardous organic compounds into more environmentally friendly compounds. By conducting electro-chlorination and coagulation under anaerobic conditions, the chlorination-assisted coagulation process may be safer to operate in hydrocarbon processing facilities, which may be classified as explosive environments, and may require addition of far lesser quantities of treatment chemicals, such as oxidants and coagulants compared to conventional treatment processes.

Anaerobic operation of the chlorination-assisted coagulation process may also prevent formation of sulfates by controlling the concentration of oxidants in the system through control of the current passed through the aqueous composition. Anaerobic operation of the chlorination-assisted coagulation process may also result in generation of hydrogen gas ($H_2$) which may be utilized to provide mixing or to assist in flotation separation of coagulated solids from the treated aqueous composition. Additionally, the chlorination-assisted coagulation process may be conducted at operating temperatures and pressures characteristic of the petroleum production or refining processes. The chlorination-assisted coagulation process may also remove hydrogen sulfide ($H_2S$) from Sour produced water having an initially high concentration of $H_2S$. These and other advantages and benefits of the chlorination-assisted coagulation process will be subsequently discussed in this disclosure.

As used in this disclosure, the term "aerobic" refers to conducting one or more reactions in the presence of oxygen ($O_2$), ozone ($O_3$), hydrogen peroxide ($H_2O_2$), other peroxides, other oxygen-generating compounds, or combinations of these. The term "aerobic" may include use of oxygen, ozone, peroxides, other oxygen-generating compounds, or combinations of these as reactants; generation of oxygen, ozone, or peroxides as reaction products; or otherwise conducting the reaction in the presence of oxygen, ozone, peroxides, other oxygen-generating compounds, or combinations of these.

As used in this disclosure, the term "anaerobic" refers to conducting one or more reactions in an oxygen-free environment. The term "oxygen-free" refers to an environment having less than 20 parts per billion volume dissolved oxygen. An aqueous solution or environment having a dissolved oxygen content greater than 20 parts per billion volume no longer operates primarily under anaerobic conditions.

As used in this disclosure, the term "on site" refers to reacting one or more constituents of the aqueous composition in its original state to produce one or more reaction products without the addition of one or more compounds, such as reactants, catalysts or other compounds, to the aqueous composition. In other words, all of the compounds associated with conducting the reactions are indigenous to the aqueous composition being treated. "On site" is utilized in this disclosure in place of the Latin phrase in situ.

As used in this disclosure, the term "produced water" refers to water that is extracted from a subterranean formation by a production well during petroleum or natural gas production and/or water streams generated from a gas and oil separation plant (GOSP) or other petroleum processing facility. Subterranean oil and gas reserves may often include substantial amounts of water along with the oil and gas. During gas and oil extraction, this water is also extracted as a byproduct along with the gas or oil and is subsequently separated from the gas or oil. This water separated from the gas and oil may be referred to as produced water. However, produced water may also include water naturally occurring in the subterranean formation, water injected into the subterranean formation to force oil and gas in the subterranean formation towards the production well, other water extracted from the subterranean formation, or combinations of these. As previously discussed, produced water may also include water streams from petroleum operations such as the GOSP and petroleum processing facilities. Produced water may also include a mixture of water extracted from a subterranean formation and one or more other streams of water, such as fresh water used for crude oil desalting, industrial waste water generated at another petroleum processing facility, water from firefighting water storage, other water stream or combinations of these.

As used in this disclosure, the term "sour produced water" refers to produced water having a high concentration of hydrogen sulfide. The high concentration of hydrogen sulfide in the "sour produced water" may be characterized by the concentration of hydrogen sulfide present in the corresponding produced gas stream separated from the produced water in the GOSP. For "sour produced water," the corresponding produced gas stream may have a hydrogen sulfide content in a range of from 5 volume percent (vol. %) to 20 vol. %.

As used in this disclosure, the term "sweet produced water" refers to produced water having a low concentration of hydrogen sulfide. The low concentration of hydrogen sulfide in the "sweet produced water" may be characterized by the hydrogen sulfide content of the corresponding produced gas stream separated from the produced water in the GOSP. For "sweet produced water," the corresponding produced gas stream may have a hydrogen sulfide content of less than 5 volume percent (vol. %).

Produced water may include organic compounds, such as free oil and hydrocarbon gases, dissolved hydrocarbons, other dissolved organic compounds, such as phenolic compounds, organic acids, alcohols, or combinations of these. In some embodiments, the incoming produced water may have an oil content of greater than 0.1 volume percent (vol. %) based on the total volume of the produced water. In some embodiments, the produced water may have up to or greater than 1 vol. % oil content. The produced water may also include inorganic contaminants, such as dissolved minerals, metals, and anionic species. Inorganic contaminants that may be present in the produced water may include, but are not limited to, aluminum, calcium, magnesium, arsenic, cadmium, chromium, copper, iron, lead, manganese, nickel, potassium, sodium, selenium, zinc, barium, lithium, sulfur, strontium, titanium, vanadium, other metal or inorganic contaminants, or combinations of these. These organic and inorganic contaminants must be removed from the produced water to meet industry standards for water reuse or reinjection into subterranean formations.

As previously discussed, the produced water may include indigenous iron in the form of various iron (II) species. The produced water may have less than or equal to 100 milligrams per liter (mg/L) iron (II). For example, in some embodiments, the produced water may have less than or equal to 80 mg/L iron (II), less than or equal to 50 mg/L iron (II), or less than or equal to 20 mg/L iron (II). In some embodiments, the produced water may have greater than or equal to 0.5 mg/L iron (II), greater than or equal to 1 mg/L iron (II), greater than or equal to 2 mg/L iron (II), or even greater than or equal to 5 mg/L iron (II). For example, in some embodiments, the produced water may have from 0.5 mg/L to 100 mg/L, from 0.5 mg/L to 50 mg/L, from 0.5 mg/L to 20 mg/L, from 1 mg/L to 100 mg/L, from 1 mg/L to 50 mg/L, from 1 mg/L to 20 mg/L, from 5 mg/L to 100 mg/L, from 5 mg/L to 50 mg/L, or from 5 mg/L to 20 mg/L iron (II) species.

In addition to the organic and inorganic compounds previously described, the produced water also has a high degree of salinity. For example, produced water may have a high concentration of chloride ions. As will be subsequently described in this disclosure, these chloride ions can be converted on site (in place), via an electro-chlorination process, into useful chemicals which can be used to oxidize toxic organic compounds, such as phenol and other organics, and to oxidize the indigenous iron (II) species into iron (III), which may enable coagulation of inorganic and organic contaminants of the produced water. In some embodiments, the concentration of chloride ions in the produced water may be greater than or equal to 4,000 mg/L, greater than or equal to 10,000 mg/L, greater than or equal to 20,000 mg/L, greater than or equal to 50,000 mg/L, or even greater than or equal to 100,000 mg/L. In some embodiments, the produced water may include from 4,000 milligrams per liter (mg/L) to 150,000 mg/L chloride ions. In other embodiments, the produced water may include from 10,000 mg/L to 150,000 mg/L, from 20,000 mg/L to 150,000 mg/L, 50,000 mg/L to 150,000 mg/L, or 100,000 mg/L to 150,000 mg/L chloride ions. Produced water may have a pH in a range of from 4 to 7 at the production operations conditions.

The produced water may include water-soluble polymers from the formulation of oilfield chemicals, such as demulsifiers, hydrate inhibitors, drilling fluids, spacer fluids, or other chemicals. Examples of these water-soluble polymers may include, but are not limited to, polyethylene oxides from demulsifier makeup, polyamides found in hydrate inhibitors, xanthan gum (XC) polymers used in drilling fluids, other water-soluble polymers, or combinations of polymers. These water-soluble polymers may act as chelating substances. For example, the water-soluble polymers may interact strongly with the iron (III) compounds to make larger flocs of the insoluble solid produced during coagulation. In other words, the water-soluble polymers in the produced water may act as an additional flocculent, which may reduce or eliminate the need to add a flocculent to improve separation of the coagulated insoluble solid from the treated water.

The produced water may include dissolved hydrogen sulfide ($H_2S$) as well as other dissolved gases. The produced water may also include dissolved solids, suspended solids, other colloidal materials, or combinations of these, which must be removed prior to reuse or reinjection of the treated produced water.

The chlorination-assisted coagulation systems and processes are described in this disclosure in the context of treating produced water generated from petroleum and natural gas production. However, it is understood that the chlorination-assisted coagulation systems and processes may be used for other aqueous compositions that include various organic and inorganic contaminants. For example, the chlorination-assisted coagulation systems and processes may be used to remove organic and inorganic contaminants from other aqueous streams generated during hydrocarbon production operations, hydrocarbon refining processes, or other chemical or petrochemical manufacturing processes. The disclosed chlorination-assisted coagulation systems and processes are particularly suited for aqueous compositions having organic contaminants and elevated concentrations of chloride ions and indigenous iron (II) species.

Referring to FIG. 1, an embodiment of the chlorination-assisted coagulation system 100 for removing organic and inorganic contaminants from produced water 102 or other aqueous stream is depicted. The chlorination-assisted coagulation system 100 may include an electro-chlorination system 104, a coagulation system 106 downstream of the electro-chlorination system 104, and a separation system 108 downstream of the coagulation system 106.

In some embodiments, the electro-chlorination system 104 may include a vessel, such as an electro-chlorination vessel 110. The electro-chlorination vessel 110 may include a plurality of electrodes 174, which may include a cathode 114 and an anode 116, positioned within the electro-chlorination vessel 110 to contact the produced water 102 introduced to the electro-chlorination vessel 110. In some embodiments, the electro-chlorination vessel 110 may include from 2 to 20 electrodes 174. The electrodes 174 are coupled to an electric power source 112 capable of producing voltage and current sufficient to convert chloride ions in the produced water 102 to strong oxidants, such as hypochlorous acid or hypochlorite. In some embodiments, the electric power source 112 may be a direct current (DC) power source. A chlorinated produced water stream 118 may be passed from the electro-chlorination vessel 110 of the electro-chlorination system 104 to the coagulation system 106. The chlorinated produced water stream 118 may include the strong oxidants produced by the electro-chlorination system 104. As will be discussed subsequently in this disclosure, the electro-chlorination process to convert chloride ions into the strong oxidants conducted in the electro-chlorination system 104 may produce hydrogen gas 120, which may be passed out of the electro-chlorination vessel 110. In some embodiments, the positioning of the electrodes 174 in the bottom portion and/or the middle portion of the electro-chlorination vessel 110 may enable the produced hydrogen gas 120 to be used as a gas carrier in an IGF process to remove oil droplets from the produced water.

In some embodiments, the coagulation system 106 may include a coagulation vessel 130. In the coagulation process conducted in the coagulation system 106, the strong oxidants in the chlorinated produced water stream 118 passed to the coagulation system 106 may convert the indigenous iron (II) species in the produced water 102, chlorinated produced water 118, or both into iron (III), which is an insoluble or partially soluble solid. The iron (III) may form insoluble complexes with the organic and inorganic contaminants in the chlorinated produced water 118 to produce the coagulated produced water stream 132. The resulting coagulated produced water stream 132 may be passed from the coagulation vessel 130 to the downstream separation system 108. The separation system 108 may include one or more separators 150 for separating the coagulated insoluble solid particles 154 from the treated produced water 152.

The coagulation process may be initiated by the presence of an oxidant, such as hypochlorous acid or metal hypochlorite for example. As previously described in this disclosure, the high concentration of chloride ions existing in the produced water may be used to form, on site, a small amount of these strong oxidants by converting chloride ions already present in the produced water to hypochlorous acid or metal hypochlorite through electrolysis of the produced water. The electrolysis step may be referred to throughout this disclosure as electro-chlorination.

Electro-chlorination has been used for chlorinating water, which may be subsequently used for human consumption as drinking water or for disinfecting tanks, such as swimming pools for example. Electro-chlorination has also been used to treat contaminated water, such as ship ballast water. The electro-chlorination reaction may include the in place (on site) electrolysis of metal chloride, such as sodium chloride, to prepare hypochlorous acid (HClO) under acidic conditions or hypochlorite (ClO$^-$) under basic conditions. In conventional electro-chlorination, the electrolysis of chloride ions to produce hypochlorous acid or hypochlorite is often conducted under aerobic conditions, in which the electrolysis of chloride is facilitated by the addition of oxygen gas, ozone, a peroxide compound such as hydrogen peroxide, other oxygen-generating compounds, or combinations of these. Reaction 1 (RXN 1) and Reaction 2 (RXN 2), provided subsequently in this disclosure, illustrate the oxidation/reduction reactions that occur during electro-chlorination under aerobic conditions in both acidic and basic conditions, respectively. Electro-chlorination of chloride ions to hypochlorous acid under aerobic and acidic conditions according to RXN 1 has a total reaction potential of −0.261 volts (V). Electro-chlorination of chloride ions to hypochlorite under aerobic conditions and basic conditions according to RXN 2 has a total reaction potential of −0.489 V.

Aerobic Electro-chlorination—Acidic Conditions

| $O_2 + 4H^+ + 4e^- \longleftrightarrow 2H_2O$ | E°: +1.229 V | |
|---|---|---|
| $H_2O + Cl^- \longleftrightarrow HOCl(aq) + H^+ + 2e^-$ | E°: −1.49 V | RXN 1 |
| $2Cl^- + O_2 + 2H^+ \longleftrightarrow 2HOCl\,(aq)$ | E°: −0.261 V | |

Aerobic Electro-chlorination—Basic Conditions

| $O_2 + 2H_2O + 4e^- \longleftrightarrow 4OH^-$ | E°: +0.401 V | |
|---|---|---|
| $2HO^- + Cl^- \longleftrightarrow ClO^-(aq) + H_2O + 2e^-$ | E°: −0.89 V | RXN 2 |
| $2Cl^- + O_2 \longleftrightarrow 2ClO^-\,(aq)$ | E°: −0.489 V | |

However, when chlorination is performed under aerobic conditions, the presence of oxygen may push the reaction to greater chloride states of oxidation to produce chlorite ions, chlorate ions, or perchlorate ions, for example. These greater oxidized chlorides are less stable and more toxic than hypochlorite ions. Further, aerobic chlorination under acidic conditions (pH<3) may form chlorine, which is a highly toxic gas that requires further treatment and removal from gaseous streams passed out of the treatment process.

In petroleum or natural gas production operations, conversion of the chloride ions to hypochlorous acid or hypochlorite on site in the absence of oxygen, such that the process conditions are anaerobic, may be better suited to the hydrocarbon industry environment. Conducting the electro-chlorination under anaerobic conditions may reduce or eliminate the fire hazard potential of the chlorination-assisted coagulation process by preventing contact between hydrocarbons, such as crude oil or natural gas, and the oxygen, ozone, peroxides, other oxygen-generating compounds, oxidant raw materials, or combinations of these. Anaerobic conversion of chloride ions to hypochlorous acid or hypochlorite within the produced water may also reduce the chances of inadvertent contamination of crude oil or other petroleum streams with the oxygen, ozone, peroxides, oxygen-generating compounds, or oxidant raw materials. RXN 3 and RXN 4, provided subsequently in this disclosure, illustrate oxidation/reduction reactions that occur during electro-chlorination under anaerobic conditions in both acidic and basic conditions, respectively. Electro-chlorination of chloride ions to hypochlorous acid under anaerobic and acidic conditions according to RXN 3 has a total reaction potential of −1.49 volts (V). Electro-chlorination of chloride ions to hypochlorite under anaerobic and basic conditions according to RXN 4 has a total reaction potential of −1.7177 V.

Anaerobic Electro-chlorination—Acidic Conditions $2H^+ + 2e^- \rightleftharpoons H_2$  E°: 0.0 V

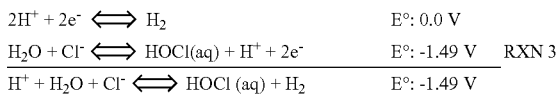  E°: −1.49 V  RXN 3

$H^+ + H_2O + Cl^- \rightleftharpoons HOCl\,(aq) + H_2$  E°: −1.49 V

Anaerobic Electro-chlorination—Basic Conditions $2H_2O + 2e^- \rightleftharpoons H_2 + 2OH^-$  E°: −0.8277 V

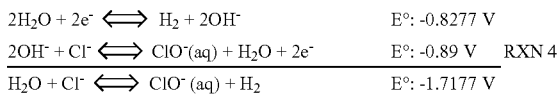  E°: −0.89 V  RXN 4

$H_2O + Cl^- \rightleftharpoons ClO^-\,(aq) + H_2$  E°: −1.7177 V

As shown in RXN 3 and RXN 4, anaerobic conversion of chloride ions to hypochlorous acid (RXN 3) or hypochlorite (RXN 4) does not require the introduction of oxygen as a reactant and does not produce oxygen as a reaction product.

Figure 2:
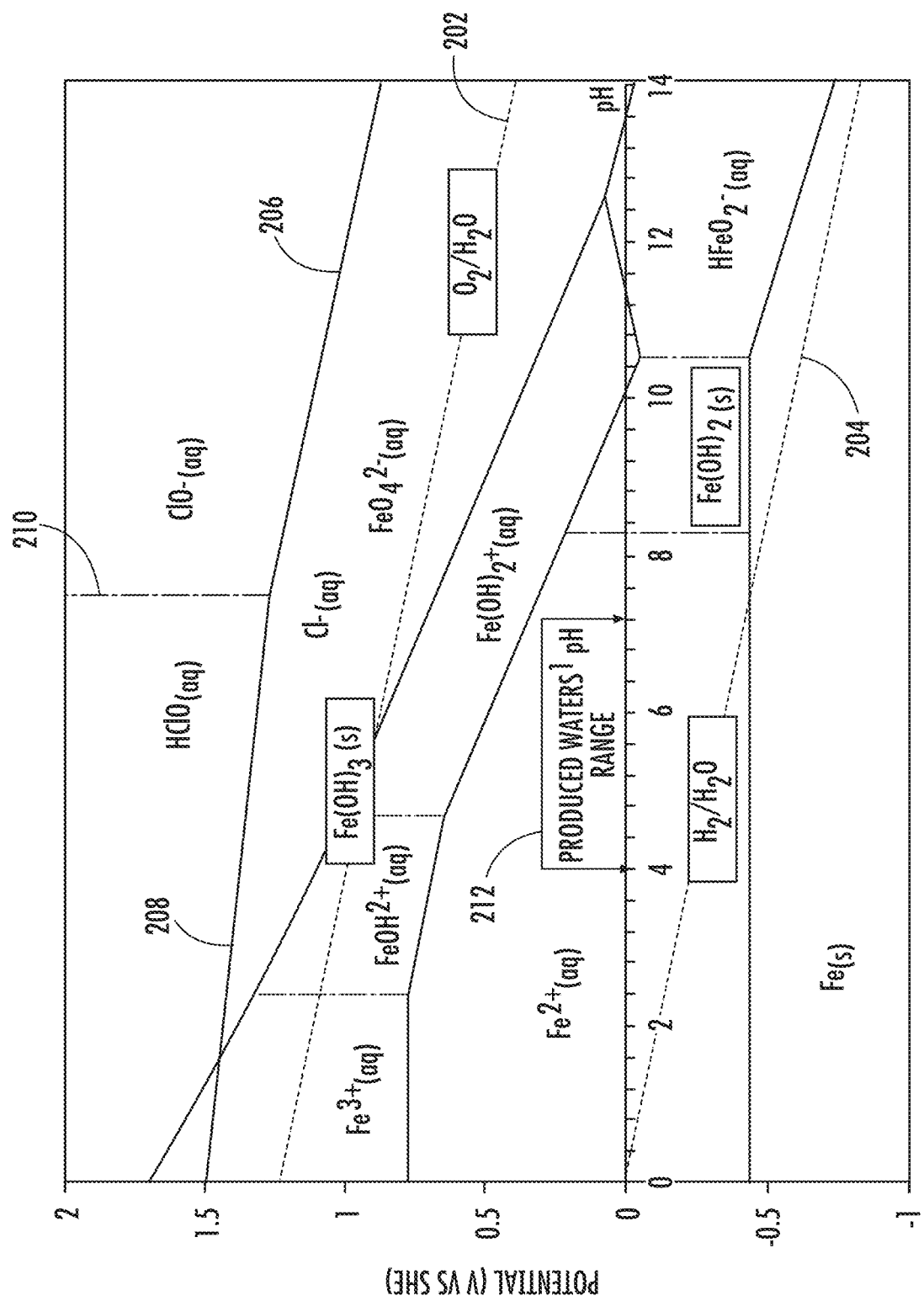
FIG. 2 schematically depicts a Pourbaix diagram for chloride and iron, according to one or more embodiments of the present disclosure.

Referring to FIG. 2, a Pourbaix diagram of a chloride and iron system is depicted. The Pourbaix diagram of FIG. 2 illustrates stable equilibrium states of the aqueous solution comprising the chloride and iron based on the electric potential (y-axis) and the pH (x-axis) of the aqueous solution. Reference numbers 202 and 204 of FIG. 2 represent the stability limits of water. Reference number 206 refers to the stability boundary between chloride ions and hypochlorite at pH greater than about 7. At a specific pH greater than about 7, when the voltage is increased to the lesser stability boundary of the hypochlorite 206, the chloride ions may react according to RXN 4 to produce hypochlorite ions. The lesser stability boundary of hypochlorous acid at pH less than about 7 is identified by reference number 208. At a specific pH less than about 7, when the voltage is increased to the lesser stability boundary of the hypochlorous acid 208, the chloride ions may react according to RXN 3 to produce hypochlorous acid. The Pourbaix diagram of FIG. 2 describes the physical state (e.g., dissolved or solid) of the iron and chloride species as a function of pH. In order to initiate coagulation (i.e., formation of insoluble particles), iron (III) ions have to be in a solution where the pH is ranging between 2.5 and 12.5. Below 2.5 and above 12.5, the iron (III) species are soluble in water as $Fe^{3+}_{(aq)}$ and $FeO_4^{2-}_{(aq)}$ ions. Solubility of iron(II) species is also a consideration. The iron(II) species should remain soluble until transformed into iron(III). At pH less than about 8.5 or greater than about 10.5, the insoluble iron(II) hydroxide is not the favored physical state. Thus, the pH should be less than 8.5 or greater than 10.5. Therefore, in some embodiments, the coagulation system 100 may be operated at an operational pH of from 2.5 and 8.5 or from 10.5 to 12.5. As previously discussed, the produced water may have a pH of from 4 to 7. In some embodiments, the coagulation system may operate at an operational pH of from 2.5 to 8, from 2.5 to 7, from 3 to 8.5, from 3 to 8, from 3 to 7, from 4 to 8.5, from 4 to 8, or from 4 to 7. Operating the coagulation system at a pH of 4 to 7, which is similar to the pH of the incoming produced water, may reduce the operating costs of the system by eliminating the need to adjust the pH of the produced water with additional industrial chemicals.

Referring back to the FIG. 1, operation of the electro-chlorination process using the electro-chlorination system 104 of the chlorination-assisted coagulation system 100 will be described. The produced water 102 may be introduced to the electro-chlorination vessel 110. In the electro-chlorination vessel 110, the produced water 102 contacts the electrodes 174. The electric power source 112 produces an electric potential between electrodes 174, such as between the cathode 114 and the anode 116, causing electric current to pass through the produced water 102 in the electro-chlorination vessel 110. In some embodiments, the electric potential (voltage) may be greater than or equal to 1.5 V, or even greater than or equal to 1.8 V. For example, the voltage may be from 1.5 V to 5 V or from 1.8 V to 5 V. The electric current may cause electrolysis of the produced water 102 to convert the chloride ions into strong oxidant, such as hypochlorous acid under acidic conditions or hypochlorite under basic conditions. The chlorinated produced water 118 may be passed from the electro-chlorination vessel 110 to the coagulation vessel 130. The chlorinated produced water 118 may include a mixture of produced water and the hypochlorous acid or the hypochlorite. The electro-chlorination system 104 may be performed continuously, semi-continuously, or batchwise.

In some embodiments, the electro-chlorination system 104 may include electrodes 174 that are non-sacrificial electrodes. The selection of the electrode material for the electrodes 174 may impact the effectiveness of the chlorination-assisted coagulation process. For example, a limitation of conventional electrocoagulation processes is that, during operation, the sacrificial aluminum-based or iron-based electrodes are consumed unevenly leading to uneven reaction conditions throughout the electro-chlorination and coagulation process. Furthermore, in some cases, an aluminum-based or iron-based chip from the unbalanced consumption of the electrodes may short circuit the electrical system, which may trigger a process shut-down. Using non-sacrificial electrodes may overcome these limitations by providing smooth operation, even process conditions, and consistent performance of the chlorination-assisted coagulation process over time.

The electrodes 174 may be non-sacrificial electrodes having at least an outer surface made of an electrode material that is not consumed or corroded by the process conditions of the chlorination-assisted coagulation process. In some embodiments, one or more than one of the electrodes 174 may be made of an electrode material that includes, but is not limited to, graphite, Early Transition metals, rare earth elements, or combinations of these. As used in this disclosure, the term "Early Transition metals" refers to metals in CAS groups IIIB, IVB, VB, and VIB of the IUPAC periodic table. Rare earth elements refer to elements in the Lanthanide series of the IUPAC periodic table. In some embodiments, the electrode material may include one or more of, carbon, cerium, chromium, hafnium, gold, molybdenum, samarium, silicon, silver, tantalum, tungsten, sulfur, zirconium, or combinations of these. The electrode material may also include any of the oxides of zirconium, molybdenum, gold, silver, tantalum, tungsten, chromium, carbon, sulfur, silicon, or combinations of these. Examples of carbon materials that may be suitable for the electrode material may include, but are not limited to amorphous carbon, graphite, graphene, graphene oxide, carbon nanotubes, carbon films (such as pyrolyzed carbon films, boron-doped diamond films, diamond-like carbon films), pyrolytic graphite, other types of carbon, or combinations of these. In some embodiments, the electrodes may be made from tantalum or an oxide of tantalum, such as tantalum pentoxide ($Ta_2O_5$). In still other embodiments, the electrodes 174 may include an outer layer of the electrode material supported on an inert support material so that the outer surfaces of the electrodes 174 comprise the electrode material. Suitable inert support materials may include, but are not limited to, glass, ceramic, titanium oxide, other inert support materials, or combinations of these.

Use of electrodes 174 made from these previously described materials may reduce or prevent corrosion of the electrodes under the condition experienced during the chlorination-assisted coagulation process. Therefore, these non-sacrificial electrodes may require less frequent replacement due to corrosion or consumption of the electrodes. Replacing electrodes can be an expensive job in a petroleum production facility due to the cost of the electrodes as well as the cost of shutting down the chlorination-assisted coagulation process, opening it to atmosphere to replace the electrodes and then purging the air in the system before putting it back to operation. The use of non-sacrificial electrodes may therefore significantly reduce the costs of operating and maintaining the chlorination-assisted coagulation system 100. For example, an anaerobic electrocoagulation system with consumable electrodes might not be economical to operate for industrial applications where continuous operation is required in classified explosive areas, such as in crude oil production facilities. This is because consumable electrodes require semi-batch operation and frequent replacement of electrodes, thus increasing the capital expenses (CAPEX) of the coagulation system compared to a system using non-sacrificial electrodes. Additionally, replacement of consumable electrodes in a semi-batch operation is manpower intensive, thus resulting in greater operating expenses (OPEX) compared to using non-sacrificial electrodes.

Certain materials, such as iron or aluminum for example, may not be suitable for use as the electrode material due to consumption of the electrode material during the electro-chlorination or coagulation processes, which may lead to uneven consumption of the electrodes 174 and increased probability of short circuiting the electro-chlorination system as previously discussed. Additional materials may not be suitable for use at the electrode material because of observed corrosion of these electrode materials in the presence of produced water having a high concentration of hydrogen sulfide (sour produced water).

Figure 9:
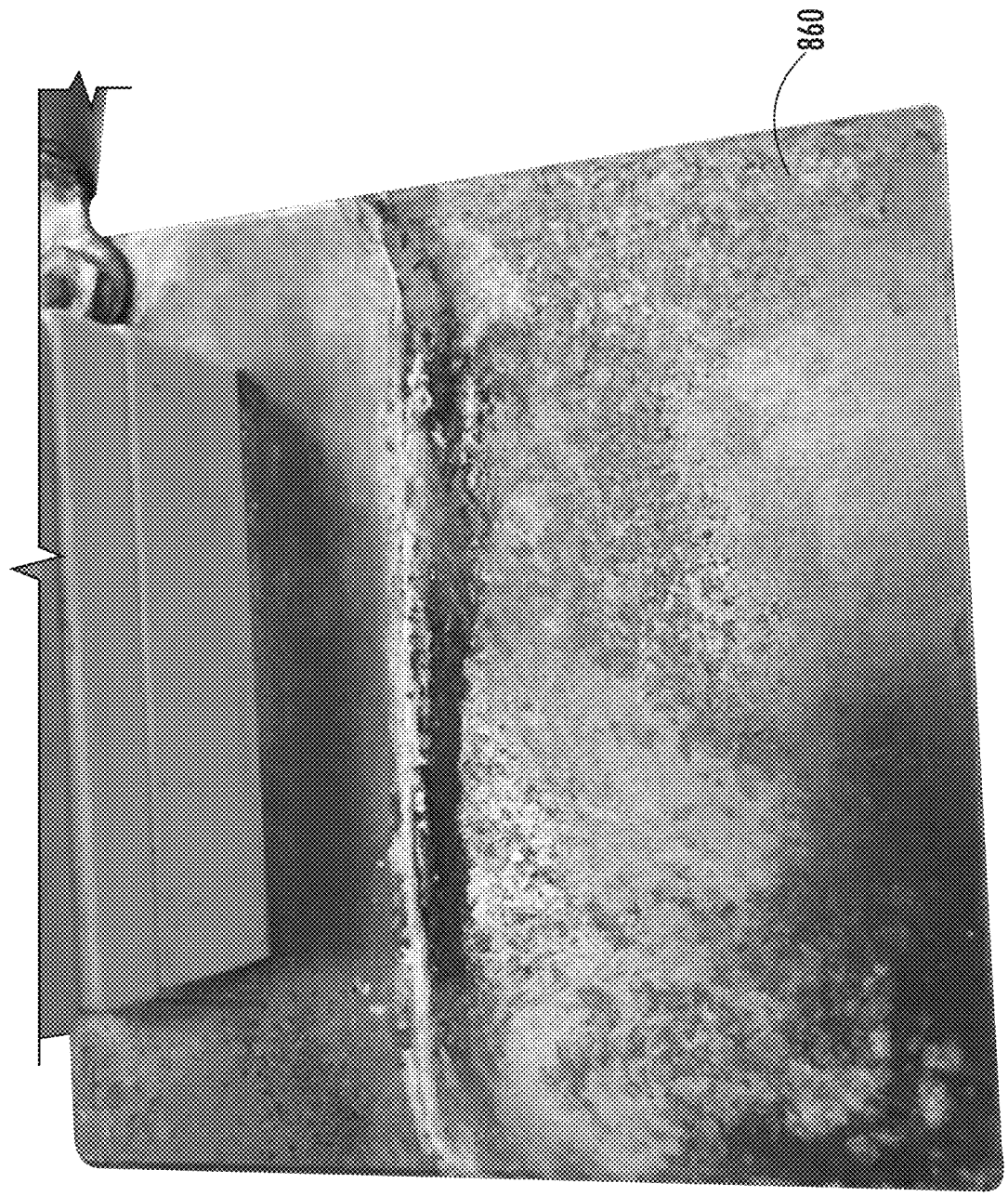
FIG. 9 is a photograph of a non-sacrificial tantalum electrode, according to one or more embodiments of the present disclosure, which was used to conduct the chlorination-assisted coagulation process using the lab apparatus in FIG. 7.
Figure 10:
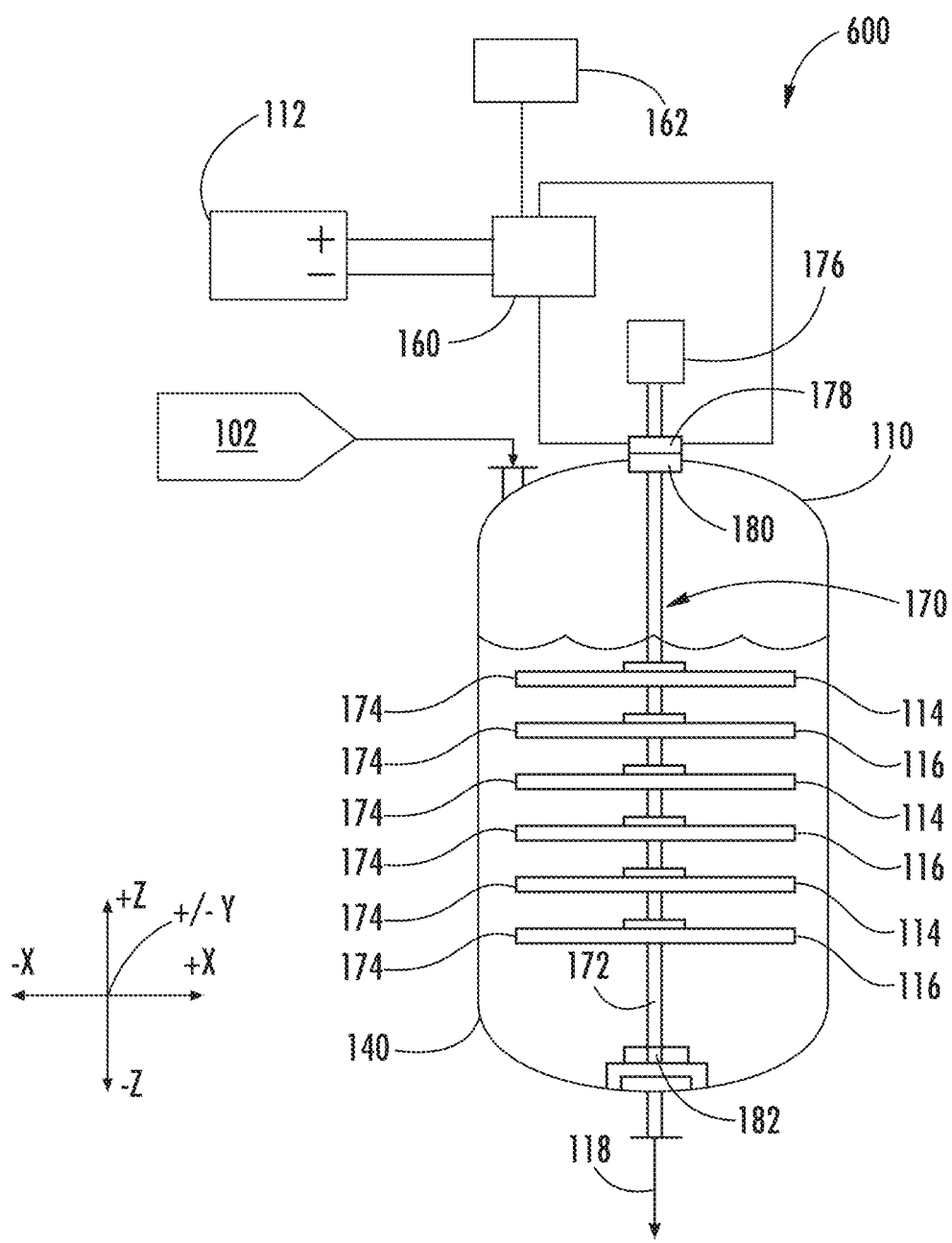
FIG. 10 schematically depicts an electrode rotation system of the chlorination-assisted coagulation process of FIG. 6, according to one or more embodiments of the present disclosure.

Referring to FIG. 10, in some embodiments, the chlorination-assisted coagulation system 100 may include a plurality of electrodes 174, which may include a plurality of cathodes 114 and a plurality of anodes 116. The electrodes 174 may have a shape that provides sufficient surface area for conducting the electro-chlorination reactions. For example, in some embodiments, the electrodes 174 may be flat plates, such as the flat plate electrode shown in FIG. 9. These flat plate electrodes may have a shape of the electrode surface that is rectangular, square, circular, elliptical, polygonal, or any other shape. In some embodiments, the electrodes 174 may be rectangular-shaped flat plates. Alternatively, in other embodiments, the electrodes 174 may be circular flat plates. The electrodes 174 may have a surface area of the electrode surface great enough to provide sufficient contact between the electrodes 174 and the aqueous composition in the electro-chlorination system 104 (FIG. 1). Referring to FIGS. 1, 4, 5, and 6, in some embodiments, the electrodes 174 may be vertically positioned in the electro-chlorination vessel 110 or the treatment vessel 140 (FIG. 6). As used in this disclosure, vertically positioned refers to an orientation of the electrode 174 in which a greatest dimension of the electrode 174 is aligned with the +/−Z axis of FIGS. 1, 4, 5, and 6. The electrodes 174 may be vertically positioned in the top, middle, or bottom portions of the electro-chlorination vessel 110 or the treatment vessel 140. Referring to FIG. 10, in other embodiments, the plurality of electrodes 174 may be horizontally positioned in the electro-chlorination vessel 110. As used in this disclosure, horizontally positioned refers to an orientation of the electrodes 174 in which the greatest dimensions of the electrodes 174 are substantially perpendicular to the +/−Z axis of the coordinate axis of FIG. 10. The electrodes 174 may also be horizontally positioned in the treatment vessel 140 (FIG. 6). The electrodes 174 may be horizontally positioned in the top portion, middle portion, or bottom portion of the electro-chlorination vessel 110 (FIG. 10) or the treatment vessel 140 (FIG. 6). In some embodiments, the electrodes 174 may be vertically or horizontally positioned in the middle portion or bottom portion of the electro-chlorination vessel 100 or the treatment vessel 140 to enable hydrogen gas generated at the electrodes 174 to be used as a flotation gas for removing oil droplets and/or solids.

As shown in RXN 3 and RXN 4, the electro-chlorination process, operating in anaerobic conditions, may produce hydrogen gas at the surface of the cathode 114. The hydrogen gas may form microbubbles, which may separate from the surface of the cathode 114 and travel upward through the produced water in the electro-chlorination system 104. The hydrogen gas may be used to provide mixing to the aqueous composition or drive flotation of solid particles and/or oil droplets in the produced water. The hydrogen gas may ultimately be passed out of the electro-chlorination system 104. In some embodiments, the production of hydrogen gas microbubbles during electro-chlorination may be used to drive the flotation of coagulated solids, flocculated solids, oil droplets, or combinations of these.

Figure 4:
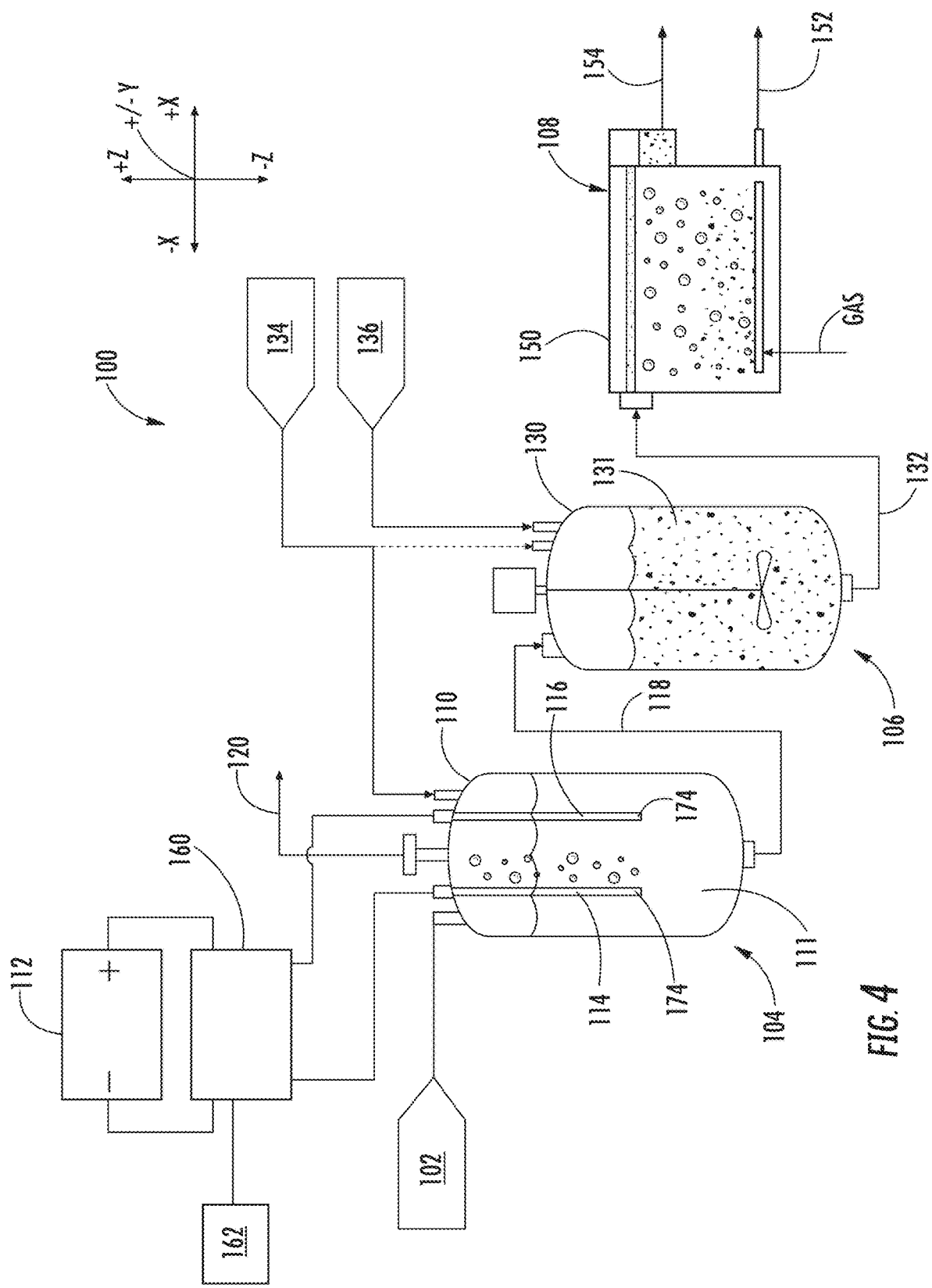
FIG. 4 schematically depicts another embodiment of a chlorination-assisted coagulation system, according to one or more embodiments of the present disclosure.

Referring to FIG. 4, in some embodiments, the chlorination-assisted coagulation system 100 may include an electrode polarity alternator 160 operable to periodically alternate the polarity of the electrodes 174. For example, in some embodiments, the electrode polarity alternator 160 may include an electro-mechanical device operable to switch the terminals of the electric power source 112 to which each of the electrodes 174 is electrically coupled. Alternatively, in other embodiments, the electrode polarity alternator 160 may include finely tuned electrical circuitry operable to alternate the polarity of the electrodes 174. For example, in some embodiments, the electrode polarity alternator 160 may include an electrical waveform generator operable to generate one or more of a square-wave waveform, rectangular waveform, pulse waveform, sine waveform, triangular waveform, saw-tooth waveform, or other suitable type of waveform. In some embodiments, the electrode polarity alternator 160 may be communicatively coupled to a controller 162 for controlling alternation of the polarity of the electrodes.

Alternating the polarity of the electrodes 174 with the electrode polarity alternator 160 may reduce or prevent deposition of materials on the outer surfaces of the electrodes 174, which may reduce or prevent fouling of the electrodes 174 during operation of the chlorination-assisted coagulation process. In some embodiments, alternating the polarity of the non-sacrificial electrodes 174 may shift generation of hydrogen microbubbles between the electrodes 174 to more evenly distribute the hydrogen microbubbles throughout the volume of the produced water.

Referring to FIG. 10, in some embodiments, the chlorination-assisted coagulation system 600 may include an electrode rotation system 170 operable to translate or rotate the electrodes within the treatment vessel 140. Although the electrode rotation system 170 is depicted as being integrated into the single treatment vessel 140 of the chlorination-assisted coagulation system 600 depicted in FIG. 10, the electrode rotation system 170 may also be incorporated into the electro-chlorination vessel 110 of the chlorination-assisted coagulation systems 100 depicted in FIGS. 1, 4, and 5. The electrode rotation system 170 may be operable to rotate or revolve the electrodes 174 within the treatment vessel 140 to distribute the generation of hydrogen bubbles or microbubbles evenly throughout the produced water disposed within the treatment vessel 140. In some embodiments, the electrodes 174 may be rotated or revolved within the treatment vessel 140 to distribute the hydrogen gas bubbles evenly across a cross-section of the treatment vessel 140. In some embodiments, the electrodes 174 may have a hydrodynamic shape that may enable distribution of the hydrogen gas microbubbles throughout the treatment vessel 140 while the electrodes 174 are rotated or revolved within the treatment vessel 140.

Referring to FIG. 10, in some embodiments, the electrode rotation system 170 may include a shaft 172 extending into the internal volume of the treatment vessel 140 and the plurality of electrodes 174 coupled to the shaft 172 for rotation with the shaft. In some embodiments, the plurality of electrodes 174 may include a plurality of cathodes 114 and a plurality of anodes 116. The shaft 172 may be rotationally coupled to the treatment vessel 140 by an upper bearing 180 and, optionally, a lower bearing 182. A drive 176, such as an electric motor, or other suitable drive mechanism, may be operatively coupled to the shaft 170 and may be operable to rotate the shaft 170 and electrodes 174 relative to the treatment vessel 140. The electrode rotation system 170 may also include a rotating contactor 178 operable to electrically couple the electrodes 174 to the power source 112 and enable rotation of the electrodes 174 relative to the power source 112. For example, the rotating contactor 178 may include a slip ring or other rotating contactor, or combinations of these. Other configurations of the electrode rotation system 170 are contemplated.

In some embodiments, the chlorination-assisted coagulation system 100 may include both the electrode polarity alternator 160 and the electrode rotation system 170. Referring to FIG. 10, the rotating contactor 178 may be electrically coupled to the electrode polarity alternator 160. The electrode polarity alternator 160 may be electrically coupled to the electric power source 112 and may be operable to alternate the polarities of the electrodes 174 coupled to the shaft 172 of the electrode rotation system 170. As previously described, the electrode polarity alternator 160 may be communicatively coupled to the controller 162 for controlling operation of the electrode polarity alternator 160. Therefore, in these embodiments, the electrodes 174 may be physically rotated or revolved within the treatment vessel 140 by the electrode rotation system 170, and simultaneously the polarity of the electrodes 174 may be alternated by the electrode polarity alternator 160. The combination of rotating or revolving electrodes having a suitable hydrodynamic design and finely tuned electrical circuitry to alternate the polarity of the electrodes may result in improved removal of organic and inorganic compounds from the produced water.

The electro-chlorination process may be conducted under anaerobic conditions over a pH range of from 2.5 to 8.5, such as from 2.5 to 8, from 2.5 to 7, from 3 to 8.5, from 3 to 8, from 3 to 7, from 4 to 8.5, from 4 to 8, or from 4 to 7, as previously discussed in this disclosure. Alternatively, in some other embodiments, the electro-chlorination process may be conducted under anaerobic conditions over a pH range of from 10.5 to 12.5. In some embodiments, the electro-chlorination process may be conducted at the pH of the produced water. For example, the produced water may have a pH of from 4 to 7, and the electro-chlorination process may be conducted anaerobically under the slightly acidic pH range of 4 to 7 to avoid adjusting the pH of the produced water.

In some embodiments, the electro-chlorination process may be conducted under conditions sufficient to produce just enough of the oxidant (hypochlorous acid or hypochlorite) to initiate the iron (III) coagulation process. In some embodiments, electro-chlorination process may produce a concentration of oxidant, including hypochlorous acid, hypochlorite ions, or both, of from 0.1 mg/L to 10,000 mg/L, such as from 0.1 mg/L to 4000 mg/L, from 0.1 mg/L to 600 mg/L, from 0.1 mg/L to 200 mg/L, from 0.1 mg/L to 50 mg/L, from 50 mg/L to 10,000 mg/L, from 50 mg/L to 4000 mg/L, from 50 mg/L to 600 mg/L, from 50 mg/L to 200 mg/L, from 200 mg/L to 10,000 mg/L, from 200 mg/L to 4000 mg/L, from 200 mg/L to 600 mg/L, from 600 mg/L to 10,000 mg/L, from 600 mg/L to 4000 mg/L, or from 4000 mg/L to 10,000 mg/L. For example, in some embodiments including treatment of sweet produced water, the electro-chlorination process may be configured to produce from 0.1 mg/L to 200 mg/L, or 0.1 mg/L to 50 mg/L oxidant, including hypochlorous acid, hypochlorite ions, or both. Alternatively, in other embodiments including treatment of sour produced water, the electro-chlorination process may be configured to produce from 600 mg/L to 10,000 mg/L oxidant, including hypochlorous acid, hypochlorite ions, or both. In some embodiments, the electro-chlorination process may produce from 200 mg/L to 4000 mg/L oxidant, including hypochlorous acid, hypochlorite ions, or both, under operation at 3.5 bar (350,000 Pascals).

The electro-chlorination process may be operated at a current potential (voltage) in volts (V) sufficient to conduct the electro-chlorination under anaerobic conditions. The electro-chlorination may proceed under anaerobic conditions in the absence of oxygen when the voltage is greater than or equal to the reaction potential for the reaction, which may depend on the pH conditions of the produced water. For anaerobic production of hypochlorous acid from chloride ions under acidic conditions having pH less than 7, the reaction potential to produce the hypochlorous acid is −1.49 V as indicated in RXN 3. Therefore, under acidic conditions, the electro-chlorination reactions proceed anaerobically when the voltage is greater than or equal to 1.49 V. For anaerobic production of hypochlorous acid from chloride ions under basic conditions having pH greater than 7, the reaction potential to produce the hypochlorite is −1.72 V. Therefore, under basic conditions, the electro-chlorination reactions proceed when the voltage is greater than or equal to 1.72 V. For example, if the voltage is set to 1.6 V, the anaerobic conversion of chloride ions to hypochlorous acid under acidic conditions will occur because the magnitude of the current potential is greater than the magnitude of the reaction potential of −1.49 V provided in RXN 3, previously presented in this disclosure. However, in basic conditions, the anaerobic conversion of chloride ions to hypochlorite ions will not occur because the current potential is less than the magnitude of the reaction potential of −1.72 shown in RXN 4, previously presented in this disclosure. If the current potential is less than 1.49 V, then the conversion of chloride ions to hypochlorous acid or hypochlorite ions would not occur under anaerobic conditions. In some embodiments, the electrical potential difference applied at the electrodes (voltage) may be from 1.5 V to 5.0 V, from 1.5 V to 4.0 V, from 1.5 V to 3.0 V, from 1.5 V to 2.0 V, from 1.5 V to 1.8 V, from 1.7 V to 5.0 V, from 1.7 V to 4.0 V, from 1.7 V to 3.0 V, from 1.7 V to 2.0 V, from 1.8V to 5.0 V, from 1.8 V to 4.0 V, 1.8 V to 3.0 V, or from 1.8 V to 2.0 V.

The amount of electric current passed through the produced water between the electrodes may control the yield of the strong oxidants. The amount of chloride ions in the produced water converted to the strong oxidants hypochlorous acid or hypochlorite is proportional to the magnitude of the electric current passed through the produced water by the electrodes. Therefore, the amount of oxidant formed may be controlled by controlling the amount of electric current passed through the produced water between the electrodes, such as by controlling the current density between the electrodes. Thus, electro-chlorination process can be fine-tuned by controlling the amount of electric current to control the production of the strong oxidant. The electro-chlorination system may include an oxidation-reduction potential (ORP) sensor to detect the amount of strong oxidant produced. The ORP may be positioned within the electro-chlorination vessel 110 (FIG. 1) or downstream of the electro-chlorination vessel 110. In some embodiments, the chlorination-assisted coagulation system 100 may include a plurality of ORP sensors positioned within the electro-chlorination vessel 110, downstream of the electro-chlorination vessel 110, downstream of the coagulation vessel 130, or combinations of these. The amount of electric current may be adjusted based on the amount of strong oxidant detected by the ORP sensor.

The electro-chlorination process may be operated at current density that is sufficient to produce enough of the strong oxidants (hypochlorous acid or hypochlorite) to initiate and maintain the conversion of iron (II) in the produced water to iron (III) to initiate and maintain the coagulation process. In some embodiments, the current density may be in a range of from 1 milliampere per square centimeter (mA/cm$^2$) to 1 ampere per square centimeter (A/cm$^2$).

The electro-chlorination process, as well as the chlorination-assisted coagulation process as a whole, may be conducted at operating conditions typical in hydrocarbon production and hydrocarbon refining operations. For example, the chlorination-assisted coagulation process, including the electro-chlorination process, may be conducted at a pressure of the produced water generated by the production process. In some embodiments, the chlorination-assisted coagulation processes, including the electro-chlorination process, may be conducted at a pressure greater than atmospheric pressure. For example, the chlorination-assisted coagulation processes, including the electro-chlorination process, may be conducted at a pressure of from 1 bar (100 kilopascals) to 10 bars (1,000 kilopascals). Referring to FIG. 1, in some embodiments, the electro-chlorination vessel 110, the coagulation vessel 130, or both may be pressure vessels capable of operating at pressures of from 100 kPa to 1,000 kPa.

In contrast, electro-chlorination of produced water under aerobic conditions at pressures greater than atmospheric pressure may cause formation of sulfates, which may block the rock pores of the subterranean formation when the treated produced water is re-injected back into the formation. As previously discussed in this disclosure, produced water may include dissolved hydrogen sulfide gases. Under pressure, the oxidants employed in aerobic chlorination may react with the sulfur of the hydrogen sulfide to produce sulfates. These sulfates may form insoluble salts with barium, calcium, and strontium ions when the treated produced water is re-injected back into the formation. These insoluble salts may deposit in pores in the rock of the formation and plug these pores in the rock. The result may be a reduction in the production of petroleum from the formation. Additional pressure in an aerobic electro-chlorination process may also cause additional oxygen to dissolve into the produced water, which may require addition of an oxygen scavenger downstream of the treatment process to further treat the water to meet the oxygen-level specifications for reuse of the water in industrial processes or re-injection of the water into the reservoir formation. Therefore, operating the chlorination-assisted coagulation process of this disclosure in anaerobic conditions may reduce or prevent the formation of sulfates in the treated produced water and reduce or eliminate the need to introduce an additional oxygen scavenger to remove the excess dissolved oxygen.

In some embodiments, the chlorination-assisted coagulation process, including the electro-chlorination process, may be conducted at a temperature typical of the hydrocarbon production or hydrocarbon refining operations. For example, in some embodiments, the chlorination-assisted coagulation processes, including the electro-chlorination process step, may be conducted at a temperature of from 25 degrees Celsius (° C.) to 80° C. Referring to FIG. 1, in some embodiments, the electro-chlorination vessel 110, the coagulation vessel 130, or both may include one or more heat transfer systems for maintaining the temperature of the produced water 102 throughout the chlorination-assisted coagulation process.

In some embodiments, the chlorination-assisted coagulation process 100, including the electro-chlorination process 104, may be conducted at a pressure and temperature typical of the last stage of the Gas Oil Separation Plant (GOSP) process where the aqueous compositions introduced to the chlorination-assisted coagulation process 100 may be taken from the water handling facility, which is commonly referred to as the Water-Oil Separator (WOSEP). Under these process conditions, the chlorination-assisted coagulation process 100, including the electro-chlorination process 104, may be conducted at pressures of from 100 kPa to 1000 kPa and at temperatures ranging from 10° C. to 60° C. The aqueous composition obtained from the GOSP and/or WOSEP may include contaminants such as, but not limited to, up to 0.1 vol. % non-dissolved oil, up to 0.1 vol. % fine suspended solid particles, dissolved acid gases such as $CO_2$, $H_2S$, other contaminants, or any combination of these contaminants. In such process conditions, the flow rates of the aqueous composition introduced to the chlorination-assisted coagulation process 100, including the electro-chlorination process 104, may be from 1 cubic meter per hour (m$^3$/hr) to 1000 m$^3$/hr. For example, in some embodiments, the flow rate of aqueous composition introduced to the chlorination-assisted coagulation process 100, including the electro-chlorination process 104, may be from 1 m$^3$/hr to 300 m$^3$/hr, from 10 m$^3$/hr to 1000 m$^3$/hr, from 10 m$^3$/hr to 300 m$^3$/hr, or from 300 m$^3$/hr to 1000 m$^3$/hr. In some embodiments, a residence time of the aqueous composition in the electrochlorination process 100, such as in the electro-chlorination vessel 110, of the chlorination-assisted coagulation process 100 may be from 10 seconds to 10 minutes. In some embodiments, a residence time of the aqueous composition in the coagulation vessel 130 of the chlorination-assisted coagulation process 100 may be from 5 minutes to 60 minutes.

Following the electro-chlorination process, the strong oxidant, such as the hypochlorous acid or hypochlorite, may be reacted with the indigenous dissolved iron (II) species in the produced water to oxidize the iron (II) to iron (III). Oxidizing the indigenous dissolved iron (II) species already present in the produced water to produce the iron (III), which may then be used to coagulate the organic and inorganic contaminants according to the present disclosure, may provide a number of advantages compared to the conventional coagulation and electrocoagulation systems.

Conventional coagulation processes introduce the iron (III) by one of two methods. In the first type of conventional coagulation process, the coagulant, such as iron (III) sulfate ($Fe_2(SO_4)_3$) or aluminum (III) sulfate ($Al_2(SO_4)_3$), is generally added as a solid to the reactor and the coagulation is generally performed in aerobic conditions at atmospheric temperature and pressure. However, the addition of these conventional coagulants will also incorporate oxygen which is detrimental to the quality of the oil recovered from the produced water. Also, adding these conventional coagulants to the produced water produces sulfate ions in the treated produced water. As previously discussed in this disclosure, these sulfates may form insoluble salts with barium, calcium, and strontium ions when the treated produced water is re-injected back into the formation. These insoluble salts may deposit in pores in the rock of the formation and plug these pores in the rock, causing flow restrictions in the rock. The result may be a reduction in the production rate of hydrocarbons from the formation due to the flow restrictions. The use of conventional coagulants under aerobic conditions also result in scale formation throughout the treatment facility and the pipeline network, and the increased concentrations of oxygen increases the rate of corrosion of equipment and piping. Further, the use of conventional coagulants under aerobic conditions may also result in bacterial growth and may change the properties of the water. Last, aluminum sulfate ($Al_2(SO_4)_3$) is a chemically hazardous substance and presents safety issues with handling and storage of the material.

The second type of conventional coagulation process involves electrocoagulation using sacrificial iron or aluminum electrodes. In this type of conventional coagulation process, sacrificial electrodes and the aqueous composition may form a battery and the electric current may be provided by the battery formed by the sacrificial electrodes and the aqueous solution. The iron or aluminum is consumed from the electrodes to produce iron (III) or aluminum (III) ions in the aqueous solution. It is noted that typical electrocoagulation processes use sacrificial electrodes of iron (0) or aluminum (0) metal, which go from an oxidate state (0) to (III). Conventional electrocoagulation can be performed under aerobic conditions according to Reaction 5 (RXN 5) in acidic conditions or according to Reaction 6 (RXN 6) in basic conditions. As shown subsequently, for RXN 5, the voltage potential of the battery formed by the electrodes and the oxygen dissolved in the aqueous composition is 1.269 V. Conventional electrocoagulation can also be performed under anaerobic conditions according to Reaction 7 (RXN 7) for acidic conditions and Reaction 8 (RXN 8) for basic conditions. For RXN 8, the reaction electrode potential is negative, which means that the reaction does not occur spontaneously. For RXN 8, a current potential of −0.7877 V must be supplied at the electrodes for the reaction to proceed. RXN 5 through RXN 8 are provided subsequently in this disclosure.

Aerobic Electrocoagulation—Acidic Conditions

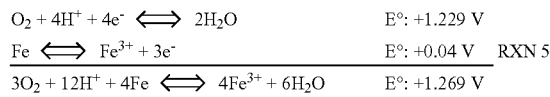

Aerobic Electrocoagulation—Basic Conditions

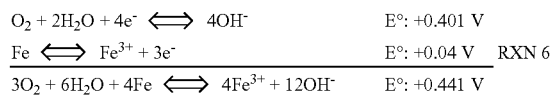

Anaerobic Electrocoagulation—Acidic Conditions

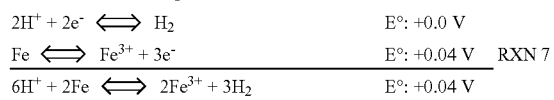

Anaerobic Electrocoagulation—Basic Conditions

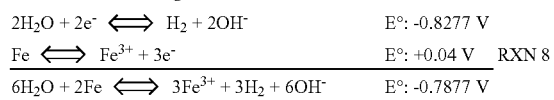

Conventional electrocoagulation processes are typically performed in aerobic conditions to avoid hydrogen production. Hydrogen gas is flammable and usually not desirable in other industries. Further, in the presence of oxygen, the reaction of oxidation of the iron electrode into iron (III) species is a spontaneous reaction, as shown by the positive reaction potential in RXN 5 and RXN 6. In comparison, the same conventional electrocoagulation process run under anaerobic conditions would occur very slowly in acidic conditions, as shown by the very small positive reaction potential of RXN 7. In basic conditions shown in RXN 8, electrocoagulation would not be spontaneous under anaerobic conditions and therefore would not proceed in the formation of iron (III) species. A voltage of at least 0.7877V would be required for the transformation of iron (0) to iron (III) to occur anaerobically under basic conditions.

In contrast to conventional coagulation processes, the chlorination-assisted coagulation processes described in this disclosure do not require the addition of a coagulant compared to the conventional coagulation processes which require addition of a solid coagulant or consumption of a consumable electrode to produce the coagulant. The chlorination-assisted coagulation processes instead use the iron (II) compounds already present in the produced water and/or added to the produced water. As previously discussed, the hypochlorous acid or hypochlorite produced during the electro-chlorination step of the chlorination-assisted coagulation process may be reacted with the iron (II) compounds in the produced water to convert the iron (II) to iron (III).

The strong oxidant, such as the hypochlorous acid (HClO) or hypochlorite (ClO⁻) produced during the chlorination step, may readily react with the iron (II) species in the produced water to produce iron (III). This iron (III) may be insoluble or only partially soluble in the produced water at pH of from 3 to 10. A schematic summary of the cascade of redox reactions in the formation of partially soluble iron (III) is shown in Reaction 9 (RXN 9) and Reaction 10 (RXN 10), which are provided subsequently in this disclosure. RXN 9 illustrates the reactions to form iron (III) under acidic conditions, and RXN illustrates the reactions to form iron (III) under basic conditions.

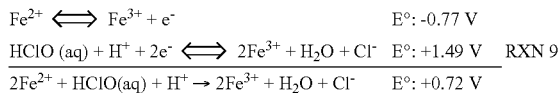

Formation of Iron (III)—Acidic Conditions $Fe^{2+} \rightleftharpoons Fe^{3+} + e^-$   $E°: -0.77$ V
$HClO (aq) + H^+ + 2e^- \rightleftharpoons 2Fe^{3+} + H_2O + Cl^-$   $E°: +1.49$ V   RXN 9
$2Fe^{2+} + HClO(aq) + H^+ \rightarrow 2Fe^{3+} + H_2O + Cl^-$   $E°: +0.72$ V

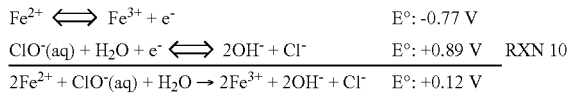

Anaerobic Electrocoagulation—Basic Conditions $Fe^{2+} \rightleftharpoons Fe^{3+} + e^-$   $E°: -0.77$ V
$ClO^-(aq) + H_2O + e^- \rightleftharpoons 2OH^- + Cl^-$   $E°: +0.89$ V   RXN 10
$2Fe^{2+} + ClO^-(aq) + H_2O \rightarrow 2Fe^{3+} + 2OH^- + Cl^-$   $E°: +0.12$ V Referring to FIG. 2, a Pourbaix diagram of an aqueous solution comprising iron and chloride ions is illustrated. The Pourbaix diagram also describes the physical state, such as dissolved or solid, of the relevant iron and chloride species as a function of pH. FIG. 2 shows that in the pH range of from 2.5 to 8.5, the iron (II) ions, hypochlorous acid, and hypochlorite ions are soluble, and the iron (III) species are insoluble. Thus, the coagulation process will occur in a pH range of from 2.5 to 8.5, or from 3 to 8, as previously discussed.

Converting the indigenous iron (II) present in the produced water to iron (III) to initiate coagulation according to embodiments of the chlorination-assisted coagulation process of this disclosure does not result in addition of sulfate ions to the treated produced water. Further, in the chlorination-assisted coagulation system, no sulfate ions are produced through reaction of sulfur with oxygen because the process does not introduce oxygen to the produced water. Thus, treated produced water produced by the chlorination-assisted coagulation processes has a substantially lesser concentration of sulfates and is more suitable for re-injection back into the formation. The treated produced water produced by the chlorination-assisted coagulation processes with the lesser concentration of sulfates may also be more suitable for further treatment processes aimed at water re-use or recycle, such as water desalination using membrane technology.

Additionally, generating the iron (III) species by converting iron (II) compounds in the produced water to iron (III) does not require introduction of the iron through consumption of sacrificial electrodes. As previously discussed, use of sacrificial electrodes may result in uneven consumption of the electrodes leaving to uneven reaction conditions over time and potential short circuiting of the electrodes due to chips or pieces liberated from the electrode as a result of uneven consumption of the electrode material. By using non-sacrificial electrodes and converting iron (II) to iron (III) to provide the coagulant, the chlorination-assisted coagulation process of this disclosure may provide consistent operating conditions over time and may reduce the frequency of or eliminate periodic replacement of the electrodes. The use of non-sacrificial electrodes in the chlorination-assisted coagulation process may also enable design of the shape and surface of the electrodes to manipulate the electrical field to evenly distribute the microbubbles inside the electro-chlorination vessel. This may result in even operating conditions relative to the spatial position on the surface of the electrodes.

In addition to converting indigenous iron (II) to iron (III), the strong oxidants hypochlorous acid or hypochlorite may also oxidize organic compounds, such as phenols, crude oil droplets, or other dissolved organics, which may be toxic or environmentally hazardous, into environmentally friendly compounds such as carbon dioxide or other smaller organic compounds. For example, in some embodiments, highly toxic phenol may be oxidized by the strong oxidant into smaller organic molecules to reduce or remove the phenol from the produced water to less than non-detectable concentrations. Some of the environmentally friendly compounds produced by the oxidation of organic compounds by the strong oxidants may be useful chemicals. For example, the strong oxidants produced during the electro-chlorination process step may oxidize at least a portion of the oil and other dissolved organic compounds in the produced water to convert the crude oil and other dissolved organic compounds into carboxylic acids, or carboxylate salts depending on the reaction conditions. The carboxylic acids or carboxylate salts may exhibit surfactant properties that may be beneficial as assisting crude oil recovery chemicals, if re-injected into an oil reservoir.

Referring to FIG. 1, oxidation of the indigenous iron (II) to iron (III) by the strong oxidant may partially occur in the electro-chlorination vessel 110, the coagulation vessel 130, or both. In some embodiments, oxidation of the iron (II) to iron (III) by the strong oxidant may begin in the electro-chlorination vessel 110 and continue as the chlorinated produced water stream 118 is passed from the electro-chlorination vessel 110 to the coagulation vessel 130.

The coagulation of organic and inorganic compounds may require insoluble (or partially soluble) particles that are positively charged. Such particles may include, for example, iron (+III) species, aluminum (+III) species, or both. However, iron salts may be particularly advantageous because iron has more than two oxidation states (0, +II, and +III), whereas aluminum has only two oxidation states (0 and +III). Furthermore, iron (+II) species are soluble in the pH range of operation, compared to iron (+III) compounds, which are partially soluble or insoluble in the range of pH from 2.5 up to 8.5, and preferably in the produced water pH conditions of from 4 to 7. The chlorination-assisted coagulation process described in this disclosure uses iron (III) for coagulating the organic and inorganic compounds.

Referring to FIG. 1, in the chlorination-assisted coagulation system 100 depicted, the chlorinated produced water stream 118 may be passed to the coagulation vessel 130 of the coagulation system 106. In some embodiments, the coagulation system 106 may optionally include an agitation system 126 for mixing the chlorinated produced water 118 during the coagulation process. The agitation system 126 may include, but is not limited to, one or more agitators, mixers, bubblers, aerators, baffles, other devices capable of mixing the contents of the coagulation vessel 130, or combinations of these.

Additionally, the coagulation system 106 may include one or more sensors 164 (FIG. 5) (not shown) that may be used for controlling operation of the chlorination-assisted coagulation process. The sensor 164 may be operable to measure a property of the aqueous solution in the electro-chlorination vessel 110 or downstream of the electro-chlorination vessel 110. For example, the sensors 164 may include one or more of an OPR sensor, pH meter, Total Dissolved Solids (TDS) sensor, optical sensor, other sensor, or combinations of these. In some embodiments, the sensors 164 may be disposed on the produced water 102 feed stream to the chlorination-assisted coagulation system 100 to measure one or more properties of the produced water 102. The properties measured by the sensor 164 may include the concentration of hypochlorous acid or hypochlorite, pH, total dissolved solids, concentration of organics, turbidity, iron concentration, oxidation-reduction potential, or other property of the produced water 102, chlorinated produced water stream 118, coagulated produced water stream 132, treated produced water stream 152, or combinations of these. In some embodiments, the sensors 164 may include an optical sensor that uses ultraviolet, visible, or infrared light to measure the amount of organics in the produced water 102, chlorinated produced water stream 118, coagulated produced water stream 132, treated produced water stream 152, or combinations of these. In some embodiments, the sensors 164 may be positioned in the chlorinated produced water stream 118, the coagulated produced water stream 132, or the treated produced water stream 152 to measure the properties of these streams. The coagulation system 106 may also include a turbidity sensor (not shown) to monitor the concentration of the iron (III) floc in the coagulation vessel 130. In some embodiments, the chlorination-assisted coagulation system 100 may include an in-line colorimetric analyzer for iron to measure the concentration of iron (II) in the produced water 102, chlorinated produced water 118, coagulated produced water 132, treated produced water 152, or combinations of these.

Figure 3:
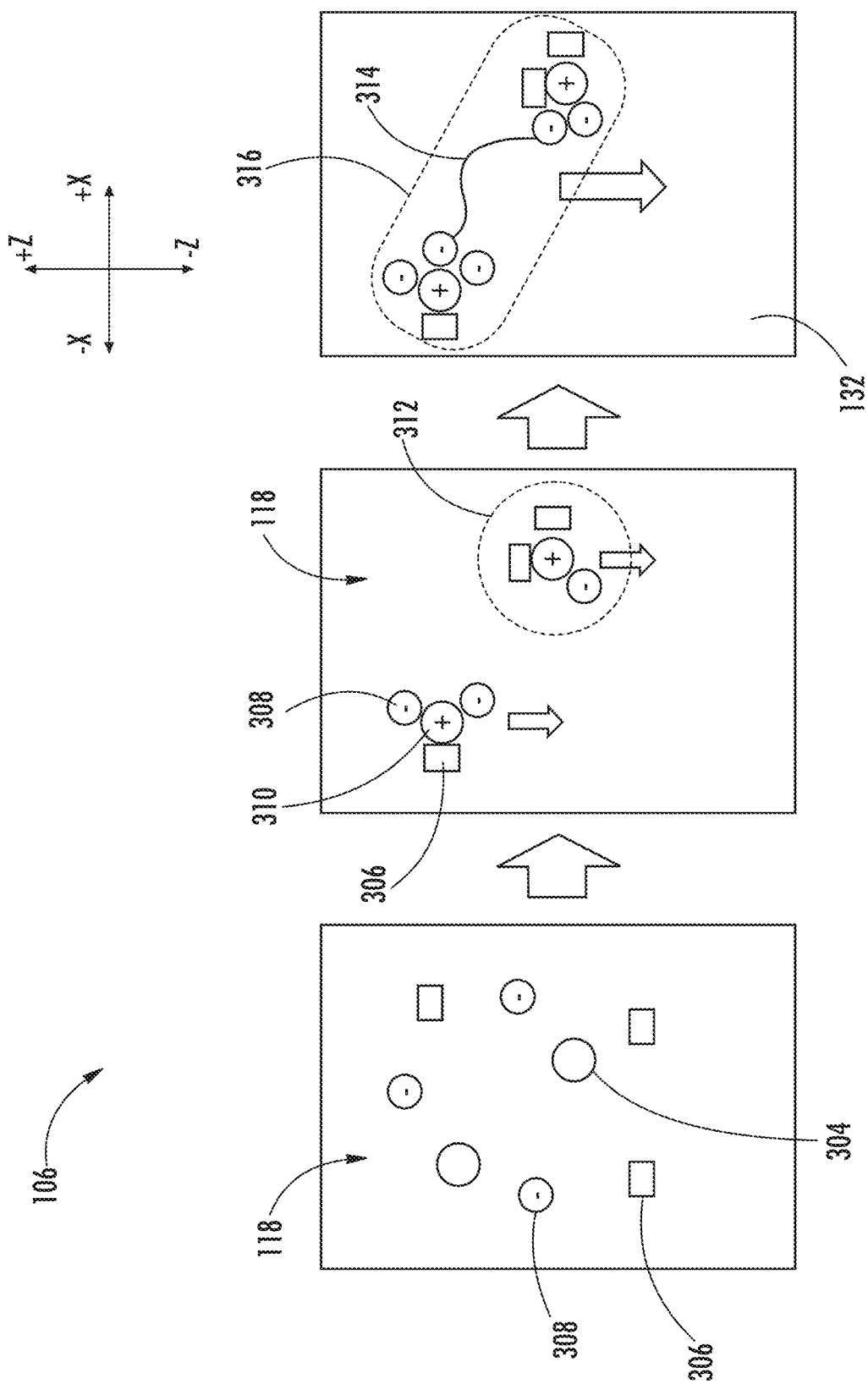
FIG. 3 schematically depicts coagulation and flocculation of organic compounds in the chlorination-assisted coagulation system of FIG. 1, according to one or more embodiments of the present disclosure.

Referring to FIG. 3, a schematic representation of the coagulation process is depicted. During the coagulation process, the soluble iron (II) 304 in the chlorinated produced water 118 may be converted to the insoluble or partially soluble iron (III) particles 310 by the strong oxidants formed in the electro-chlorination step. The iron (III) particles 310 may electrostatically attract dissolved organic compounds 306, such as aromatic compounds, negatively charged colloids 308, or both to form insoluble solid particles 312. As indicated by the downward arrows (i.e., arrows pointing in the −Z direction of the coordinate axis in FIG. 3), the insoluble solid particles 312 may precipitate from the chlorinated produced water 118.

In some embodiments, the coagulation process may be conducted at a pH at which the indigenous iron (II) in the produced water 102 can be converted to iron (III), such as iron (III) hydroxide for example. For example, in some embodiments, the coagulation process may be conducted at a pH of from 2.5 to 8.5, from 2.5 to 8, from 2.5 to 7, from 3 to 8.5, from 3 to 8, from 3 to 7, from 4 to 8.5, from 4 to 8, from 4 to 7, or from 10.5 to 12.5. As with the electro-chlorination process, the coagulation process may be conducted at operating conditions typical in petroleum or natural gas production processes and hydrocarbon refining operations. For example, the coagulation process may be conducted at a pressure of from 1 bar (100 kilopascals) to 10 bars (1,000 kilopascals). The coagulation process may also be conducted at a temperature typical of the hydrocarbon production or hydrocarbon refining operations. For example, in some embodiments, coagulation process may be conducted at a temperature of from 25 degrees Celsius (° C.) to 80° C.

In some cases, the concentration of indigenous iron (II) in the produced water or other aqueous stream may not be sufficient to maintain coagulation of the organic and inorganic contaminants in the produced water sufficient to satisfy the industry standards for water reuse or reinjection into subterranean formations. Therefore, in some embodiments, supplemental iron (II) compounds such as, but not limited to, commercially-available iron (II) chloride ($FeCl_2$), iron (II) acetate, or combinations of these, may be added as a supplement to the process. Addition of supplemental iron (II) compounds may improve the performance of the chlorination-assisted coagulation process.

Referring to FIG. 4, in some embodiments, the supplemental iron (II) compounds 134 may be introduced to the electro-chlorination vessel 110 of the chlorination-assisted coagulation system 100. Introducing the supplemental iron (II) compounds 134 to the electro-chlorination vessel 110 may enable the supplemental iron (II) compounds 134 to be available for conversion to the iron (III) species upon production of the strong oxidant by the electro-chlorination process. In some embodiments, the supplemental iron (II) compounds may be injected into the electro-chlorination vessel 110 using an injection system (not shown). Alternatively, the supplemental iron (II) compounds 134 may be introduced to the coagulation vessel 130, as indicated by the dashed line in FIG. 4.

Referring to FIG. 3, which illustrates a schematic representation of the coagulation and flocculation processes, depending on the weight of the colloids and/or dissolved organic compounds coagulated by the iron (III), a flocculent compound 314 may be added to the chlorinated produced water 118. The flocculent compound 314 may act to combine particles of the insoluble solid particles 312 into larger agglomerates or flocs 316 to increase the average weight of the insoluble solid particles 312. The larger flocs 316 may increase the rate of sedimentation of the iron (III) particles coagulated with the colloids 308 and organic compounds 306, as indicated by the larger downward arrow (i.e., the larger arrow pointing in the −Z direction of the coordinate axis in FIG. 3). Increasing the rate of sedimentation may increase the rate of removal of the organic and inorganic compounds. Flocculent compounds may include, but are not limited to, one or more of chitosan, polyethylene oxide, other flocculent compounds, or combinations of flocculent compounds. Referring to FIG. 4, a flocculent composition 136 comprising one or more flocculent compounds 314 (FIG. 3) may be introduced to the coagulation vessel 130.

However, it is noted that in some embodiments, there may be no need for the addition of a consumable flocculent compound. For example, in the oil & gas industry, polyethylene oxide (PEO) may be found in many makeups of oilfield chemicals. Other water-soluble polymers may also be present and may provide a flocculating effect in the coagulated produced water 132. Therefore, in some embodiments, the addition of the flocculent composition 136 to the coagulation vessel 130 may not provide a significant increase in the removal of organic and inorganic compounds because the produced water 102 may contain a sufficient amount of PEO and other flocculating polymers to flocculate the coagulated insoluble solids. Subsequently, the chlorination-assisted coagulation process described in this disclosure may provide the unexpected result of enabling removal of chelating constituents of the oilfield chemicals, such as PEO and other water-soluble polymers, by taking advantage of the flocculating properties of these materials, which may remove these materials as part of the insoluble solid particles 154. The presence of PEO and other water-soluble polymers in the produced water 102 may reduce the amount of flocculent added to the chlorination-assisted coagulation process to improve the rate of sedimentation of the coagulated insoluble solids.

Referring to FIGS. 1 and 4, the chlorination-assisted coagulation process may include a separation system 108 downstream of the coagulation vessel 130. The coagulated produced water 132 may be passed from the coagulation vessel 130 to the separation system 108, and the separation system 108 may separate the insoluble solid particles 154 from the coagulated produced water 132 to produce the treated produced water 152. The separation system 108 may include a separator capable of separating the insoluble solid particles 154 from the treated produced water 152. Examples of separators may include, but are not limited to, gas flotation systems, sedimentation systems such as settling tanks or decantation systems, filters such as filter presses, rotary filters or other types of filters, membrane separators, centrifugal separators, walnut shell separation systems, particle bed processes, water purification systems using adsorption material, other types of solid/liquid separators, or combinations of separators.

The treated produced water 152 may satisfy industry standards for water reuse or reinjection of water into subterranean formations. For example, as discussed above, the incoming produced water or other aqueous composition or stream may have an oil content of greater than 0.1 volume percent (vol. %) based on the total volume of the produced water. After treatment, the treated produced water 152 or other treated aqueous composition or stream may have an oil concentration of less than 50 milligrams per liter (mg/L). Additionally, during the chlorination-assisted coagulation process, hazardous organic chemicals like phenol may react with the strong oxidants to breakdown the hazardous organic chemicals into non-hazardous chemicals or may be otherwise removed from the produced water through coagulation. In some embodiments, the treated produced water 152 or other treated aqueous composition or stream may be substantially free of phenolic compounds. As used relative to phenol and other hazardous organic compounds, the term "substantially free" of a component means less than 0.01 parts per million (ppm) of that component in a particular portion of a stream, vessel, or reaction zone. As an example, the treated produced water 152, which is substantially free of phenol, may have less than 0.01 ppm of phenol.

The chlorination-assisted coagulation process may also remove inorganic contaminants from the produced water. Co-precipitation of inorganics may occur predominantly under basic pH conditions. For example, under basic conditions, the chlorination-assisted coagulation process may remove strontium, barium, and other inorganic species from the produced water. Removal of these inorganic constituents may decrease the risk of clogging a reservoir if the treated produced water 152 is to be re-injected back into the reservoir.

In some embodiments, the treated produced water 152 may be passed to one or more downstream treatment systems for further processing. For example, the chlorination-assisted coagulation process described in this disclosure may be used at oil and gas production facilities, where crude oil is separated from produced water. At such gas and oil separation plants (GOSP), produced water is often de-oiled before re-injection into the reservoir or disposal wells. The conventional produced water de-oiling operations can be made in large gravity separators called water oil separators (WOSEP) or by other techniques such as gas flotation, centrifugation such as by using hydrocyclones, chemical treatments, and the like. De-oiling of the produced water decreases the oil content of the produced water from about 1 vol. % down to the specifications for water re-injection into the oil formation, which is less than about 50-20 parts per million by volume depending on the petroleum production field. Though the process is described in terms of use at oil and gas production facilities, such processes may also be useful in operations at refineries, petrochemical units, and other plants where oily water needs to be purified.

The chlorination-assisted coagulation process described may provide new solutions to purify oilfield produced water and remove the solids, organic dissolved compounds, and oil contaminants from the produced water. The water may then be either sent for further treatments, such as desalination, for a re-use application or re-injected into the geological formation. The recovered oil removed from the produced water may be valued on the market. In some embodiments, the chlorination-assisted coagulation process can be applied as a pre-treatment process as part of a membrane-based water desalination plant. Fouling is a major drawback for the application of membrane technology in water treatment. The chlorination-assisted coagulation process may reduce or prevent membrane clogging and cleaning of fouled filtration and desalination membranes by pre-treating the produced water to remove oil droplets, organic compounds, solid particles, potentially scaling salts, or combinations of these.

The chlorination-assisted coagulation process conducted with non-sacrificial electrodes may be suitable for de-oiling produced water in oil and gas production conditions. For example, the chlorination-assisted coagulation process may be designed to meet the safety requirements of classified explosive environments. The chlorination-assisted coagulation process can be sized for a wide range of volume feed rates, thus offering solutions for purifying large amounts of produced water before re-injection into the reservoir formation. This may be advantageous over conventional hydrocyclone processes when the specifications of the re-injection water on oil content are low (below about 50 ppm crude oil in water) due to tight reservoir rock.

Furthermore, the chlorination-assisted coagulation process may be energy efficient. By providing energy efficient processes to remove dispersed crude oil in produced water without degrading its quality, the chlorination-assisted coagulation process may offer an alternative for the last separation stage in oil production plants that is more compact than a water oil separator (WOSEP) and competitive with hydrocyclones. Thus, the chlorination-assisted coagulation process may be utilized on platforms for offshore oil production.

As noted herein, when integrated in a produced water treatment process, the chlorination-assisted coagulation process can offer solutions to the problems of membrane fouling and facilities scaling. Currently, there is no widely accepted, reliable technical solution for mitigating the fouling of membranes in oily water processes. Fouling hinders the deployment of ceramic filtration technology in the oil and gas industry. The chlorination-assisted coagulation process, when used as a pre-treatment of the feed water, can offer a technical solution to protect the filtration membranes, and, in the process, to recover some crude oil. Furthermore, by providing a way of reducing cleaning requirements for membrane-based water treatment processes, the present process may offer a cost competitive alternative to treating large amounts of water for re-use. Since chlorination-assisted coagulation process is operable in anaerobic conditions, it may also be applicable in the oil production industry, including but not limited to produced water polishing before desalination and water treatment for fracturing jobs performed in shale oil production.

In some embodiments, the treated produced water 152 may be passed to a desalination process, such as a membrane desalination process, to further purify the water. The chlorination-assisted coagulation process may remove oil and organics from the produced water sufficiently to reduce or prevent fouling of a separation membrane in a downstream membrane desalination process or other membrane separation system.

In some embodiments, the treated produced water 152 may be re-injected into the subterranean formation. For example, the treated produced water 152 may be re-injected into the subterranean formation to maintain hydrostatic pressure in the formation during production. In other examples, the treated produced water 152 may be re-injected into the formation to force oil, gas, or both towards the production wells. In some embodiments, the treated produced water 152 may be reused to produce various drilling fluids, such as drilling mud or spacer fluids for example. Other uses of the treated produced water 152 are contemplated.

In some embodiments, the insoluble solid particles 154 separated from the treated produced water 152 may be passed to a downstream treatment process for recovery of oil from the insoluble solid particles 154. Alternatively, in some embodiments, oil recovery from the produced water 102 may be conducted in the electro-chlorination vessel 110 or before introducing the produced water 102 to the electro-chlorination vessel 110 to prevent formation or oily iron (III) flocs and eliminate the need for downstream treatment of the oily iron (III) flocs.

The chlorination-assisted coagulation process described herein may find applicability in produced water/crude oil separation at oil production plants; water de-oiling at refineries; removal of organic contaminants from process water in the process industries; pre-treatment of feed water prior to membrane filtration or desalination; treatment of water used for sand bitumen production; treatment and purification of produced water for disposal in the environment, offshore and onshore; and treatment and purification of produced waters used in shale oil and shale gas production using fracking techniques.

Referring to FIG. 4, the chlorination-assisted coagulation system 100 may include an electro-chlorination zone 111 and a coagulation zone 131. In some embodiments, the coagulation zone 131 may be positioned downstream of the electro-chlorination zone 111. In some embodiments, the electro-chlorination zone may be disposed within the electro-chlorination vessel 110, and the coagulation zone 131 may be disposed within the coagulation vessel 130 positioned downstream of the electro-chlorination vessel 110. In some embodiments, the electro-chlorination vessel 110, the coagulation vessel 130, or both may be pressure vessels capable of operating at pressures of from 100 kPa to 1,000 kPa. As shown in FIG. 4, in some embodiments, all of the produced water 102 may be introduced to the electro-chlorination zone 111 to undergo electro-chlorination. The electro-chlorination zone 111 may include the electrodes 174, such as the anode 116 and the cathode 114, which may be electrically coupled to the electric power source 112 for passing the electric current through the produced water 102 in the electro-chlorination zone 111. As shown in FIG. 4, supplemental iron (II) compounds 134 may optionally be introduced to the produced water 102 in the electro-chlorination zone 111 or in the coagulation zone 131. A flocculent composition 136 may also be optionally introduced to the chlorinated produced water 118 in the coagulation zone 131.

In operation of the chlorination-assisted coagulation process using the chlorination-assisted coagulation system 100 of FIG. 4, the produced water 102 or other aqueous solution may be introduced to the electro-chlorination zone 111. As previously discussed in this disclosure, the produced water 102 may include at least water, chloride ions, iron (II) ions, and one or more organic compounds, such as oil or dissolved hydrocarbons for example. At least a portion of the chloride ions in the produced water 102 may be converted into hypochlorite or hypochlorous acid in the electro-chlorination zone 111 by passing an electric current through the produced water 102 in the electro-chlorination zone 111. The electric current may be passed through the produced water 102 between the electrodes 174. The chlorinated produced water 118 may be passed from the electro-chlorination zone 111 to the coagulation zone 131. At least a portion of the iron (II) species in the chlorinated produced water 118 may be oxidized by the hypochlorous acid or hypochlorite to produce iron (III) species. Oxidation of the iron (II) to iron (III) may occur in the electro-chlorination zone 111, the coagulation zone 131, or both or may occur at least partially during passage of the chlorinated produced water 118 from the electro-chlorination zone 111 to the coagulation zone 131. At least a portion of the organic compounds may be coagulated with the iron (III) species in the coagulation zone 131 to produce the coagulated produced water 132 comprising a plurality of insoluble solid particles in the produced water.

The insoluble solids may be flocculated into insoluble solid particles 154 which may be separated from the produced water. In some embodiments, the insoluble solids may be flocculated into insoluble solid particles 154 through introduction of a consumable flocculant composition 136 to the coagulated produced water 132 in the coagulation zone 131. Alternatively, the insoluble solids may be flocculated into insoluble solid particles 154 through contact with PEO or other water-soluble polymers present in the produced water 102. The coagulated produced water 132 may be passed to the separation system 108 where the insoluble solid particles 154 may be separated from the coagulated produced water 132 to produce the treated produced water 152.

Figure 5:
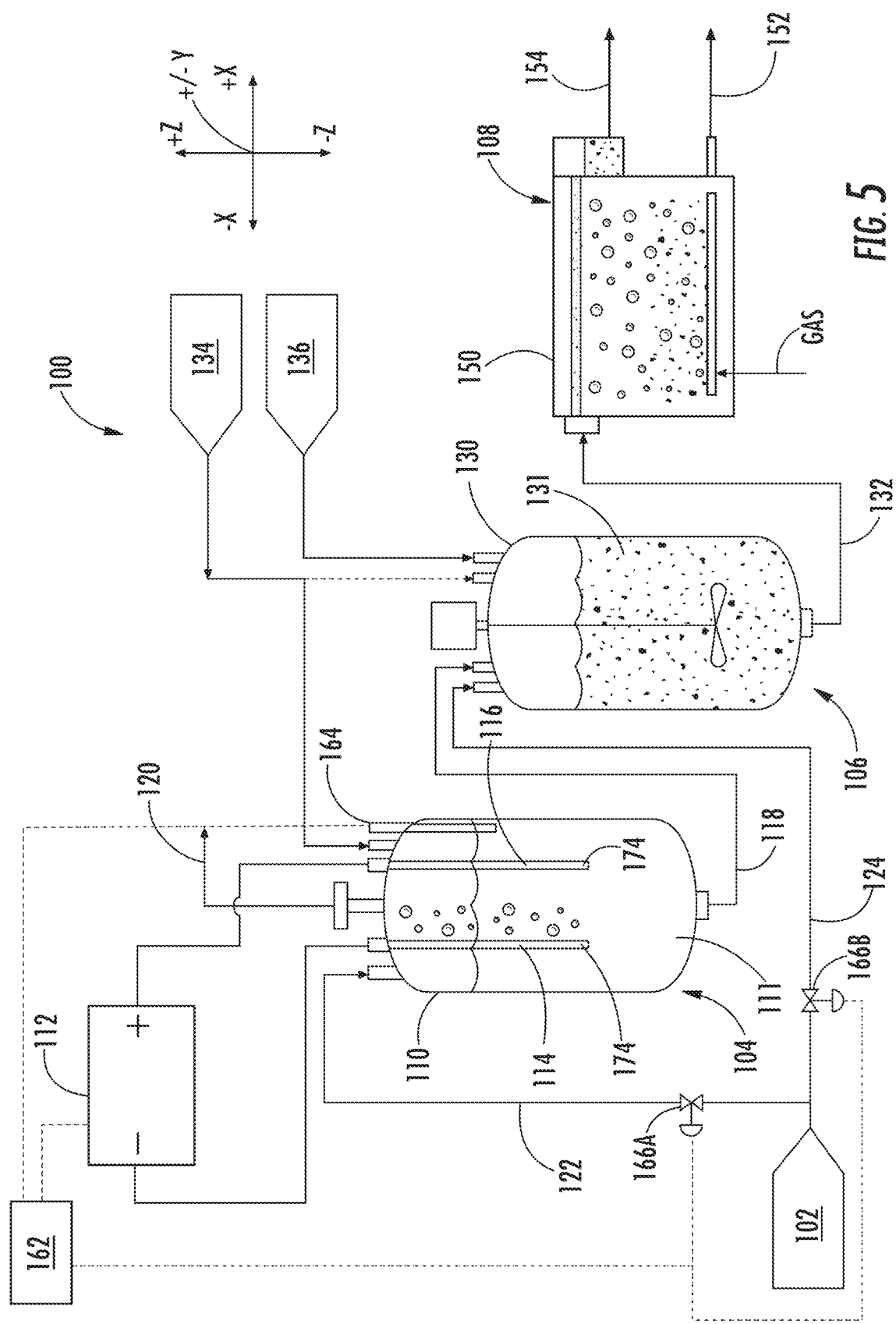
FIG. 5 schematically depicts yet another embodiment of a chlorination-assisted coagulation system, according to one or more embodiments of the present disclosure.
Figure 6:
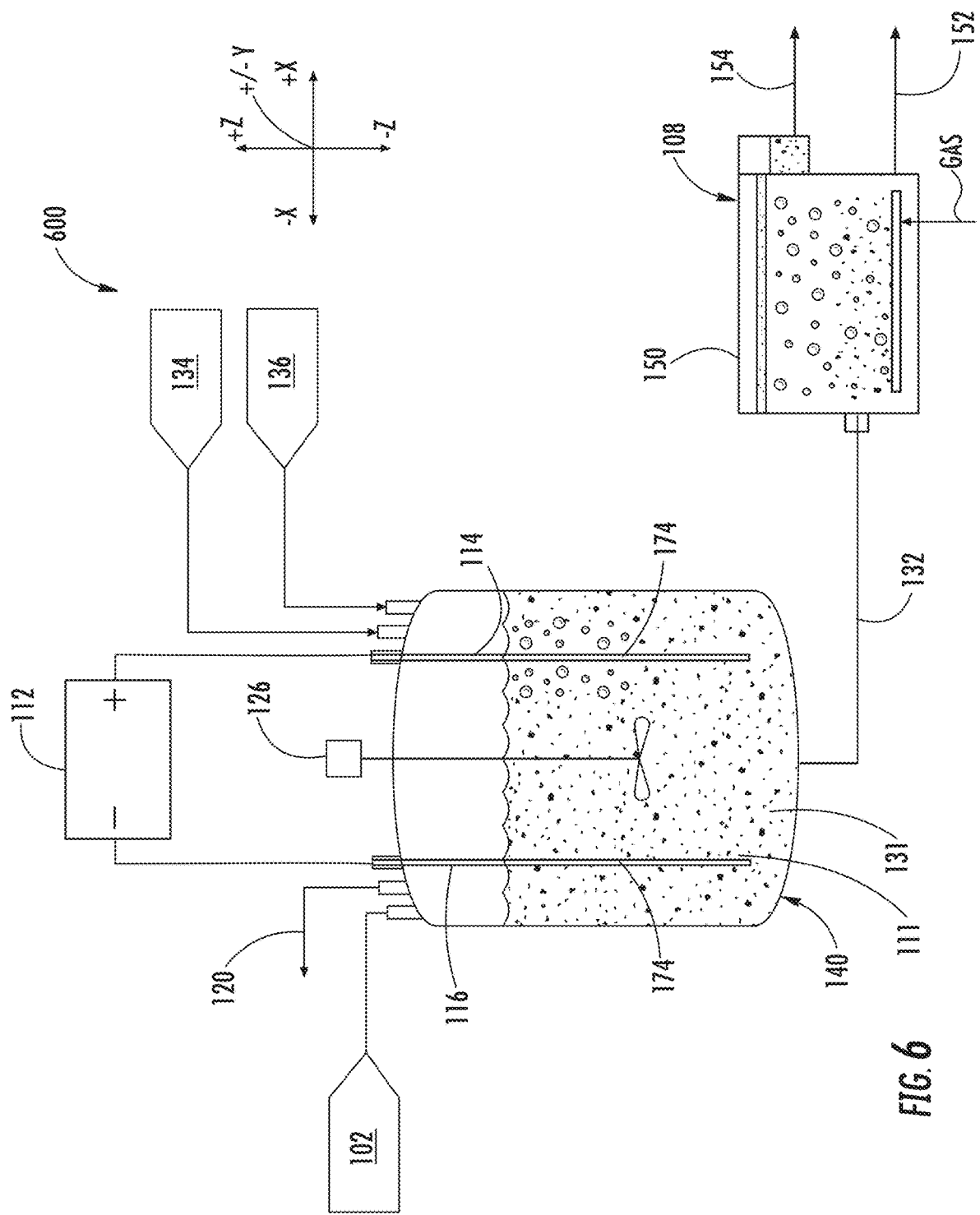
FIG. 6 schematically depicts still another embodiment of a chlorination-assisted coagulation system, according to one or more embodiments of the present disclosure.

Referring to FIG. 5, in some embodiments, the chlorination-assisted coagulation system 100 may include the electro-chlorination zone 111, a coagulation zone 131 downstream of the electro-chlorination zone 111, an electro-chlorination feed stream 122, and a bypass 124. The electro-chlorination feed stream 122 may be positioned to introduce a first portion of the produced water 102 to the electro-chlorination zone 111. The bypass 124 may be fluidly coupled to the electro-chlorination feed stream 122 and the coagulation zone 131. The bypass 124 may be positioned to pass a second portion of the produced water 102 directly to the coagulation zone 131 without passing through the electro-chlorination zone 111. The second portion of the produced water 102 may be the remainder of the produced water 102, which is not introduced to the electro-chlorination zone 111. The electro-chlorination feed stream 122 may include a control valve 166A, and the bypass 124 may include a control valve 166B to control the ratio of the portion of produced water 102 introduced to the electro-chlorination zone 111 and the remainder of the produced water 102 passed to the coagulation zone 131 without passing through the electro-chlorination zone 111. The quantity of produced water 102 introduced to the electro-chlorination zone 111 may be controlled to control an amount of the strong oxidant (hypochlorous acid or hypochlorite) produced in the electro-chlorination zone 111.

Referring to FIG. 5, in operation, the produced water 102 may be separated into the electro-chlorination feed stream 122 and the bypass 124. The electro-chlorination feed stream 122, which comprises the produced water 102, may be introduced to the electro-chlorination zone 111, and the bypass 124 may be introduced directly to the coagulation zone 131 without passing through the electro-chlorination zone 111. Separating the produced water 102 into the electro-chlorination feed stream 122 and the bypass 124 may increase the capacity of the chlorination-assisted coagulation system 100 by only subjecting a portion of the produced water 102 to the electro-chlorination step. Additionally, passing only a portion of the produced water 102 to the electro-chlorination vessel 110 may also greatly reduce the electrical power consumption of the chlorination-assisted coagulation system 100 of FIG. 5 compared to embodiments of the chlorination-assisted coagulation system in which all of the produced water is subjected to electro-chlorination.

In the electro-chlorination zone 111, at least a portion of the chloride ions in the first portion of the produced water 102 of the electro-chlorination feed stream 122 may be converted to the strong oxidant (hypochlorous acid or hypochlorite depending on pH) by passing an electric current through the produced water 102 in the electro-chlorination zone 111. The chlorinated produced water 118 may be passed from the electro-chlorination zone 111 to the coagulation zone 131, where the chlorinated produced water 118 is mixed with the produced water 102 introduced directly to the coagulation zone 131 through the bypass 124. The strong oxidant from the chlorinated produced water 118 may oxidize the indigenous iron (II) species in the produced water 102 and the chlorinated produced water 118 to form iron (III) species. Organic and inorganic constituents of the produced water 102 may be coagulated with the iron (III) species in the coagulation zone 131 and may be precipitated out of the aqueous phase as a solid in the coagulation zone 131.

In some embodiments, supplemental iron (II) compounds may be introduced to the electro-chlorination zone 111 or the coagulation zone 131. Additionally, in some embodiments, a flocculent composition 136 may be added to the coagulation zone 131 to increase the size of the insoluble solid particles (floc) in the coagulated produced water 132, which may increase the rate of sedimentation of the insoluble solid particles. The coagulated produced water 132 may be passed to the separation system 108 for separating the insoluble solid particles 154 from the coagulated produced water 132 to produce the treated produced water 152.

With the bypass 124, only a portion of the produced water 102 is passed through the electro-chlorination zone 111. The remainder of the produced water 102 may be passed through the bypass 124 directly to the coagulation zone 131. As previously discussed, reducing the amount of produced water 102 passed through the electro-chlorination zone 111 may reduce the electrical power demand of the electro-chlorination zone 111. This may reduce the operating costs of the chlorination-assisted coagulation system 100 and process compared to embodiments in which all of the produced water is introduced to the electro-chlorination zone 111. Further, by using control valves 166A, 166B on the electro-chlorination feed stream 122 and the bypass 124, the amount of strong oxidant produced during electro-chlorination may also be controlled. The control valves 166A, 166B may be controlled based on feedback from a property sensor 164 positioned in the electro-chlorination zone 111 or downstream of the electro-chlorination zone 111. This may enable the amount of strong oxidant produced to be further adjusted in response to changes in the composition of the produced water 102 introduced to the chlorination-assisted coagulation system 100.

As shown in FIG. 5, the sensor 164, control valve 166A, and control valve 166B may be communicatively coupled to the controller 162. The power source 112 may also be communicatively coupled to the controller 162 so that the controller 162 may be operable to control a voltage and/or current density of the current passed through the aqueous composition in the electro-chlorination zone 111. The controller 162 may include a processor and a memory module. Machine instructions stored on the memory module, when executed by the processor, may cause the controller 162 to measure a property of the aqueous composition using the sensor 164 and controlling the power source 112 or the control valves 166A, 166B based on the measured property of the aqueous composition. For example, operation of the chlorination-assisted coagulation process 100 may include measuring a property of the aqueous composition or treated aqueous composition, and controlling a voltage or a current density of the electric current passing through the aqueous composition in response to the measured property. In some embodiments, the property may include the oxidation-reduction potential of the aqueous composition or treated aqueous composition. In other embodiments, operation of the chlorination-assisted coagulation process 100 may include measuring a property of the first portion of the aqueous solution, the second portion of the aqueous composition, or the treated aqueous composition and adjusting a ratio of the first portion to the second portion of the aqueous composition based on the measured property.

Referring now to FIG. 6, in some embodiments, a chlorination-assisted coagulation system 600 may include a single treatment vessel 140 and, optionally, the separation system 108 downstream of the treatment vessel 140. In these embodiments, the electro-chlorination zone 111 and the coagulation zone 131 may be coexistent within the same single treatment vessel 140 so that the electro-chlorination process, coagulation process, and flocculation process may all occur simultaneously within the same volume. The single treatment vessel 140 may include the electrodes 174, such as the anode 116 and the cathode 114, both of which may be electrically coupled to the power source 112 for passing electric current through the produced water 102 introduced to the treatment vessel 140. In some embodiments, the single treatment vessel 140 may be a pressure vessel capable of operating at pressures of from 100 kPa to 1,000 kPa.

Referring to FIG. 6, in operation of the chlorination-assisted coagulation process using the chlorination-assisted coagulation system 600, the produced water 102 may be introduced to the single treatment vessel 140 and the electro-chlorination zone 111 and coagulation zone 131 coexisting within the treatment vessel 140. Chloride ions in the produced water 102 may be converted to a strong oxidant by passing an electric current through the produced water 102 in the treatment vessel 140. Simultaneously, indigenous iron (II) species in the produced water 102 in the treatment vessel 140 may be converted to iron (III) species through oxidation of the iron (II) species with the strong oxidant. The organic and inorganic contaminants may be coagulated by the iron (III) species to form a plurality of insoluble solid particles. In some embodiments, supplemental iron (II) compounds 134 may be introduced to the treatment vessel 140 in situations in which the indigenous iron (II) in the produced water 102 may be insufficient to coagulate all of the organic and inorganic contaminants. In some embodiments, a flocculent composition 136 may be introduced to the treatment vessel 140 to flocculate the insoluble solid particles into larger insoluble solid particles. The coagulated produced water 132 may then be passed to the separation system 108 to separate the insoluble solid particles 154 from the coagulated produced water 132 to produce the treated produced water 152.

Treating the produced water 102 by conducting the chlorination-assisted coagulation process in the single treatment vessel 140 as depicted in FIG. 6 may initially reduce the capital costs of the chlorination-assisted coagulation system 600 compared to multiple vessel embodiments by reducing the number of processing vessels employed to conduct the process. Additionally, treating the produced water 102 by the chlorination-assisted coagulation process in the single treatment vessel 140 may enable the hydrogen gas produced at the cathode 114 to be used in a flotation separation process for separating the insoluble solid particles from the coagulated produced water 132. However, when a flocculent composition 136 is introduced to the single treatment vessel 140, the flocculent compositions may react in side reactions with the strong oxidants produced by electro-chlorination. Side reaction of the flocculants with the strong oxidants may degrade the flocculants and reduce their effectiveness to flocculate the insoluble solid particles to increase the average size and increase the rate of sedimentation.

The chlorination-assisted coagulation systems 100, 600 depicted in FIGS. 1 and 4-6 may be operated continuously, semi-continuously, or batchwise. For example, in continuous operation, produced water 102 may be introduced continuously to the chlorination-assisted coagulation system 100, 600. Alternatively, the chlorination-assisted coagulation system 100, 600 may be operated in a batchwise manner in which a discrete quantity of produced water 102 is introduced to the chlorination-assisted coagulation system 100, 600, electro-chlorinated, coagulated, flocculated, and separated before a subsequent discrete quantity of produced water 102 is introduced to the chlorination-assisted coagulation system 100, 600.

Additional embodiments of the chlorination-assisted coagulation process will now be described. In some embodiments of the chlorination-assisted coagulation process, the process for treating an aqueous composition, such as produced water, may include converting at least a portion of chloride ions in the aqueous composition to hypochlorite ions or hypochlorous acid by passing an electric current through at least a portion of the aqueous composition under anaerobic conditions. The aqueous composition may include the chloride ions, iron (II) compounds, and one or more organic compounds. The process may further include reacting at least a portion of the iron (II) compounds of the aqueous composition with the hypochlorite or hypochlorous acid to produce iron (III) ions, and coagulating the one or more organic compounds with the iron (III) ions to produce a plurality of insoluble solid particles in a treated aqueous composition.

In some embodiments of the chlorination-assisted coagulation process, the aqueous composition may comprise produced water. In some embodiments, the pH of the aqueous composition may be from 2.5 to 8.5. Alternatively, in other embodiments, the process may be conducted under acidic pH conditions, such as at pH of from 10.5 to 12.5. In some embodiments, the electric current may be passed through the aqueous composition by passing the current between non-sacrificial electrodes. In some embodiments, the process may further comprise alternating polarities of the non-sacrificial electrodes. The polarities of the non-sacrificial electrodes are alternated by an electrode polarity alternator comprising a waveform generator. In some embodiments, the process may further comprise rotating or revolving the non-sacrificial electrodes relative to the aqueous composition. The non-sacrificial electrodes may be rotated by an electrode rotation system. The electrode rotation system may include a shaft coupled to each of the non-sacrificial electrodes and a drive operatively coupled to the shaft, the drive operable to rotate the shaft and the non-sacrificial electrodes relative to the aqueous composition.

In some embodiments, the process may optionally include introducing supplemental iron (II) compounds to the aqueous composition. In still other embodiments, the process may include flocculating the plurality of insoluble solid particles by introducing a flocculent to the aqueous composition. In some embodiments, the process may further include separating the plurality of insoluble solid particles from the treated aqueous composition.

In some embodiments, all of the aqueous composition may be subjected to the electric current. Alternatively, in other embodiments, the process may further include separating the aqueous composition into a first portion and a second portion, converting at least a portion of the chloride ions in the first portion of the aqueous composition to hypochlorite or hypochlorous acid by passing an electric current through the first portion of the aqueous composition under anaerobic conditions, and combining the first portion of the aqueous composition with the second portion of the aqueous composition after converting the chloride ions in the first portion to hypochlorite or hypochlorous acid.

In other embodiments of the chlorination-assisted coagulation process, the process of removing organic and inorganic compounds from an aqueous composition may include introducing a first portion of the aqueous composition to an electro-chlorination zone. The aqueous composition may comprise at least chloride ions, iron (II) compounds, and one or more organic compounds. The process may further include converting at least a portion of the chloride ions in the first portion of the aqueous composition into hypochlorite or hypochlorous acid by passing an electric current through the first portion of the aqueous composition under anaerobic conditions in the electro-chlorination zone. The process may include combining the first portion of aqueous composition with a second portion of the aqueous composition in the coagulation zone. The coagulation zone may be downstream of the electro-chlorination zone and the second portion of the aqueous composition may bypass the electro-chlorination zone.

In some embodiments, the process may further include oxidizing at least a portion of the iron (II) compounds in the aqueous composition with the hypochlorite or hypochlorous acid in the electro-chlorination zone or in a coagulation zone to produce iron (III) ions and coagulating the one or more organic compounds with the iron (III) ions in the coagulation zone to produce a plurality of insoluble solid particles in a treated aqueous composition. In some embodiments, the process may further include flocculating the plurality of insoluble solid particles in the coagulation zone. In some embodiments, flocculating the plurality of insoluble solid particles may include introducing a flocculent composition to the coagulation zone. In some embodiments, the process may further include separating the insoluble solid particles from the treated aqueous composition.

In some embodiments, the coagulation zone and the electro-chlorination zone may be disposed in a single treatment vessel. In some embodiments, the aqueous composition may include produced water. In some embodiments, the electric current may be passed through the at least a portion of the aqueous composition by passing the current between non-sacrificial electrodes disposed within the electro-chlorination zone.

The chlorination-assisted coagulation process may also provide the added advantage of removing hydrogen sulfide gas ($H_2S$) from the Sour produced water or other aqueous composition having a high concentration of H₂S. Under acidic conditions, the hypochlorous acid formed in the electro-chlorination step reacts with the hydrogen sulfide ($H_2S$) and bisulfide ($HS^-$) to produce elemental sulfur, water, and chloride ions, according to Reactions 11 and 12 (RXN 11 and RXN 12), which are subsequently provided. Under basic conditions, the hypochlorite produced in the electro-chlorination step reacts with the bisulfide ($HS^-$) to produce elemental sulfur, hydroxide ions, and chloride ions, according to Reaction 13 (RXN 13), which is subsequently provided. The elemental sulfur may co-precipitate with the cations during coagulation and be removed from the produced water.

Reaction of Hypochlorous Acid with H₂S and HS⁻ Under Acidic Conditions

| Reaction of Hypochlorous Acid with H₂S and HS⁻ Under Acidic Conditions | | |
|---|---|---|
| $H_2S \Longleftrightarrow S + 2H^+ + 2e^-$ | E°: −0.140 V | |
| $HClO(aq) + H^+ + 2e^- \Longleftrightarrow Cl^- + H_2O$ | E°: +1.490 V | RXN 11 |
| $H_2S + HClO(aq) \rightarrow S + H^+ + H_2O + Cl^-$ | E°: +1.350 V | |
| | | |
| $HS^- \Longleftrightarrow S + H^+ + 2e^-$ | E°: +0.065 V | |
| $HClO(aq) + H^+ + 2e^- \Longleftrightarrow Cl^- + H_2O$ | E°: +1.490 V | RXN 12 |
| $HS^- + HClO(aq) \rightarrow S + H_2O + Cl^-$ | E°: +1.555 V | |
| | | |
| Reaction of Hypochlorite with Bisulfide Under Basic Conditions | | |
| $OH^- + HS^- \Longleftrightarrow S + H_2O + 2e^-$ | E°: +0.520 V | |
| $ClO^-(aq) + H_2O + 2e^- \Longleftrightarrow 2OH^- + Cl^-$ | E°: +0.890 V | RXN 13 |
| $HS^- + ClO^-(aq) \rightarrow S + OH^- + Cl^-$ | E°: +1.410 V | |

Additional hydrogen sulfide may be removed from the produced water in the chlorination-assisted coagulation process through dissolution/solubilization of iron(II) sulfide. Iron (II) sulfide is insoluble in water, having an equilibrium constant K equal to $4.16 \times 10^{17}$. The iron (II) sulfide must therefore be dissolved or solubilized by a molecule of hydrogen sulfide from the produced water. Dissolution/solublization of the iron (II) sulfide by hydrogen sulfide is illustrated in Reaction 14 (RXN 14), which is subsequently provided. The hydrosulfide being the soft center of the molecule of iron(II) dihydrosulfide, the oxidation reaction occurs readily and spontaneously on the sulfur to give an iron(II) disulfide The oxidation of iron (II) dihydrosulfide is illustrated in Reaction 15 (RXN 15) which is subsequently provided.

| Dissolution of Iron (II) Sulfide with Hydrogen Sulfide | | | |
|---|---|---|---|
| $FeS_{(s)} + H_2S \Longleftrightarrow Fe(SH)_{2(aq)}$ | | $K = 10^{3.45}$ | RXN 14 |
| Oxidation of Iron (II) Dihydrosulfide | | | |
| $Fe(SH)_2 \Longleftrightarrow FeS_2 + 2H^+ + 2e^-$ | E°: −0.298 V | | |
| $HClO(aq) + H^+ + 2e^- \Longleftrightarrow Cl^- + H_2O$ | E°: +1.490 V | | RXN 15 |
| $Fe(SH)_2 + HClO(aq) \rightarrow FeS_2 + H^+ + H_2O + Cl^-$ | E°: +1.192 V | | |

In some embodiments in which additional iron (II) species, such as iron (II) chloride or iron (II) acetate, are added in the process to increase the iron (II) concentration, the hydrogen sulfide gas may be removed from the produced water in the chlorination-assisted coagulation process by a series of side reactions, which include an X-Ligand exchange reaction to produce iron (II) sulfide and subsequent oxidation of the iron (II) sulfide with hypochlorous acid to produce iron (II) disulfide, also known as Pyrite. The iron (II) disulfide is an insoluble solid that may precipitate out of the produced water 102 during the electro-chlorination process, coagulation process, or both. Reaction 16 (RXN 16), provided subsequently in this disclosure, shows the X-Ligand exchange reaction to convert iron (II) compounds into iron (II) sulfide, and Reaction 17 (RXN 17), provided subsequently in this disclosure, shows oxidation of the iron (II) sulfide to iron (II) disulfide.

X-Ligand Exchange Reaction $$FeX_2 + H_2S \Leftrightarrow FeS + 2HX; \; X: Cl^-, SO_4^{2-} \qquad \text{RXN 16}$$

Oxidation of Iron (II) Sulfide to Iron (II) Disulfide $$FeS + HClO(aq) + H_2S \rightarrow FeS_2 + HCl + H_2O \qquad \text{RXN 17}$$

The generated iron (II) disulfide (Pyrite) and iron (II) sulfides, such as amorphous FeS, mackinawite, and pyrrhotite, can be removed by a flotation process in the form of a slurry. As mentioned above, in anaerobic conditions, the microbubbles of hydrogen produced at the electrodes in the electro-chlorination process can be used in an induced gas flotation (IGF) process. Therefore, this described process can also be used to remove sulfur species from water via metal sulfide flotation techniques, as well as the organic compounds.

Under aerobic conditions, such as in conventional electro-chlorination or coagulation processes, hydrogen sulfide and/or iron sulfides react with the oxygen to initially produce sulfur elemental according to Reaction 14 (RXN 14), which is subsequently provided in this disclosure.

Aerobic Oxidation of Iron (II) Sulfide to Elemental Sulfur $$FeS + 3O_2 + 2H_2O \rightarrow 4Fe(O)OH + 4S \qquad \text{RXN 14}$$

In the presence of excess oxygen, the elemental sulfur may continue to react in side reactions to produce various sulfur compounds ($SO_x$), such as sulfur dioxide, sulfite, sulfurous acid, sulfate, bisulfate, sulfuric acid, or combinations of these depending on the pH and reaction conditions of the aqueous solution. With enough oxygen, each of the intermediate sulfur species may continue to react to produce sulfates, bisulfate, sulfuric acid, or combinations of these depending on pH.

It should now be understood that the chlorination-assisted coagulation systems and processes previously discussed provide a plurality of potential benefits. Benefits of the chlorination-assisted coagulation process may include no need for consumable electrode replacements as in commercially available electrocoagulation technologies since the process may, in some embodiments, make use of permanent, non-sacrificial electrodes. Similarly, the chlorination-assisted coagulation process may not require periodic consumable refill compared to chemical treatment and coalescing beads alternatives, such as polymer based adsorbent packed bed technology and walnut shell filtration technology. The chlorination-assisted coagulation process does not require storage of toxic and/or unstable chemicals on-site. The chlorination-assisted coagulation process may be more compact and may provide a reduced spatial footprint compared with conventional gravity based separators (WOSEP) used at oil production facilities reduce oil content in produced water. The chlorination-assisted coagulation process may be easily integrated in-line with processes in the oil and gas industry facilities as compared with existing oily water treatment processes because the chlorination-assisted coagulation process is designed to work in an oxygen free environment utilizing pressurized vessels. Furthermore, the chlorination-assisted coagulation process may be continuously or semi-continuously operated without the need of a cleaning sequence in the operating cycle compared to mechanical filters or any membrane-based technology. The process may require limited maintenance and, therefore, minimized downtime compared to flotation technology, such as IGF, DGF or other flotation technologies. The chlorination-assisted coagulation process may enable processing of large amounts of produced water and, thus, may have potentially lesser capital expenses than competitor technologies such as hydrocyclones, flotation, filtration, or gravity separation. The chlorination-assisted coagulation process may also deliver oxygen-free purified water without need for an additional step of oxygen scavenger addition in the overall water treatment process for several applications in the oil production and refining industry. The chlorination-assisted coagulation process may not be limited by the composition or concentrations of inorganic or organic components in the aqueous composition or stream. Furthermore, the chlorination-assisted coagulation process may reduce or eliminate the need of a pre-treatment for scrubbing $H_2S$ or removing oil droplets compared to membrane-based technology and thermal distillation, etc. The chlorination-assisted coagulation process may reduce or prevent fouling or scaling of units compared to adsorption particle beds or walnut shell filtration technology. The chlorination-assisted coagulation process may produce constant operational performance with time and may provide no decrease of performance due to size and shape of electrodes changing with time in commercial electro-coagulation technology based on sacrificial electrodes. The chlorination-assisted coagulation process may also have lesser operating costs compared to commercial electro-coagulation technology based on sacrificial electrodes and potentially lesser operating costs than hydrocyclones, flotation, adsorption or filtration technologies, among other benefits.

EXAMPLES

Figure 7:
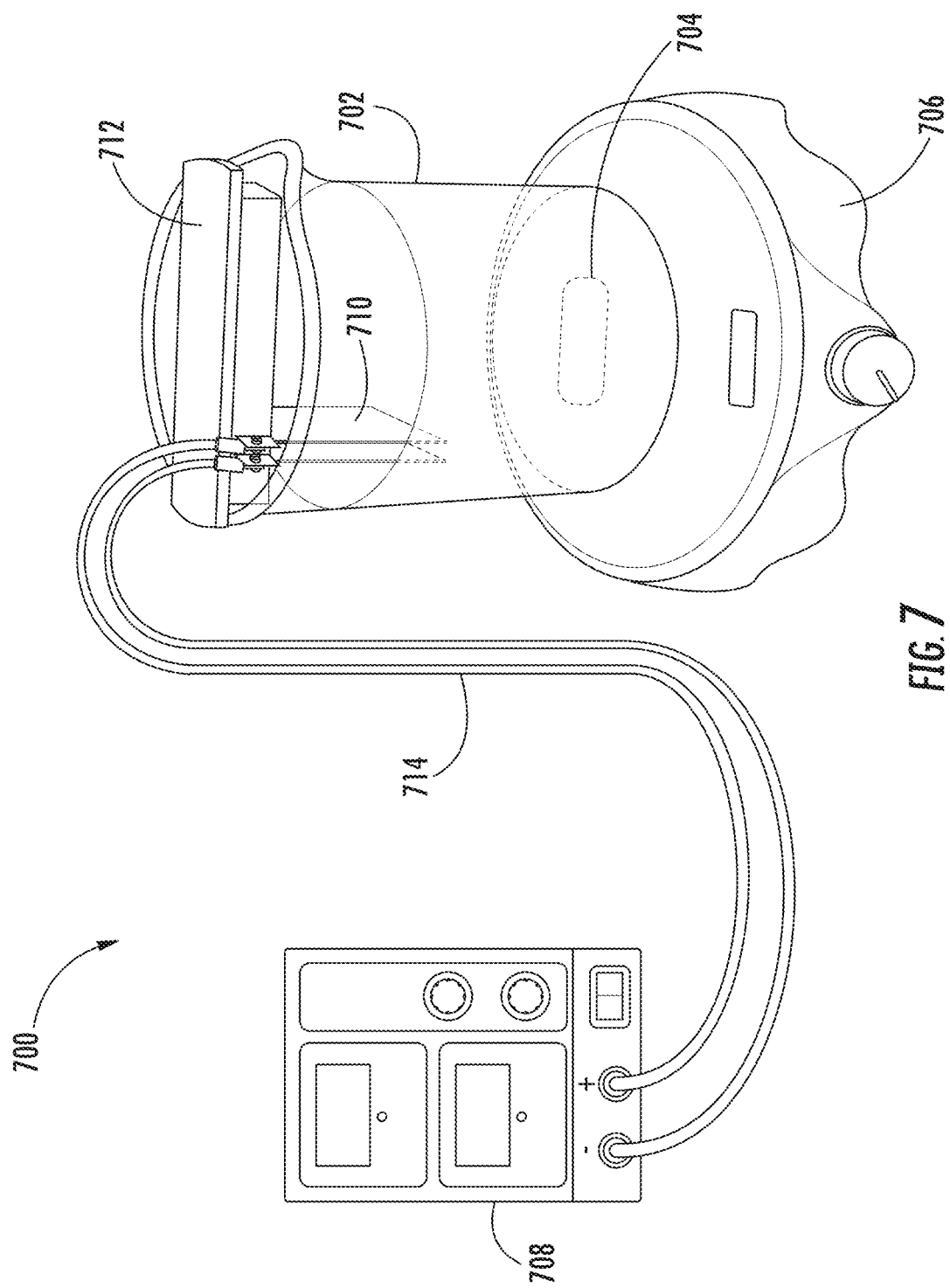
FIG. 7 schematically depicts a lab apparatus for evaluating the performance of the chlorination-assisted coagulation process, according to one or more embodiments of the present disclosure.

Experiments were performed to demonstrate the viability of the chlorination-assisted coagulation process. Batch experiments of the chlorination-assisted coagulation process were performed using the lab apparatus 700 illustrated in FIG. 7. As shown in FIG. 7, the lab apparatus included a 1 liter beaker 702, a stirrer bar 704, a magnetic stirrer 706, and a power supply 708. The power supply 708 was electrically coupled to electrodes 710 by wired connections 714. The electrodes 710 were positioned in the beaker 720 by an electrode support 712 supported by the top of the beaker 702.

Control Example 1: Sour Produced Water Control Samples

A sample of produced water was collected from a first crude oil production plant in Saudi Arabia. The produced water sample of Control Example 1 exhibited a hydrogen sulfide content of from 5 vol. % to 20 vol. % of the gas stream and, thus, will be referred to herein as "Sour produced water." Prior to further experimentation, the Sour produced water was analyzed for pH, conductivity (millisiemens per centimeter (mS/cm)), specific gravity, total dissolved solids (TDS) (mg/L), total suspended solids (TSS) (mg/L), and total solids (mg/L). Additionally, the produced water sample was analyzed for metal concentrations (mg/L), anion concentrations (mg/L), and phenol concentration (parts per million by weight (ppmw)).

The pH was measured using a pH meter, and the specific gravity was measured using a density meter. The TSS were determined by filtering the volume of the sample using a 0.45 micrometer filter and then drying the filter. The TSS values are provided as the dry weight of TSS in the 1 liter sample. The TDS was also determined on a dry basis. The total solids value is provided as the sum of the TSS and TDS. The concentration of metal cations in the parts per million range were measured using inductively coupled plasma mass spectrometry (ICP-MS). For cations in concentrations in the parts per billion range, the concentrations were measured using inductively coupled plasma atomic emission spectroscopy (ICP-AES). The concentrations of anions were determined using ionic chromatography (IC). The concentrations of bicarbonate, carbonate, and hydroxide ions were determined using acid-base titration. Phenol concentration was measured by high-performance liquid chromatography (HPLC) using a UV detector. The test methods and analysis data for the produced water of Control Example 1 are provided in Table 1, which is subsequently provided in this disclosure.

Example 2: Treatment of the Sour Produced Water Using the Chlorination-Assisted Coagulation Process A quantity of 1 liter of the Sour produced water of Control Example 1 was measured in a graduated cylinder and added to the beaker 702 in lab apparatus 700 of FIG. 7. The electrodes 710 were at least partially submerged in the Sour produced water in the beaker 702. The Sour produced water appeared to be a clear green solution prior to treatment. The Sour produced water was subjected to an electric current of 0.82 amperes and voltage of 2.9 V for a period of 2 minutes. After treatment, the Sour produced water had transformed into a black suspension. The suspension was filtered on glass wool to remove the solids and produce the treated water of Example 2. The treated water of Example 2 was analyzed for the properties described above in Control Example 1 and the results are reported in Table 1 subsequently provided in this disclosure.

Comparative Example 3: Treatment of the Sour Produced Water with a Commercially-Available Oxidant A quantity of 1 liter of the Sour produced water of Control Example 1 was measured in a graduated cylinder and added to the beaker 702 in lab apparatus 700 of FIG. 7 and 0.5030 grams of calcium hypochlorite (Ca(OCl)$_2$), a commercially-available oxidant, was added to the Sour produced water. The aqueous solution of produced water and Ca(OCl)$_2$ was then stirred at 400 rotations per minute (rpm) for a period of 1 minute. The resulting suspension was filtered on glass wool to remove the solids and produce the treated water of Comparative Example 3. The treated water of Comparative Example 3 was analyzed for the properties described above in Control Example 1 and the results are reported in Table 1 subsequently provided in this disclosure.

Example 4: Comparison of the Chlorination Assisted Coagulation Process of Example 2 with the Commercially-Available Oxidant of Comparative Example 3

Table 1, provided subsequently in this disclosure, includes the analysis data for Control Example 1, Example 2, and Comparative Example 3.

TABLE 1

Water Analysis Data for Control Example 1, Example 2, and Comparative Example 3

|  | Test Method | Control Example 1 | Example 2 | Comparative Example 3 |
|---|---|---|---|---|
| pH | pHmeter | 6.8 | 7.2 | 7.2 |
| Conductivity (mS/cm) | Conductimeter | 85050 | 85610 | 91200 |
| Specific Gravity | Density meter | 1.0629 | 1.0638 | 1.0674 |
| TDS (mg/L) | Dry weight | 102460 | 118420 | 122960 |
| TSS (mg/L) | Dry weight | 356 | 290 | 344 |
| Total Solids (mg/L) | — | 102816 | 118710 | 123304 |
| Metals | | | | |
| Aluminum (mg/L) | ICP-AES | <0.1 | <0.1 | <0.1 |
| Calcium (mg/L) | ICP-MS | 7522 | 7858 | 8638 |
| Magnesium (mg/L) | ICP-MS | 892 | 946 | 1041 |
| Arsenic (mg/L) | ICP-AES | 0.4 | 0.4 | 0.4 |
| Cadmium (µg/L) | ICP-AES | <0.1 | <0.1 | <0.1 |
| Chromium (µg/L) | ICP-AES | 0.1 | 0.1 | 0.1 |
| Copper (µg/L) | ICP-AES | <0.1 | <0.1 | <0.1 |
| Iron (mg/L) | ICP-AES | <1 | <1 | <1 |
| Lead (µg/L) | ICP-AES | <0.1 | <0.1 | <0.1 |
| Manganese (µg/L) | ICP-AES | <1 | <1 | <1 |
| Nickel (mg/L) | ICP-AES | 0.3 | 0.3 | 0.3 |
| Potassium (mg/L) | ICP-MS | 980 | 997 | 1087 |
| Sodium (mg/L) | ICP-MS | 22432 | 23922 | 25835 |
| Selenium (mg/L) | ICP-AES | 1.4 | 1.4 | 1.5 |
| Zinc (mg/L) | ICP-AES | <0.1 | <0.1 | <0.1 |
| Barium (mg/L) | ICP-AES | 2 | 2 | 2 |
| Strontium (mg/L) | ICP-MS | 351 | 371 | 405 |
| Anions | | | | |
| Fluoride (mg/L) | IC | 5.6 | 5.33 | 5.38 |
| Bromide (mg/L) | IC | 279 | 296 | 311 |
| Chloride (mg/L) | IC | 52542 | 52235 | 57416 |
| Nitrite (mg/L) | IC | <10 | <10 | <10 |
| Nitrate (mg/L) | IC | <10 | <10 | <10 |
| Phosphate (mg/L) | IC | 0.419 | <0.05 | <0.05 |
| Sulfate (mg/L) | IC | 405 | 385 | 449 |
| Bicarbonate (mg/L) | Titration | 776 | 365 | 215 |
| Carbonate (mg/L) | Titration | 0 | 0 | 0 |
| Hydroxide (mg/L) | Titration | 0 | 0 | 0 |
| Organic Compounds | | | | |
| Phenol (ppmw) | HPLC-UV/Vis | 0.14 | Not Detected | Not Detected |

As shown by the data in Table 1, the chlorination-assisted coagulation process of Example 2 resulted in removal of the phenol compounds from the produced water of Example 2 compared to the amount of phenol in the produced water of Control Example 1. The results of the chlorination-assisted coagulation process of Example 2 were comparable to the results for the treated water of Comparative Example 3, which was produced by adding the commercially-available oxidant with no electric current applied by the electrodes. This demonstrates that the chlorination-assisted coagulation process of Example 2 may provide treatment performance comparable to processes using conventional commercially available oxidants, such as Comparative Example 3. However, the chlorination-assisted coagulation process of Example 2 may save costs by producing oxidants on site from the chloride ions already present rather than adding commercially-available oxidants. Also, the chlorination-assisted coagulation process does not require addition of more ionic species to an aqueous composition that already has a high ionic concentration. The chlorination-assisted coagulation process is also safer than conventional processes by eliminating the need to store and handle large quantities of oxidants. Control of the electric current may enable improved control of the amount of oxidant in the aqueous composition compared to conventional processes that rely on adding oxidants to the aqueous solution.

Example 5: Effect of Adding Supplemental Iron (II) Compounds During the Chlorination-Assisted Coagulation Process In Example 5, a quantity of 1 liter of the Sour produced water of Control Example 1 was measured in a graduated cylinder and added to the beaker 702 in lab apparatus 700 of FIG. 7. The electrodes 710 were at least partially submerged in the Sour produced water in the beaker 702. A quantity 0.0502 grams of FeSO$_4$ were added to the Sour produced water. The mixture of the Sour produced water and FeSO$_4$ was subjected to an electric current of 0.98 amperes and voltage of 3.7 V for a period of 2 minutes. The resulting suspension was filtered on glass wool to remove the solids and produce the treated water of Example 5. The treated water of Example 5 was analyzed for the properties described above in Control Example 1 and the results are reported in Table 2, which is subsequently provided in this disclosure.

Example 6: Effect of Adding a Greater Quantity of Supplemental Iron (II) Compounds During the Chlorination-Assisted Coagulation Process In Example 6, a quantity of 1 liter of the Sour produced water of Control Example 1 was measured in a graduated cylinder and added to the beaker 702 in lab apparatus 700 of FIG. 7. The electrodes 710 were at least partially submerged in the Sour produced water in the beaker 702. A quantity of 0.5010 grams of iron (II) sulfate (FeSO$_4$) was added to the Sour produced water. The amount of iron (II) sulfate added to the Sour produced water was increased in Example 6 relative to Example 5. The mixture of the Sour produced water and FeSO$_4$ of Example 6 was subjected to an electric current of 0.96 amperes and voltage of 3.7 V for a period of 2 minutes. The resulting suspension was filtered on glass wool to remove the solids and produce the treated water of Example 6. The treated water of Example 6 was analyzed for the properties described above in Control Example 1 and the results are reported in Table 2, which is subsequently provided in this disclosure.

Example 7: Comparison of Example 5 with the Commercially-Available Oxidant of Comparative Example 6 and Example 2 without the Supplemental Iron Compounds Table 2, provided subsequently in this disclosure, includes the analysis data for Control Example 1, Example 5, and Example 6. Table 2 also includes the analysis data for Example 2, which was treated using the chlorination-assisted coagulation process that did not include the addition of the supplemental iron compound, $FeSO_4$.

TABLE 2

Analysis Data for Control Example 1, Example 2, Example 5, and Example 6 Illustrating the Effects of Adding Supplemental Iron (II) Species

|  | Control Example 1 | Example 2 (no $FeSO_4$) | Example 5 (w/$FeSO_4$) | Example 6 (w/greater $FeSO_4$) |
|---|---|---|---|---|
| pH | 6.8 | 7.2 | 7.3 | 7.2 |
| Conductivity (mS/cm) | 85050 | 85610 | 88490 | 90500 |
| Specific Gravity | 1.0629 | 1.0638 | 1.0644 | 1.0679 |
| TDS (mg/L) | 102460 | 118420 | 114300 | 111180 |
| TSS (mg/L) | 356 | 290 | 392 | 410 |
| Total Solids (mg/L) | 102816 | 118710 | 114692 | 111590 |
| Metals |  |  |  |  |
| Aluminum (mg/L) | <0.1 | <0.1 | <0.1 | <0.1 |
| Calcium (mg/L) | 7522 | 7858 | 7800 | 8496 |
| Magnesium (mg/L) | 892 | 946 | 945 | 1022 |
| Arsenic (mg/L) | 0.4 | 0.4 | 0.4 | 0.4 |
| Cadmium (µg/L) | <0.1 | <0.1 | <0.1 | <0.1 |
| Chromium (µg/L) | 0.1 | 0.1 | 0.1 | 0.1 |
| Copper (µg/L) | <0.1 | <0.1 | <0.1 | <0.1 |
| Iron (mg/L) | <1 | <1 | <1 | 5 |
| Lead (µg/L) | <0.1 | <0.1 | <0.1 | <0.1 |
| Manganese (µg/L) | <1 | <1 | <1 | <1 |
| Nickel (mg/L) | 0.3 | 0.3 | 0.3 | 0.3 |
| Potassium (mg/L) | 980 | 997 | 1000 | 1079 |
| Sodium (mg/L) | 22432 | 23922 | 23679 | 25569 |
| Selenium (mg/L) | 1.4 | 1.4 | 1.4 | 1.5 |
| Zinc (mg/L) | <0.1 | <0.1 | <0.1 | <0.1 |
| Barium (mg/L) | 2 | 2 | 2 | 2 |
| Strontium (mg/L) | 351 | 371 | 370 | 399 |
| Anions |  |  |  |  |
| Fluoride (mg/L) | 5.6 | 5.33 | 5.31 | 5.78 |
| Bromide (mg/L) | 279 | 296 | 323 | 352 |
| Chloride (mg/L) | 52542 | 52235 | 54313 | 61649 |
| Nitrite (mg/L) | <10 | <10 | <10 | <10 |
| Nitrate (mg/L) | <10 | <10 | <10 | <10 |
| Phosphate (mg/L) | 0.419 | <0.05 | <0.05 | <0.05 |
| Sulfate (mg/L) | 405 | 385 | 436 | 436 |
| Bicarbonate (mg/L) | 776 | 365 | 290 | 253 |
| Carbonate (mg/L) | 0 | 0 | 0 | 0 |
| Hydroxide (mg/L) | 0 | 0 | 0 | 0 |
| Organic Compounds |  |  |  |  |
| Phenol (ppmw) | 0.14 | Not Detected | Not Detected | Not Detected |

As shown by the data in Table 2, the addition of the supplemental iron (II) species, $FeSO_4$, to the Sour produced water treated by the chlorination-assisted coagulation process in Examples 5 and 6 had little or no effect on the removal of other chemical compounds compared to treatment of the Sour produced water by the chlorination-assisted coagulation process of Example 2 without the addition of the supplemental iron (II) species. Thus, the data in Table 2 demonstrates that the chlorination-assisted coagulation process may provide sufficient treatment of produced water without introducing supplemental iron (II) species to the produced water prior to or during treatment. The addition of the iron (II) species to the Sour produced water in Examples 5 was observed to increase the amount of iron floc in the Sour produced water compared to Example 2. However, when the iron (II) concentration was increased to 501 mg/L in Example 6, the reaction time of 2 minutes was not sufficient to transform all of the iron (II) into iron (III), as indicated by the concentration of iron of 5 mg/l measured in the treated Sour produced water of Example 6 compared to concentrations of iron of less than 1 mg/L for Control Example 1, Example 2, and Example 5.

Example 8: Effect of Adding a Flocculent Composition after the Chlorination Assisted Coagulation Process In Example 8, a quantity of 1 liter of the Sour produced water of Control Example 1 was measured in a graduated cylinder and added to the beaker 702 in lab apparatus 700 of FIG. 7. The electrodes 710 were at least partially submerged in the Sour produced water in the beaker 702. The Sour produced water was subjected to an electric current of 0.90 amperes and voltage of 3.7 V for a period of 2 minutes. Following discontinuance of the electric current, 0.5038 grams of chitosan, a commercially-available flocculent, was added to the resulting suspension, and the mixture of the chitosan and suspension was mixed for a period of 5 minutes. It was observed that the rate of sedimentation was increased with the addition of the chitosan. The resulting suspension was filtered on glass wool to remove the solids and produce the treated water of Example 8. The addition of the chitosan to the suspension made filtration of the suspension easier than without the chitosan. The treated water of Example 8 was analyzed for the properties described above in Control Example 1 and the results are reported in Table 3, which is subsequently provided in this disclosure. Table 3 also includes the analysis data for Control Example 1 and Example 2 for purposes of comparison.

TABLE 3

Analysis Data for Control Example 1, Example 2, and Example 8 Showing the Effect of Adding a Flocculent After Chloriantion-Assisted Coagulation

|  | Control Example 1 | Example 2 (no flocculent) | Example 8 (flocculent added) |
|---|---|---|---|
| pH | 6.8 | 7.2 | 7.2 |
| Conductivity (mS/cm) | 85050 | 85610 | 92160 |
| Specific Gravity | 1.0629 | 1.0638 | 1.0677 |
| TDS (mg/L) | 102460 | 118420 | 111700 |
| TSS (mg/L) | 356 | 290 | 342 |
| Total Solids (mg/L) | 102816 | 118710 | 112042 |
| Metals |  |  |  |
| Aluminum (mg/L) | <0.1 | <0.1 | <0.1 |
| Calcium (mg/L) | 7522 | 7858 | 8326 |
| Magnesium (mg/L) | 892 | 946 | 1032 |
| Arsenic (mg/L) | 0.4 | 0.4 | 0.4 |
| Cadmium (µg/L) | <0.1 | <0.1 | <0.1 |
| Chromium (µg/L) | 0.1 | 0.1 | 0.1 |
| Copper (µg/L) | <0.1 | <0.1 | <0.1 |
| Iron (mg/L) | <1 | <1 | <1 |
| Lead (µg/L) | <0.1 | <0.1 | <0.1 |
| Manganese (µg/L) | <1 | <1 | <1 |

TABLE 3-continued

Analysis Data for Control Example 1, Example 2, and Example 8 Showing the Effect of Adding a Flocculent After Chloriantion-Assisted Coagulation

|  | Control Example 1 | Example 2 (no flocculent) | Example 8 (flocculent added) |
|---|---|---|---|
| Nickel (mg/L) | 0.3 | 0.3 | 0.3 |
| Potassium (mg/L) | 980 | 997 | 1036 |
| Sodium (mg/L) | 22432 | 23922 | 25909 |
| Selenium (mg/L) | 1.4 | 1.4 | 1.6 |
| Zinc (mg/L) | <0.1 | <0.1 | <0.1 |
| Barium (mg/L) | 2 | 2 | 2 |
| Strontium (mg/L) | 351 | 371 | 400 |
| Anions |  |  |  |
| Fluoride (mg/L) | 5.6 | 5.33 | 5.21 |
| Bromide (mg/L) | 279 | 296 | 287 |
| Chloride (mg/L) | 52542 | 52235 | 55806 |
| Nitrite (mg/L) | <10 | <10 | <10 |
| Nitrate (mg/L) | <10 | <10 | <10 |
| Phosphate (mg/L) | 0.419 | <0.05 | <0.05 |
| Sulfate (mg/L) | 405 | 385 | 400 |
| Bicarbonate (mg/L) | 776 | 365 | 189 |
| Carbonate (mg/L) | 0 | 0 | 0 |
| Hydroxide (mg/L) | 0 | 0 | 0 |
| Organic Compounds |  |  |  |
| Phenol (ppmw) | 0.14 | Not Detected | Not Detected |

The analysis data in Table 3 show that addition of the commercially-available flocculent after passing the electric current through the produced water may improve the removal of certain anionic species from the produced water. For example, the treated water of Example 8, for which the flocculent was added after treatment with the electric current, included substantially less bicarbonate and less fluoride and bromide anions compared to the treated water of Example 2, which did not include the addition of commercially-available flocculent.

Control Example 9: Produced Water Control Sample

A second sample of Sour produced water was obtained from the first crude oil production plant in Saudi Arabia. Prior to further experimentation, the Sour produced water was analyzed for pH, conductivity (millisiemens per centimeter (mS/cm)), specific gravity, total dissolved solids (TDS) (mg/L), total suspended solids (TSS) (mg/L), and total solids (mg/L). Additionally, the produced water samples were analyzed for metal concentrations (mg/L), anion concentrations (mg/L), and phenol concentration (parts per million by weight (ppmw). The analysis data for the produced water of Control Example 9 are provided in Table 4, subsequently provided in this disclosure.

Example 10: Chlorination-Assisted Coagulation Process with Flocculent Addition Under Acidic pH Conditions In Example 10, a quantity of 1 liter of the Sour produced water of Control Example 9 was measured in a graduated cylinder and added to the beaker 702 in lab apparatus 700 of FIG. 7. The pH of the Sour produced water was 6.2. The pH was not adjusted so that treatment by the chlorination-assisted coagulation process was conducted under acidic conditions. The electrodes 710 were at least partially submerged in the Sour produced water in the beaker 702. The Sour produced water was subjected to an electric current of from 0.95 to 0.96 amperes and a voltage of from 3.6-3.7 V for a period of 60 minutes. Following discontinuance of the electric current, 5.0198 grams of chitosan, a commercially-available flocculent, was added to the resulting suspension, and the mixture of the chitosan and suspension was mixed for a period of 10 minutes. The resulting suspension was filtered on glass wool to remove the solids and produce the treated water of Example 10. The treated water of Example 10 was analyzed for the properties described above in Control Example 9 and the results are reported in Table 4, which is subsequently provided in this disclosure.

To evaluate the effect of reaction time on the chlorination-assisted coagulation process, the reaction time for Example 10 was increased to 60 minutes from 2 minutes in Example 8. However, no significant difference in composition was observed between the treated Sour produced water of Example 8 (see results for Example 8 previously presented in Table 3) and the treated Sour produced water of Example 10 (see results for Example 10 subsequently provided in Table 4). The comparison of the results of Example 10 and Example 8 indicates that the sequential reactions of electrolysis of chloride and oxidation of iron (II) into iron (III) are very rapid with a reaction time of less than 2 minutes.

The amount of chitosan flocculent in Example 10 was also increased to 5.0198 grams compared to the 0.5038 grams of chitosan flocculent used in Example 8. It was observed that increasing the amount of flocculent added to the treated Sour produced water did not substantially change the rate of sedimentation or the concentrations of inorganic constituents in the treated Sour produced water of Example 10 compared to Example 8.

Example 11: Chlorination Assisted Coagulation Process with Flocculent Addition Under Basic pH Conditions In Example 11, a quantity of 1 liter of the Sour produced water of Control Example 9 was measured in a graduated cylinder and added to the beaker 702 in lab apparatus 700 of FIG. 7. The pH of the Sour produced water was adjusted up to a pH of 8 by addition of 6.8791 grams of potassium hydroxide pellets. The electrodes 710 were at least partially submerged in the Sour produced water in the beaker 702. The Sour produced water was subjected to an electric current of 0.92 amperes and a voltage of 3.8 V for a period of 60 minutes. Following discontinuance of the electric current, 5.1367 grams of chitosan, a commercially-available flocculent, was added to the resulting suspension, and the mixture of the chitosan and suspension was mixed for a period of 10 minutes. The resulting suspension was filtered on glass wool to remove the solids and produce the treated water of Example 11. The treated water of Example 11 was analyzed for the properties described above in Control Example 9 and the results are reported in Table 4, which is subsequently provided in this disclosure.

Comparative Example 12: Treatment of the Produced Water with Flocculent Only

In Comparative Example 12, a quantity of 1 liter of the Sour produced water of Control Example 9 was measured in a graduated cylinder and added to the beaker 702 in lab apparatus 700 of FIG. 7. The pH of the Sour produced water was adjusted to a pH of 8 by addition of 6.5824 grams of potassium hydroxide pellets. A quantity of 5.2898 grams of chitosan was added to the Sour produced water, and the mixture of the produced water and chitosan was mixed for a period of 10 minutes. No oxidant was added to the Sour produced water of Comparative Example 12. The mixture was not subjected to the electric current. The resulting suspension was filtered on glass wool to remove the solids and produce the treated water of Comparative Example 12. The treated water of Comparative Example 12 was analyzed for the properties described above in Control Example 9 and the results are reported in Table 4, which is subsequently provided in this disclosure. Increasing the pH of the produced water of Comparative Example 12 caused more cations to precipitate as insoluble metal hydroxide and/or co-precipitate with metal hydroxide. For example, it was observed that selenate co-precipitated with the iron(III) hydroxide.

Example 13: Comparison of Example 10, Example 11, and Comparative Example 12 to Evaluate the Effects of pH Conditions on the Chlorination-Assisted Coagulation Process with Flocculent Addition Table 4, provided subsequently in this disclosure, includes the analysis data for Control Example 9, Example 10, Example 11, and Comparative Example 12.

TABLE 4

Analysis Data for Control Example 9, Example 10, Example 11, and Comparative Example 12 Illustrating the Effects of pH Conditions on the Chlorination-Assisted Coagulation Process

|  | Control Example 9 | Example 10 (acidic) | Example 11 (basic) | Comparative Example 12 (basic) |
|---|---|---|---|---|
| Produced Water pH | 6.2 | 6.2 | 8 | 8 |
| Final Treated Water pH | Not Treated | 6.4 | 9.2 | 9.5 |
| Conductivity (mS/cm) | 86640 | 87900 | 94560 | 98010 |
| Specific Gravity | 1.0647 | 1.0639 | 1.0632 | 1.0633 |
| TDS (mg/L) | 100520 | 100520 | 91860 | 92100 |
| TSS (mg/L) | 332 | 346 | 262 | 266 |
| Total Solids (mg/L) | 100852 | 100866 | 92122 | 92366 |
| Metals | | | | |
| Aluminum (mg/L) | <0.1 | <0.1 | <0.1 | <0.1 |
| Calcium (mg/L) | 7988 | 7310 | 1221 | 1425 |
| Magnesium (mg/L) | 961 | 873 | 228 | 258 |
| Arsenic (mg/L) | 0.5 | 0.5 | 0.5 | 0.5 |
| Cadmium (µg/L) | <0.1 | <0.1 | <0.1 | <0.1 |
| Chromium (µg/L) | <0.1 | <0.1 | <0.1 | <0.1 |
| Copper (µg/L) | <0.1 | <0.1 | <0.1 | <0.1 |
| Iron (mg/L) | <1 | <1 | <1 | <1 |
| Lead (µg/L) | <0.1 | <0.1 | <0.1 | <0.1 |
| Manganese (µg/L) | <1 | <1 | <1 | <1 |
| Nickel (mg/L) | 0.5 | 0.5 | 0.1 | 0.1 |
| Potassium (mg/L) | 1010 | 1011 | 4548 | 4589 |
| Sodium (mg/L) | 24471 | 22880 | 29736 | 32139 |
| Selenium (mg/L) | 2 | 1.8 | 1.8 | 1.9 |
| Zinc (mg/L) | 0.2 | 0.1 | <0.1 | 0.2 |
| Barium (mg/L) | 2 | <1 | <1 | 1 |
| Strontium (mg/L) | 384 | 362 | 171 | 186 |
| Anions | | | | |
| Fluoride (mg/L) | 5.12 | 3.05 | <1 | <1 |
| Bromide (mg/L) | 444 | 423 | 42 | 447 |
| Chloride (mg/L) | 55087 | 54686 | 54671 | 53082 |
| Nitrite (mg/L) | 19 | 22 | 16 | 18 |
| Nitrate (mg/L) | <10 | <10 | <10 | <10 |
| Phosphate (mg/L) | <0.05 | <0.05 | <0.05 | <0.05 |
| Sulfate (mg/L) | 436 | 369 | 276 | 118 |
| Bicarbonate (mg/L) | 756 | 60 | 0 | 0 |
| Carbonate (mg/L) | 0 | 0 | 87 | 94 |
| Hydroxide (mg/L) | 0 | 0 | 14 | 70 |
| Organic Compounds | | | | |
| Phenol (ppmw) | 0.16 | Not Detected | Not Detected | 0.15 |

As shown in Table 4, conducting the chlorination-assisted coagulation process under acidic conditions, as in Example 10, resulted in a reduction of certain metals, in particular calcium, magnesium, sodium, selenium, zinc, and strontium, from the produced water compared to the produced water of Control Example 9. Acidic conditions also resulted in a reduction in anions such as fluoride, bromide, chloride, sulfate, and bicarbonate anions in the treated water of Example 10 compared to Control Example 9. Conducting the chlorination-assisted coagulation process under basic conditions, as in Example 11, exhibited similar reductions in the metals calcium, magnesium, sodium, selenium, zinc, and strontium and the anions fluoride, bromide, chloride, sulfate, and bicarbonate from the produced water compared to the produced water of Control Example 9. However, the magnitude of the reductions in calcium, magnesium, strontium, fluoride anions, bromide anions, sulfate anions, and bicarbonate ions achieved under basic conditions in Example 11 were substantially greater than the reductions achieved under acidic conditions in Example 10.

Although the concentration of hydroxide and carbonate ions are increased by increasing the pH to 8 in Example 11 compared to example 10 (pH of 6.2), the concentration of calcium, magnesium, strontium, fluoride, bromide, and sulfate ions was greatly reduced in Example 11 by precipitation and co-precipitation of metal hydroxide compared to Example 10. Furthermore, the concentration of organic material, such as phenol, was significantly decreased by applying the chlorination-assisted coagulation process in basic conditions (Example 11).

Control Example 14: Sweet Produced Water Control Samples

A sample of produced water was collected from a second crude oil production plant in Saudi Arabia. The produced water sample of Control Example 14 exhibited a low hydrogen sulfide content of less than 5 vol. % of the gas stream and, thus, will be referred to herein as "Sweet produced water." Prior to further experimentation, the Sweet produced water was analyzed for pH, conductivity (millisiemens per centimeter (mS/cm)), specific gravity, total dissolved solids (TDS) (mg/L), total suspended solids (TSS) (mg/L), and total solids (mg/L). Additionally, the Sweet produced water sample was analyzed for metal concentrations (mg/L), anion concentrations (mg/L), and phenol concentration (parts per million by weight (ppmw). The analysis data for the Sweet produced water of Control Example 14 are provided in Table 5, which is subsequently provided in this disclosure.

Example 15: Treatment of the Sweet Produced Water with the Chlorination Assisted Coagulation Process In Example 15, a quantity of 1 liter of the Sweet produced water of Control Example 14 was measured in a graduated cylinder and added to the beaker 702 in lab apparatus 700 of FIG. 7. The electrodes 710 were at least partially submerged in the Sweet produced water in the beaker 702. The Sweet produced water appeared to be a clear and slightly light green solution prior to treatment. The Sweet produced water was subjected to an electric current of 0.96 amperes and voltage of 3.4 V for a period of 2 minutes. By the end of the treatment period, the Sweet produced water had transformed into a cloudy, light-brown-colored suspension. The suspension was filtered on glass wool to remove the solids and produce the treated water of Example 15. The treated water of Example 15 was analyzed for the properties described above in Control Example 14 and the results are reported in Table 5, which is subsequently provided in this disclosure.

Comparative Example 16: Treatment of the Sweet Produced Water with a Commercially-Available Oxidant For Comparative Example 16, a quantity of 1 liter of the Sweet produced water of Control Example 14 was measured in a graduated cylinder and added to the beaker 702 in lab apparatus 700 of FIG. 7 and 0.5196 grams of calcium hypochlorite ($Ca(OCl)_2$), a commercially-available oxidant, was added to the Sweet produced water. The aqueous solution of produced water and $Ca(OCl)_2$ was then stirred at 400 rotations per minute (rpm) for a period of 1 minute. The resulting suspension was filtered on glass wool to remove the solids and produce the treated water of Comparative Example 16. The treated water of Comparative Example 16 was analyzed for the properties described above in Control Example 14 and the results are reported in Table 5 subsequently provided in this disclosure.

Example 17: Comparison of the Chlorination-Assisted Coagulation Process of Example 15 with the Commercially-Available Oxidant of Comparative Example 16

Table 5, provided subsequently in this disclosure, includes the analysis data for Control Example 14, Example 15, and Comparative Example 16.

TABLE 5

Water Analysis Data for Control Example 14, Example 15, and Comparative Example 16

|  | Control Example 14 | Example 15 | Comparative Example 16 |
|---|---|---|---|
| pH | 6.1 | 7.9 | 3.6 |
| Conductivity (mS/cm) | 142300 | 149000 | 146300 |
| Specific Gravity | 1.1384 | 1.1437 | 1.1445 |
| TDS (mg/L) | 262080 | 275520 | 290260 |
| TSS (mg/L) | 738 | 848 | 876 |
| Total Solids (mg/L) | 262818 | 276368 | 291136 |
| Metals |  |  |  |
| Aluminum (mg/L) | 3.4 | <0.1 | <0.1 |
| Calcium (mg/L) | 12426 | 13265 | 14255 |
| Magnesium (mg/L) | 1885 | 2011 | 2150 |
| Arsenic (mg/L) | 0.6 | 0.6 | 0.6 |
| Cadmium (µg/L) | <0.1 | <0.1 | <0.1 |
| Chromium (µg/L) | <0.1 | <0.1 | <0.1 |
| Copper (µg/L) | <0.1 | <0.1 | <0.1 |
| Iron (mg/L) | 16 | 14 | <1 |
| Lead (µg/L) | <0.1 | <0.1 | <0.1 |
| Manganese (µg/L) | 9 | 10 | 8 |
| Nickel (mg/L) | 0.5 | 0.5 | 0.5 |
| Potassium (mg/L) | 1469 | 1508 | 1606 |
| Sodium (mg/L) | 61000 | 64840 | 69180 |
| Selenium (mg/L) | 2.1 | 2.2 | 2.2 |
| Zinc (mg/L) | <0.1 | <0.1 | <0.1 |
| Barium (mg/L) | 7 | 7 | 7 |
| Strontium (mg/L) | 440 | 472 | 501 |
| Anions |  |  |  |
| Fluoride (mg/L) | 2.51 | 2.39 | 2.28 |
| Bromide (mg/L) | 413 | 356 | 400 |
| Chloride (mg/L) | 127244 | 108227 | 129142 |
| Nitrite (mg/L) | <10 | <10 | <10 |
| Nitrate (mg/L) | <10 | <10 | <10 |
| Phosphate (mg/L) | <0.05 | <0.05 | <0.05 |
| Sulfate (mg/L) | 100 | <100 | 133 |
| Bicarbonate (mg/L) | 115 | 29 | 0 |
| Carbonate (mg/L) | 0 | 0 | 0 |
| Hydroxide (mg/L) | 0 | 0 | 0 |
| Organic Compounds |  |  |  |
| Phenol (ppmw) | 0.91 | Not Detected | Not Detected |

As shown by the data in Table 5, the chlorination-assisted coagulation process of Example 15 resulted in removal of the phenol compounds from the produced water of Example 14. The results of the chlorination-assisted coagulation process of Example 15 were comparable to the results for the treated water of Comparative Example 16, which was produced by adding the commercially-available oxidant with no electric current applied by the electrodes. This demonstrates that the chlorination-assisted coagulation process of Example 15 may provide treatment performance comparable to processes using conventional commercially available oxidants, such as Comparative Example 16. However, the chlorination-assisted coagulation process of Example 15 may save costs by producing oxidants in place from the chloride ions already present in the produced water rather than adding commercially-available oxidants.

In the conventional chemical treatment, such as the treatment performed in Comparative Example 16, the ionic species added during the treatment, such as calcium in the case of adding calcium chloride, may be detrimental to the treatment process, because these additional ions may participate in clogging in the reservoir or contribute to scaling in piping and equipment. In high TDS water, the addition of ions as benign as chloride ions may disrupt the overall ionic balance of the high TDS water, which may cause premature precipitation of salts, such as sodium chloride. In these high TDS waters, the common-ion effect occurs readily and frequently.

For the treated Sweet produced water of Example 15, a reduction of aluminum, chloride, sulfate, bromide, and bicarbonate ions was observed. Although the concentrations of inorganic species in Example 15 was less than the concentrations in Example 14, the concentration of iron in example 15 (14 mg/L) is still greater compared to the conventional chemical treatment of Comparative Example 16. This result indicates that lesser quantities of iron may be sufficient to achieve equivalent or better results than in conventional chemical treatment that require the addition of salts to the Sweet produced water. These results also show that in highly ionic aqueous compositions (e.g., Sweet produced water) the chlorination-assisted coagulation process may destabilize the ionic balance of the aqueous composition enough to precipitate or co-precipitate ions during the process.

Example 18: Effect of Adding Supplemental Iron (II) Compounds During the Chlorination-Assisted Coagulation Process of the Sweet Produced Water In Example 18, a quantity of 1 liter of the Sweet produced water of Control Example 14 was measured in a graduated cylinder and added to the beaker 702 in lab apparatus 700 of FIG. 7. The electrodes 710 were at least partially submerged in the Sweet produced water in the beaker 702. A quantity of 0.0510 grams of iron (II) sulfate ($FeSO_4$) was added to the Sweet produced water. The mixture of the Sweet produced water and $FeSO_4$ was subjected to an electric current of 0.96 amperes and voltage of 3.6 V for a period of 2 minutes. The resulting suspension was filtered on glass wool to remove the solids and produce the treated water of Example 18. The treated water of Example 18 was analyzed for the properties described above in Control Example 14 and the results are reported in Table 6, which is subsequently provided in this disclosure.

Example 19: Effect of Adding a Greater Amount of Supplemental Iron (II Compounds During Chlorination-Assisted Coagulation Process of the Sweet Produced Water In Example 19, a quantity of 1 liter of the Sweet produced water of Control Example 14 was measured in a graduated cylinder and added to the beaker 702 in lab apparatus 700 of FIG. 7. The electrodes 710 were at least partially submerged in the Sweet produced water in the beaker 702. A quantity of 0.5059 grams of iron (II) sulfate ($FeSO_4$) was added to the Sweet produced water. The mixture of the Sweet produced water and $FeSO_4$ was subjected to an electric current of 0.95 amperes and voltage of 3.6 V for a period of 2 minutes. The resulting suspension was filtered on glass wool to remove the solids and produce the treated water of Example 19. The treated water of Example 19 was analyzed for the properties described above in Control Example 14 and the results are reported in Table 6, which is subsequently provided in this disclosure.

Example 20: Comparison of Example 18 with the Commercially-Available Oxidant of Comparative Example 19 and Example 15 without the Supplemental Iron Compounds Table 6, provided subsequently in this disclosure, includes the analysis data for Control Example 14, Example 18, and Comparative Example 19. Table 6 also includes the analysis data for Example 15, which was treated using the chlorination-assisted coagulation process but did not include the addition of the supplemental iron compound, $FeSO_4$.

TABLE 6

Analysis Data for Control Example 14, Example 15, Example 18, and Example 19 Illustrating the Effects of Adding Supplemental Iron (II) Species

| | Control Example 14 | Example 15 (no $FeSO_4$ added) | Example 18 (w/$FeSO_4$) | Example 19 (w/greater $FeSO_4$) |
|---|---|---|---|---|
| pH | 6.1 | 7.9 | 5.1 | 4.7 |
| Conductivity (mS/cm) | 142300 | 149000 | 142700 | 150000 |
| Specific Gravity | 1.1384 | 1.1437 | 1.1448 | 1.1446 |
| TDS (mg/L) | 262080 | 275520 | 267480 | 282860 |
| TSS (mg/L) | 738 | 848 | 720 | 892 |
| Total Solids (mg/L) | 262818 | 276368 | 268200 | 283752 |
| Metals | | | | |
| Aluminum (mg/L) | 3.4 | <0.1 | <0.1 | <0.1 |
| Calcium (mg/L) | 12426 | 13265 | 13189 | 13036 |
| Magnesium (mg/L) | 1885 | 2011 | 2011 | 1978 |
| Arsenic (mg/L) | 0.6 | 0.6 | 0.6 | 0.6 |
| Cadmium (µg/L) | <0.1 | <0.1 | <0.1 | <0.1 |
| Chromium (µg/L) | <0.1 | <0.1 | <0.1 | <0.1 |
| Copper (µg/L) | <0.1 | <0.1 | <0.1 | <0.1 |
| Iron (mg/L) | 16 | 14 | 25 | 95 |
| Lead (µg/L) | <0.1 | <0.1 | <0.1 | <0.1 |
| Manganese (µg/L) | 9 | 10 | 10 | 10 |
| Nickel (mg/L) | 0.5 | 0.5 | 0.5 | 0.5 |
| Potassium (mg/L) | 1469 | 1508 | 1517 | 1527 |
| Sodium (mg/L) | 61000 | 64840 | 64835 | 64360 |
| Selenium (mg/L) | 2.1 | 2.2 | 2.4 | 2.1 |
| Zinc (mg/L) | <0.1 | <0.1 | <0.1 | <0.1 |
| Barium (mg/L) | 7 | 7 | 7 | 7 |
| Strontium (mg/L) | 440 | 472 | 471 | 463 |
| Anions | | | | |
| Fluoride (mg/L) | 2.51 | 2.39 | 2.3 | 2.4 |
| Bromide (mg/L) | 413 | 356 | 429 | 395 |
| Chloride (mg/L) | 127244 | 108227 | 143240 | 124282 |
| Nitrite (mg/L) | <10 | <10 | <10 | <10 |
| Nitrate (mg/L) | <10 | <10 | <10 | <10 |
| Phosphate (mg/L) | <0.05 | <0.05 | <0.05 | <0.05 |
| Sulfate (mg/L) | 100 | <100 | 356 | 112 |
| Bicarbonate (mg/L) | 115 | 29 | 52 | 20 |
| Carbonate (mg/L) | 0 | 0 | 0 | 0 |
| Hydroxide (mg/L) | 0 | 0 | 0 | 0 |
| Organic Compounds | | | | |
| Phenol (ppmw) | 0.91 | Not Detected | Not Detected | Not Detected |

As shown by the data in Table 6, the addition of the supplemental iron (II) species, $FeSO_4$, to the Sweet produced water treated by the chlorination-assisted coagulation process in Examples 18 and 19 had little or no effect on the removal of other chemical compounds compared to treatment of the Sweet produced water by the chlorination-assisted coagulation process of Example 15, which was performed without the addition of the supplemental iron. Thus, the data in Table 6 demonstrates that the chlorination-assisted coagulation process may provide sufficient treatment of produced water without introducing supplemental iron (II) species to the produced water prior to or during treatment.

The addition of iron (II) sulfate (51.0 mg/L) increases the amount of iron (II) in the Sweet produced water of Example 18 compared to the Sweet produced water of Example 15 and Control Example 14. However, analyses of the treated Sweet produced water of Example 18 showed little difference compared to the treated Sweet produced water of Example 15. Furthermore, the reaction time of 2 min for Examples 18 and 19 was not sufficient to transform all of the added iron (II) species into iron (III) in the treated Sweet produced water of Examples 18 and 19 compared to the treated Sour produced water of Examples 2 and 5. To summarize this unexpected result, the Sweet produced water did not require the addition of further iron (II) species, because the concentration of iron (II) species already in the Sweet produced water was sufficient to perform the process of coagulation by itself.

Example 21: Effect of Adding a Flocculent Composition after the Chlorination-Assisted Coagulation Process In Example 21, a quantity of 1 liter of the Sweet produced water of Control Example 14 was measured in a graduated cylinder and added to the beaker 702 in lab apparatus 700 of FIG. 7. The electrodes 710 were at least partially submerged in the Sweet produced water in the beaker 702. The Sweet produced water was subjected to an electric current of 0.93 amperes and voltage of 3.5 V for a period of 2 minutes. Following discontinuance of the electric current, 0.5039 grams of chitosan, a commercially-available flocculent, was added to the resulting suspension, and the mixture of the chitosan and suspension was mixed for a period of 5 minutes. It was observed that the rate of sedimentation was increased with the addition of the chitosan. The resulting suspension was filtered on glass wool to remove the solids and produce the treated water of Example 21. The treated water of Example 21 was analyzed for the properties described above in Control Example 14 and the results are reported in Table 7, which is subsequently provided in this disclosure. Table 7 also includes the analysis data for Control Example 14 and Example 15 for purposes of comparison.

TABLE 7

Analysis Data for Control Example 14, Example 15, and Example 21 Showing the Effect of Adding a Flocculent After Chlorination-Assisted Coagulation

|  | Control Example 14 | Example 15 (no flocculent) | Example 21 (flocculent added) |
|---|---|---|---|
| pH | 6.1 | 7.9 | 5.8 |
| Conductivity (mS/cm) | 142300 | 149000 | 85420 |
| Specific Gravity | 1.1384 | 1.1437 | 1.1439 |
| TDS (mg/L) | 262080 | 275520 | 295460 |
| TSS (mg/L) | 738 | 848 | 802 |
| Total Solids (mg/L) | 262818 | 276368 | 296262 |
| Metals |  |  |  |
| Aluminum (mg/L) | 3.4 | <0.1 | <0.1 |
| Calcium (mg/L) | 12426 | 13265 | 12993 |
| Magnesium (mg/L) | 1885 | 2011 | 1976 |
| Arsenic (mg/L) | 0.6 | 0.6 | 0.6 |
| Cadmium (µg/L) | <0.1 | <0.1 | <0.1 |
| Chromium (µg/L) | <0.1 | <0.1 | <0.1 |
| Copper (µg/L) | <0.1 | <0.1 | <0.1 |
| Iron (mg/L) | 16 | 14 | 4 |
| Lead (µg/L) | <0.1 | <0.1 | <0.1 |
| Manganese (µg/L) | 9 | 10 | 10 |
| Nickel (mg/L) | 0.5 | 0.5 | 0.5 |
| Potassium (mg/L) | 1469 | 1508 | 1491 |
| Sodium (mg/L) | 61000 | 64840 | 63135 |
| Selenium (mg/L) | 2.1 | 2.2 | 2.2 |
| Zinc (mg/L) | <0.1 | <0.1 | <0.1 |
| Barium (mg/L) | 7 | 7 | 7 |
| Strontium (mg/L) | 440 | 472 | 461 |
| Anions |  |  |  |
| Fluoride (mg/L) | 2.51 | 2.39 | 2.56 |
| Bromide (mg/L) | 413 | 356 | 367 |
| Chloride (mg/L) | 127244 | 108227 | 126747 |
| Nitrite (mg/L) | <10 | <10 | <10 |
| Nitrate (mg/L) | <10 | <10 | <10 |
| Phosphate (mg/L) | <0.05 | <0.05 | 0.338 |
| Sulfate (mg/L) | 100 | <100 | <100 |
| Bicarbonate (mg/L) | 115 | 29 | 81 |
| Carbonate (mg/L) | 0 | 0 | 0 |
| Hydroxide (mg/L) | 0 | 0 | 0 |
| Organic Compounds |  |  |  |
| Phenol (ppmw) | 0.91 | Not Detected | Not Detected |

The data in Table 7 show that addition of the commercially-available flocculent after passing the electric current through the produced water did not have much effect on removing metals and anions from the Sweet produced water of Control Example 14 compared to Example 15 in which operation of the chlorination-assisted coagulation process was conducted without the flocculent. It was observed that the addition of the flocculent after treatment reduced the concentration of iron in the treated water of Example 21 compared to the treated water of Example 15. Thus, the addition of a flocculent may assist in removal of the iron flocs from the treated Sweet produced water.

Example 22: Chlorination-Assisted Coagulation Process with Flocculent Addition Under Acidic pH Conditions In Example 22, a quantity of the Sweet produced water of Control Example 14 was added to the beaker 702 of the lab apparatus 700 of FIG. 7. The pH of the Sweet produced water was 6.1. The pH was not adjusted so that treatment by the chlorination-assisted coagulation process was conducted under acidic conditions. The electrodes 710 were at least partially submerged in the Sweet produced water in the beaker 702. The Sweet produced water was subjected to an electric current of from 0.95 to 0.96 amperes and a voltage of from 3.6-3.7 V for a period of 60 minutes. Following discontinuance of the electric current, 5.0246 grams of chitosan, a commercially-available flocculent, was added to the resulting suspension, and the mixture of the chitosan and suspension was mixed for a period of 10 minutes. The resulting suspension was filtered on glass wool to remove the solids and produce the treated water of Example 22. The treated water of Example 22 was analyzed for the properties described above in Control Example 14 and the results are reported in Table 8, which is subsequently provided in this disclosure.

To evaluate the effect of reaction time on the chlorination-assisted coagulation process, the reaction time for Example 22 was increased to 60 minutes from 2 minutes in Example 21. However, no significant difference in composition was observed between the treated Sweet produced water of Example 21 (see results for Example 21 previously presented in Table 7) and the treated Sweet produced water of Example 22 (see results for Example 22 subsequently provided in Table 8). The comparison of the results of Example 22 and Example 21 indicates that the sequential reactions of electrolysis of chloride and oxidation of iron (II) into iron (III) are very rapid with a reaction time of less than 2 minutes.

The amount of chitosan flocculent in Example 22 was also increased to 5.0246 grams compared to the 0.5039 grams of chitosan flocculent used in Example 21. It was observed that increasing the amount of flocculent added to the treated Sweet produced water did not substantially change the rate of sedimentation or the concentrations of inorganic constituents in the treated Sweet produced water of Example 22 compared to Example 21.

Example 23: Chlorination Assisted Coagulation Process with Flocculent Addition Under Basic pH Conditions In Example 23, a quantity of 1 liter of the Sweet produced water of Control Example 14 was measured in a graduated cylinder and added to the beaker 702 in lab apparatus 700 of FIG. 7. The pH of the Sweet produced water was adjusted up to a pH of 8 to produce basic conditions for the chlorination-assisted coagulation process. The pH was adjusted by the addition of 7.5114 grams of potassium hydroxide pellets. The electrodes 710 were at least partially submerged in the Sweet produced water in the beaker 702. The Sweet produced water was subjected to an electric current of 1.05 amperes and a voltage of 3.5 V for a period of 60 minutes. Following discontinuance of the electric current, 5.1389 grams of chitosan, a commercially-available flocculent, was added to the resulting suspension, and the mixture of the chitosan and suspension was mixed for a period of 10 minutes. The resulting aqueous suspension was filtered on glass wool to remove the solids and produce the treated water of Example 23. The treated water of Example 23 was analyzed for the properties described above in Control Example 14 and the results are reported in Table 8, which is subsequently provided in this disclosure.

Comparative Example 24: Treatment of the Sweet Produced Water with Flocculent Only In Comparative Example 24, a quantity of 1 liter of the Sweet produced water of Control Example 14 was measured in a graduated cylinder and added to the beaker 702 in lab apparatus 700 of FIG. 7. The pH of the Sweet produced water was adjusted to a pH of 8 by adding 7.6253 grams of potassium hydroxide pellets. A quantity of 5.0634 grams of chitosan was added to the Sweet produced water, and the mixture of the produced water and chitosan was mixed for a period of 10 minutes. No oxidant was added to the Sweet produced water of Comparative Example 24. The mixture was not subjected to the electric current. The resulting suspension was filtered on glass wool to remove the solids and produce the treated water of Comparative Example 24. The treated water of Comparative Example 24 was analyzed for the properties described above in Control Example 14 and the results are reported in Table 8, which is subsequently provided in this disclosure. By increasing the pH, it was observed that more cations precipitated as insoluble metal hydroxides and co-precipitate with metal hydroxide compared to lower pH. For example, it was observed that selenite co-precipitated with iron (III) hydroxide.

Example 25: Comparison of Example 22, Example 23, and Comparative Example 24 to Evaluate the Effects of pH Conditions on Treatment of Sweet Produced Water Using the Chlorination-Assisted Coagulation Process with Flocculent Addition Table 8, provided subsequently in this disclosure, includes the analysis data for Control Example 14, Example 22, Example 23, and Comparative Example 24.

TABLE 8

Analysis Data for Control Example 14, Example 22, Example 23, and Comparative Example 24 Illustrating the Effects of pH Conditions on the Chlorination-Assisted Coagulation Process

|  | Control Example 14 | Example 22 (acidic) | Example 23 (basic) | Comparative Example 24 (basic) |
|---|---|---|---|---|
| Produced Water pH | 6.1 | 6.1 | 8 | 8 |
| Final Treated Water pH | Not Treated | 3.6 | 8.1 | 8.9 |
| Conductivity (mS/cm) | 142300 | 144500 | 138500 | 144200 |
| Specific Gravity | 1.1384 | 1.1437 | 1.1408 | 1.1397 |
| TDS (mg/L) | 262080 | 219460 | 180860 | 203960 |
| TSS (mg/L) | 738 | 660 | 620 | 586 |
| Total Solids (mg/L) | 262818 | 220120 | 181480 | 204546 |
| Metals | | | | |
| Aluminum (mg/L) | 3.4 | <0.1 | <0.1 | <0.1 |
| Calcium (mg/L) | 12426 | 118 | 6595 | 6768 |
| Magnesium (mg/L) | 1885 | 1708 | 952 | 860 |
| Arsenic (mg/L) | 0.6 | 0.6 | 0.8 | 0.8 |
| Cadmium (µg/L) | <0.1 | <0.1 | <0.1 | <0.1 |
| Chromium (µg/L) | <0.1 | <0.1 | <0.1 | <0.1 |
| Copper (µg/L) | <0.1 | <0.1 | <0.1 | <0.1 |
| Iron (mg/L) | 16 | <1 | <1 | <1 |
| Lead (µg/L) | <0.1 | <0.1 | <0.1 | <0.1 |
| Manganese (µg/L) | 9 | <1 | <1 | <1 |
| Nickel (mg/L) | 0.5 | 0.9 | 0.5 | 0.5 |
| Potassium (mg/L) | 1469 | 1623 | 5468 | 5481 |
| Sodium (mg/L) | 61000 | 57685 | 67174 | 66717 |
| Selenium (mg/L) | 2.1 | 2 | 2.8 | 2.9 |
| Zinc (mg/L) | <0.1 | 0.2 | <0.1 | 0.1 |
| Barium (mg/L) | 7 | 7 | 4 | 4 |
| Strontium (mg/L) | 440 | 435 | 386 | 373 |
| Anions | | | | |
| Fluoride (mg/L) | 2.51 | 1.1 | <1 | <1 |
| Bromide (mg/L) | 413 | 441 | 652 | 714 |
| Chloride (mg/L) | 127244 | 125441 | 125307 | 127771 |
| Nitrite (mg/L) | <10 | 79 | 67 | 83 |
| Nitrate (mg/L) | <10 | <10 | <10 | <10 |
| Phosphate (mg/L) | <0.05 | <0.05 | <0.05 | <0.05 |
| Sulfate (mg/L) | 100 | <100 | <100 | <100 |
| Bicarbonate (mg/L) | 115 | 0 | 47 | 67 |
| Carbonate (mg/L) | 0 | 0 | 131 | 128 |
| Hydroxide (mg/L) | 0 | 0 | 0 | 0 |
| Organic Compounds | | | | |
| Phenol (ppmw) | 0.91 | Not Detected | Not Detected | 0.89 |

As shown in Table 8, conducting the chlorination-assisted coagulation process under acidic conditions, as in Example 22, resulted in a reduction of certain metals, in particular aluminum, calcium, magnesium, manganese, and sodium from the produced water compared to the produced water of Control Example 14. Acidic conditions also resulted in a reduction in anions such as fluoride, sulfate, and bicarbonate anions in the treated water of Example 22 compared to Control Example 14. Conducting the chlorination-assisted coagulation process under basic conditions, as in Example 23, exhibited similar reductions in the metals aluminum, calcium, and magnesium and the anions fluoride, sulfate, and bicarbonate from the produced water compared to the produced water of Control Example 14. Conducting the chlorination-assisted coagulation process under basic conditions also resulted in reductions in the concentrations of barium and strontium, compared to Control Example 14 and Example 22. The results of Examples 22 and 23 demonstrate that the chlorination-assisted coagulation process may be effective under acidic and basic conditions. Also, the chlorination-assisted coagulation process does not require addition of more ionic species to an aqueous composition that already has a high ionic concentration. The chlorination-assisted coagulation process is also safer than conventional processes by eliminating the need to store and handle large quantities of oxidants. Control of the electric current may enable improved control of the amount of oxidant in the aqueous composition compared to conventional processes that rely on adding oxidants to the aqueous solution.

Example 26: Effect of the Chlorination-Assisted Coagulation Process on Electrode Materials Experiments of the chlorination-assisted coagulation process were performed using the lab apparatus 700 previously described in relation to FIG. 7. Experiments were conducted on different electrode materials for the electrodes 710. The first experiment was performed with electrodes 710 made of platinum, and the second experiment was performed with electrodes 710 made of tantalum. In both the first experiment with platinum electrodes and the second experiment with tantalum electrodes, the chlorination-assisted coagulation process was performed on a 1 liter sample of Sweet produced water for a reaction period of 2 minutes and a reaction time of 60 minutes. For each experiment, the chlorination-assisted coagulation process was repeated with a 1 liter sample of Sour produced water having a greater concentration of $H_2S$. The process was conducted on the Sour produced water for a period of 2 minutes and for a period of 60 minutes.

The electrode materials were materials known for use as non-sacrificial electrodes for the electrolysis of water and/or the electrolysis of brine. However, it was observed that the platinum electrodes may not be suitable for this application due to corrosion of the platinum electrode under the conditions of the chlorination-assisted coagulation process. For both experiments, no corrosion of the electrodes was observed after the short reaction time of 2 minutes for the Sweet produced water and for the Sour produced water. When Sour produced water was processed for a reaction time of 60 minutes, the platinum electrodes exhibited substantial corrosion. Treatment of the Sweet produced water for 60 minutes produced significantly less corrosion on the platinum electrodes compared to the Sour produced water; however, pitting corrosion was visible on the platinum electrodes following treatment of the Sweet produced water for 60 minutes. No substantial corrosion was observed on the tantalum electrodes after treatment of the Sweet produced water or the Sour produced water for 60 minutes.

Figure 8:
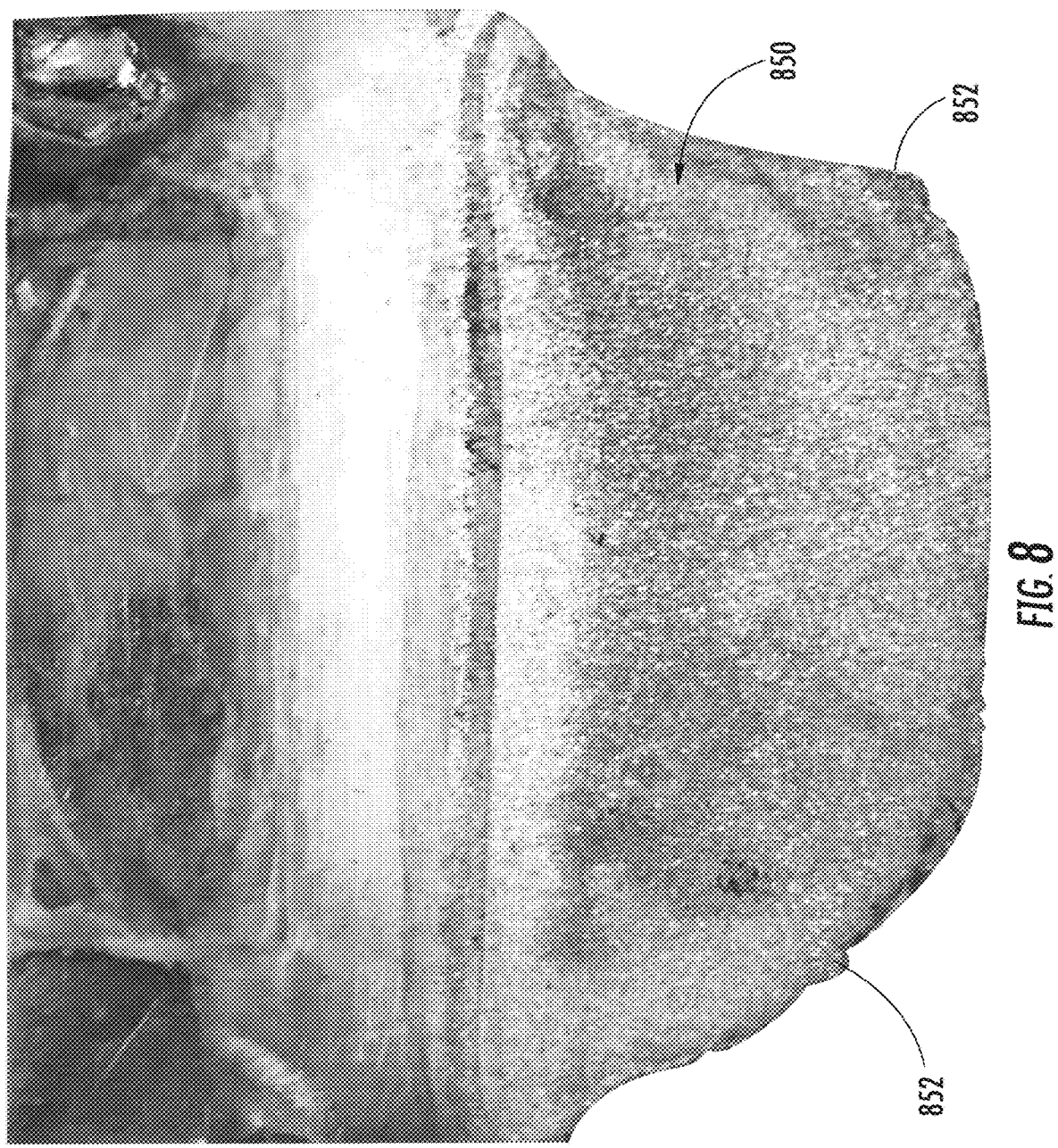
FIG. 8 is a photograph of a conventional electrode used to conduct the chlorination-assisted coagulation process using the lab apparatus of FIG. 7, according to one or more embodiments of the present disclosure.

Referring to FIG. 8, a photograph of the platinum electrode 850 taken after the experiment conducted with Sour produced water and a reaction time of 60 minutes shows that the platinum electrode 850 experienced substantial corrosion resulting in loss of a substantial portion of the platinum electrode 850, as seen by the rounded corners 852 of the platinum electrode 850. Referring to FIG. 9, a photograph of the tantalum electrode 860 taken after the experiment conducted with Sour produced water and a reaction time of 60 minutes unexpectedly shows very little corrosion of the tantalum electrode 860. Thus, the tantalum electrodes 860 may be more suitable for use as the electrodes in the chlorination-assisted coagulation process compared to other conventional transition metal electrodes. This result is unexpected and, therefore, the selection of the electrode material may lead to reducing or preventing corrosion of the electrode.

Any quantitative value expressed in the present application may be considered to include open-ended embodiments consistent with the transitional phrases "comprising" or "including" as well as closed or partially closed embodiments.

The subject matter of the present disclosure has been described in detail and by reference to specific embodiments. It should be understood that any detailed description of a component or feature of an embodiment does not necessarily imply that the component or feature is essential to the particular embodiment or to any other embodiment. Although various aspects of the claimed subject matter have been described herein, such aspects need not be utilized in combination. Further, it should be apparent to those skilled in the art that various modifications and variations can be made to the described embodiments without departing from the spirit and scope of the claimed subject matter.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

What is claimed is:

1. A process for treating an aqueous composition, the process comprising:
 converting at least a portion of chloride ions in the aqueous composition to hypochlorite ions or hypochlorous acid by passing an electric current through at least a portion of the aqueous composition under anaerobic conditions, the aqueous composition including the chloride ions, iron (II) compounds, and one or more organic compounds;
 reacting at least a portion of the iron (II) compounds of the aqueous composition with the hypochlorite or hypochlorous acid to produce iron (III) ions; and
 coagulating the one or more organic compounds with the iron (III) ions to produce a plurality of insoluble solid particles in a treated aqueous composition.

2. The process of claim 1 where the electric current has a voltage of greater than or equal to 1.5 volts (V).

3. The process of claim 1 where the electric current has a voltage from 1.5 V to 5.0 V.

4. The process of claim 1 where a current density of the electric current is from 1 milliampere per square centimeter to 1 ampere per square centimeter.

5. The process of claim 1 where the aqueous composition comprises a composition of an oilfield produced water.

6. The process of claim 1 where a pH of the aqueous composition is from 2.5 to 8.5.

7. The process of claim 1 where a pH of the aqueous composition is from 10.5 to 12.5.

8. The process of claim 1 where the electric current is passed through the aqueous composition with non-sacrificial electrodes.

9. The process of claim 8 where the non-sacrificial electrodes have an outer surface comprising one or more of zirconium, molybdenum, gold, silver, tantalum, tungsten, chromium, carbon, sulfur, silicon, or oxides of these materials.

10. The process of claim 8 further comprising alternating polarities of the non-sacrificial electrodes.

11. The process of claim 10 where the polarities of the non-sacrificial electrodes are alternated by an electrode polarity alternator comprising a waveform generator.

12. The process of claim 8 further comprising rotating the non-sacrificial electrodes relative to the aqueous composition.

13. The process of claim 12 where the non-sacrificial electrodes are rotated by an electrode rotation system comprising a shaft coupled to each of the non-sacrificial electrodes and a drive operatively coupled to the shaft, the drive operable to rotate the shaft and the non-sacrificial electrodes relative to the aqueous composition.

14. The process of claim 1 further comprising flocculating the plurality of insoluble solid particles by introducing a flocculent to the aqueous composition.

15. The process of claim 1 further comprising separating the plurality of insoluble solid particles from the treated aqueous composition.

16. The process of claim 1 further comprising introducing supplemental iron (II) compounds to the aqueous composition.

17. The process of claim 1 where all of the aqueous composition is subjected to the electric current.

18. The process of claim 1 further comprising:
measuring a property of the aqueous composition or the treated aqueous composition; and
controlling a voltage or a current density of the electric current passing through the aqueous composition in response to the measured property.

19. The process of claim 18 where the property comprises an oxidation-reduction potential.

20. The process of claim 1 further comprising:
separating the aqueous composition into a first portion and a second portion;
converting at least a portion of the chloride ions in the first portion of the aqueous composition to hypochlorite or hypochlorous acid by passing an electric current through the first portion of the aqueous composition under anaerobic conditions; and
combining the first portion of the aqueous composition with the second portion of the aqueous composition after converting of the chloride ions in the first portion to hypochlorite or hypochlorous acid.

21. The process of claim 20 further comprising:
measuring a property of the first portion of the aqueous solution, the second portion of the aqueous composition, or the treated aqueous composition; and
adjusting a ratio of the first portion to the second portion of the aqueous composition based on the measured property.

22. The process of claim 1 where the aqueous composition comprises phenolic compounds and the treated aqueous composition comprises less than 0.01 parts per million by weight phenolic compounds, after treatment.

23. The process of claim 1 where the aqueous composition includes greater than or equal to 0.1 weight percent crude oil and the treated aqueous composition comprises less than 50 milligrams per liter crude oil, after treatment.

24. The process of claim 1 where the process is conducted at a pressure of from 100 kilopascals to 1,000 kilopascals and a temperature of from 25 degrees Celsius to 80 degrees Celsius.

25. The process of claim 1 where the aqueous composition comprises hydrogen sulfide and the treated aqueous composition comprises a concentration of hydrogen sulfide less than the aqueous composition.

26. The process of claim 1 further comprising co-precipitating inorganic cationic species from the aqueous composition and separating the co-precipitated inorganic cationic species from the treated aqueous composition.

27. The process of claim 1 further comprising:
passing the aqueous composition to an electro-chlorination zone, where the at least a portion of chloride ions in the aqueous composition are converted to hypochlorite ions or hypochlorous acid in the electro-chlorination zone, and
passing the aqueous composition from the electro-chlorination zone to a coagulation zone downstream of the electro-chlorination zone.

28. The process of claim 27 further comprising:
separating the aqueous composition into a first portion and a second portion;
passing the first portion of the aqueous composition to the electro-chlorination zone;
passing the second portion of the aqueous composition through a bypass line to the coagulation zone; and
passing the first portion of the aqueous composition from the electro-chlorination zone to the coagulation zone; and
combining the first portion of the aqueous composition with the second portion of the aqueous composition in the coagulation zone.

29. A process for removing organic compounds from an aqueous composition, the process comprising:
introducing at least a portion of the aqueous composition to an electro-chlorination zone, the aqueous composition comprising at least chloride ions, iron (II) compounds, and one or more organic compounds;
converting at least a portion of the chloride ions in the aqueous composition into hypochlorite or hypochlorous acid by passing an electric current through the aqueous composition under anaerobic conditions in the electro-chlorination zone;
oxidizing at least a portion of the iron (II) compounds in the aqueous composition with the hypochlorite or hypochlorous acid in the electro-chlorination zone or in a coagulation zone to produce iron (III) ions;
coagulating the one or more organic compounds with the iron (III) ions in the coagulation zone to produce a plurality of insoluble solid particles in the aqueous composition; and
separating at least a portion of the insoluble solid particles from the aqueous composition, thereby removing at least a portion of the organic compounds from the aqueous composition.

30. The process of claim 29 where the coagulation zone is downstream of the electro-chlorination zone.

31. The process of claim 29 where the coagulation zone and the electro-chlorination zone are in a single treatment vessel.

32. The process of claim 29 further comprising measuring a potential property of the aqueous composition in the electro-chlorination zone or downstream of the electro-chlorination zone.

33. The process of claim 32 further comprising controlling a voltage or a current density of the electric current passing through the aqueous composition in the electro-chlorination zone or adjusting a flow rate of the at least a portion of the aqueous composition introduced to the electro-chlorination zone, where the controlling or the adjusting is based on the measured potential property of the aqueous composition in the electro-chlorination zone or downstream of the electro-chlorination zone.

* * * * *

UNITED STATES PATENT AND TRADEMARK OFFICE
CERTIFICATE OF CORRECTION

PATENT NO. : 10,597,313 B2
APPLICATION NO. : 15/791731
DATED : March 24, 2020
INVENTOR(S) : Raynel et al.

Page 1 of 1

It is certified that error appears in the above-identified patent and that said Letters Patent is hereby corrected as shown below:

In the Specification

In Column 10, Line(s) 42, delete "2HO⁻" and insert --2OH⁻--, therefor.

In Column 11, Line(s) 29, delete "hypochiorous" and insert --hypochlorous--, therefor.

In Column 11, Line(s) 44, delete "hypochiorous" and insert --hypochlorous--, therefor.

In Column 11, Line(s) 49, delete "hypochiorous" and insert --hypochlorous--, therefor.

Signed and Sealed this
Seventh Day of July, 2020

Andrei Iancu
*Director of the United States Patent and Trademark Office*